(12) United States Patent
Wozniak

(10) Patent No.: US 11,900,292 B2
(45) Date of Patent: *Feb. 13, 2024

(54) DYNAMIC COORDINATION OF SERVICE PROVIDERS AND SERVICE SEEKING ENTITIES

(71) Applicant: FLOQQUE, LLC, Winter Garden, FL (US)

(72) Inventor: Michael J. Wozniak, Winter Garden, FL (US)

(73) Assignee: FLOQQUE, LLC, Winter Garden, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,600

(22) Filed: Sep. 2, 2022

(65) Prior Publication Data

US 2022/0414574 A1 Dec. 29, 2022

Related U.S. Application Data

(63) Continuation of application No. 17/303,837, filed on Jun. 9, 2021, now Pat. No. 11,481,705.

(51) Int. Cl.
*G06Q 10/00* (2023.01)
*G06Q 10/0631* (2023.01)
(Continued)

(52) U.S. Cl.
CPC ....... *G06Q 10/06316* (2013.01); *G06N 20/00* (2019.01); *G06Q 30/0205* (2013.01); *G06Q 10/02* (2013.01); *G06Q 50/12* (2013.01)

(58) Field of Classification Search
CPC .................................................. G06Q 10/02
See application file for complete search history.

(56) References Cited

U.S. PATENT DOCUMENTS 6,829,583 B1 12/2004 Knapp et al.
6,845,361 B1 1/2005 Dowling
(Continued)

OTHER PUBLICATIONS

S. Kim and R. E. Banchs, "R-cube: A dialogue agent for restaurant recommendation and reservation," Signal and Information Processing Association Annual Summit and Conference (APSIPA), 2014 Asia-Pacific, Siem Reap, Cambodia, 2014, pp. 1-6, doi: 10.1109/APSIPA.2014.7041732. (Year: 2014).*

(Continued)

*Primary Examiner* — Matheus Ribeiro Stivaletti
(74) *Attorney, Agent, or Firm* — Craige Thompson; Thompson Patent Law; Timothy D. Snowden

(57) ABSTRACT

Apparatus and associated methods relate to automatically prioritizing predicted events in a dynamic predicted queueing profile (PQP) for a service provider (SP) for a finite future time period. In an illustrative example, a central orchestration engine (COE) may generate, in response to a request for service from a service seeking entity (SSE), a dynamic queueing event profile (DQEP) associating the SSE with the PQP for the SP at the future time period. The COE may, for example, generate a confidence level of execution (CLE) for each DQEP in the PQP based on a historical behavior profile (HBP) of the SP and of each corresponding SSE. The COE may, for example, apply the confidence level of execution to each corresponding DQEP to assign a priority in the PQP. Various embodiments may, for example, advantageously dynamically prioritize a queue based on historical behavior of an SP and SSEs in the queue.

25 Claims, 23 Drawing Sheets

(51) Int. Cl.
- G06Q 30/0204 (2023.01)
- G06N 20/00 (2019.01)
- G06Q 50/12 (2012.01)
- G06Q 10/02 (2012.01)

(56) References Cited

U.S. PATENT DOCUMENTS

| | | |
|---|---|---|
| 6,889,900 B2 | 5/2005 | Davies et al. |
| 8,645,064 B2 | 2/2014 | Bednar et al. |
| 8,831,963 B2 | 9/2014 | Backer et al. |
| 9,129,266 B2 | 9/2015 | Nagaraj |
| 9,741,021 B2 | 8/2017 | Yu et al. |
| 10,571,294 B2 | 2/2020 | Forutanpour et al. |
| 2003/0061078 A1 | 3/2003 | Shimosako et al. |
| 2005/0080676 A1 | 4/2005 | Lovegreen et al. |
| 2008/0133283 A1 | 6/2008 | Backer et al. |
| 2014/0136259 A1* | 5/2014 | Kinsey, II .......... G06Q 30/0627 705/7.16 |
| 2014/0282040 A1 | 9/2014 | Alfaro |
| 2014/0343995 A1 | 11/2014 | Backer et al. |
| 2015/0019271 A1 | 1/2015 | Abuelsaad et al. |
| 2015/0248651 A1 | 9/2015 | Akutagawa et al. |
| 2016/0055215 A1 | 2/2016 | Kauwe |
| 2016/0350721 A1 | 12/2016 | Comerford et al. |
| 2017/0018041 A1 | 1/2017 | Fox |
| 2017/0083831 A1 | 3/2017 | Ghosh et al. |
| 2017/0098174 A1 | 4/2017 | Venigalla |
| 2017/0272550 A1* | 9/2017 | Rodriguez ............ H04L 41/046 |
| 2017/0278204 A1 | 9/2017 | Mimassi |
| 2018/0101793 A1 | 4/2018 | Steinberg |
| 2019/0180391 A1 | 6/2019 | Ford et al. |
| 2020/0286004 A1 | 9/2020 | Backer et al. |
| 2021/0209524 A1* | 7/2021 | Oppelstrup ............ G06Q 10/02 |

OTHER PUBLICATIONS

Baron, et al., Strategic Idleness and Dynamic Scheduling in an Open-Shop Service Network: Case Study and Analysis. Manufacturing & Service Operations Management 2016, retrieved from the internet Mar. 11, 2021, https://doi.org/10.1287/msom.2016.0591.

Ha, A., Yelp Adds Predictive Wait Times and a New Way for Restaurants to Share Updates, TechCrunch, 2019, retrieved from the internet Feb. 18, 2021, https://social.techcrunch.com/2019/09/12/yelp-connect-predictive-waittimes/.

Ibrahim, et al., Wait-Time Predictors for Customer Service Systems with Time-Varying Demand and Capacity. Operations Research 2011, 59 (5), 1106-1118, retrieved from the internet Feb. 17, 2021, https://doi.org/10.1287/opre.1110.0974, <http://pubsonline.informs.org/doi/abs/10.1287/opre.1110.0974.

Istrate, et al., Advance Reservation System for Datacenters, 2016 IEEE 30th International Conference, (Year: 2016), 8 pages.

Kimes, S., Restaurant Revenue Management; CHR Reports; The Center for Hospitality Research at Cornell University, 2004, retrieved from the internet Feb. 17, 2021, https://ecommons.cornell.edu/xmlui/bitstream/handle/1813/71185/Kimes_2004_Restaurant_revenue.pdf>.

Lawrence et al., Passenger-Based Predictive Modeling of Airline No-Show Rates. Proceedings of the ACM SIGKDD International Conference on Knowledge Discovery and Data Mining 2003, retrieved from the internet Feb. 17, 2021, https://doi.org/10.1145/956750.956796.

Li, et al., Individualized No. Show Predictions: Effect on Clinic Overbooking and Appointment Reminders. Prod Oper Manag 2019, 28 (8), 2068-2086, retrieved from the internet Feb. 18. 2021, https://doi.org/10.1111/poms.13033, <https://onlinelibrary.wiley.com/doi/abs/10.1111/poms.13033.

McKeever, A., How Restaurants Can Deal With No-Show Diners. Apr. 22, 2013, retrieved from the internet Feb. 17, 2021, https://www.eater.com/2013/4/22/6445903/how-restaurants-can-deal-with-no-show-diners.

Mohr, C., Nowait: Never Wait Around for a Restaurant Table Again. Mar. 2, 2017, retrieved from the internet Feb. 17, 2021, https://wonderoftech.com/nowait-app/.

Restaurant Den, The Best Online Reservation System For Your Restaurant. Feb. 13, 2017, retrieved from the internet Feb. 17, 2021, https://restaurantden.com/online-reservation-system/.

Shannon, M., Predicting No-Shows to Create an Effective Overbooking Policy for Restaurants, Northwestern University, 2015, retrieved from the internet Feb. 17, 2021, https://mmss.wcas.northwestern.edu/thesis/articles/get/908/Shannon2015.pdf.

Trusty Ox Systems, Ltd, Showly Restaurant No Show App App for iPhone, Showly Restaurant No Show App for iPad & iPhone at AppPure. Nov. 1, 2019, retrieved from the internet Feb. 17, 2021, https://iphone.apkpure.com/ showly-restaurant-no-show-app/com.showlyai.theapp.

Tse, et al, Modeling No-Shows, Cancellations, Overbooking, and Walk-Ins in Restaurant Revenue Management. Journal of Foodservice Business Research 2017, 20 (2), 127-145, retrieved from the internet Feb. 17, 2021, https://doi.org/10.1080/15378020.2016.1198626 .<https://www.tandfonline.com/doi/full/10.1080/15378020.2016.1198626.

Vojtek, et al., P. Decision Support System for Predicting the Number of No-Show Passengers in Airline Industry. 2021, 12.

* cited by examiner

DYNAMIC COORDINATION OF SERVICE PROVIDERS AND SERVICE SEEKING ENTITIES

CROSS-REFERENCE TO RELATED APPLICATIONS

This application is a continuation and claims the benefit of U.S. application Ser. No. 17/303,837, titled "DYNAMIC COORDINATION OF SERVICE PROVIDERS AND SERVICE SEEKING ENTITIES," filed by Michael J. Wozniak on Jun. 9, 2021.

This application incorporates the entire contents of the foregoing application(s) herein by reference.

The subject matter of this application may have common inventorship with and/or may be related to the subject matter of the following:
PCT Application Serial No. PCT/US2022/072857, titled "DYNAMICALLY ASSOCIATED PREDICTIVE DIGITAL QUEUES," filed by Michael J. Wozniak on Jun. 9, 2022.

This application incorporates the entire contents of the foregoing application(s) herein by reference.

TECHNICAL FIELD

Various embodiments relate generally to dynamic coordination of entities.

BACKGROUND

Various businesses may serve customers. For example, some business may serve customers in person on the businesses' premise, in person at the customer's location, in person at a third-party location, remotely (e.g., via mail-order), or some combination thereof. Various businesses may have limited capacity for service. For example, barbers, healthcare providers, and consulting engineers may have limited capacity to serve customers at any given time and/or place. One example of a capacity-limited venue is a restaurant.

Restaurants may have tables and chairs to seat customers for a meal. Some customers may make a reservation to ensure that the restaurant has capacity to give them a table for a meal at an agreed upon time. Some customers may come in a party with more than one individual. Various size parties may show up at a restaurant (or other venue) without a reservation. Parties without a reservation may be denied or delayed until capacity becomes available.

SUMMARY

Apparatus and associated methods relate to automatically prioritizing predicted events in a dynamic predicted queueing profile (PQP) for a service provider (SP) for a finite future time period. In an illustrative example, a central orchestration engine (COE) may generate, in response to a request for service from a service seeking entity (SSE), a dynamic queueing event profile (DQEP) associating the SSE with the PQP for the SP at the future time period. The COE may, for example, generate a confidence level of execution (CLE) for each DQEP in the PQP based on a historical behavior profile (HBP) of the SP and of each corresponding SSE. The COE may, for example, apply the confidence level of execution to each corresponding DQEP to assign a priority in the PQP. Various embodiments may, for example, advantageously dynamically prioritize a queue based on historical behavior of an SP and SSEs in the queue.

Various embodiments may achieve one or more advantages. For example, some embodiments may advantageously permit a service provider to prioritize service to service seeking entities based on dynamically prioritized queues. Various embodiments may, for example, advantageously allow a service provider to allocate resources (e.g., tables, seats, staff, food, beverages, equipment) based on predetermined confidence level of execution thresholds. Various embodiments may, for example, advantageously allow service seeking entities to have a high probability of receiving service at an actual time of arrival. Some embodiments may, by way of example and not limitation, advantageously enable service providers and/or service seeking entities to adjust their behavior such that service seeking entities may receive service tailored specifically to their characteristics (e.g., by historic behavior profiles and/or entity preference profiles).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary central orchestration engine (COE) system configured to dynamically prioritize queues is introduced with reference to FIGS. 1-4. Second, that introduction leads into a description with reference to FIGS. 5-10 of some exemplary embodiments of dynamic prioritization using anticipated flow states. Third, with reference to FIGS. 11-21, exemplary embodiments of dynamic prioritization using geolocation are described. Fourth, with reference to FIGS. 22-23 the discussion turns to exemplary embodiments that illustrate dynamic coordination of coordinating entities according to dynamic flow states. Finally, the document discusses further embodiments, exemplary applications and aspects relating to dynamic prioritization.

Figure 1:
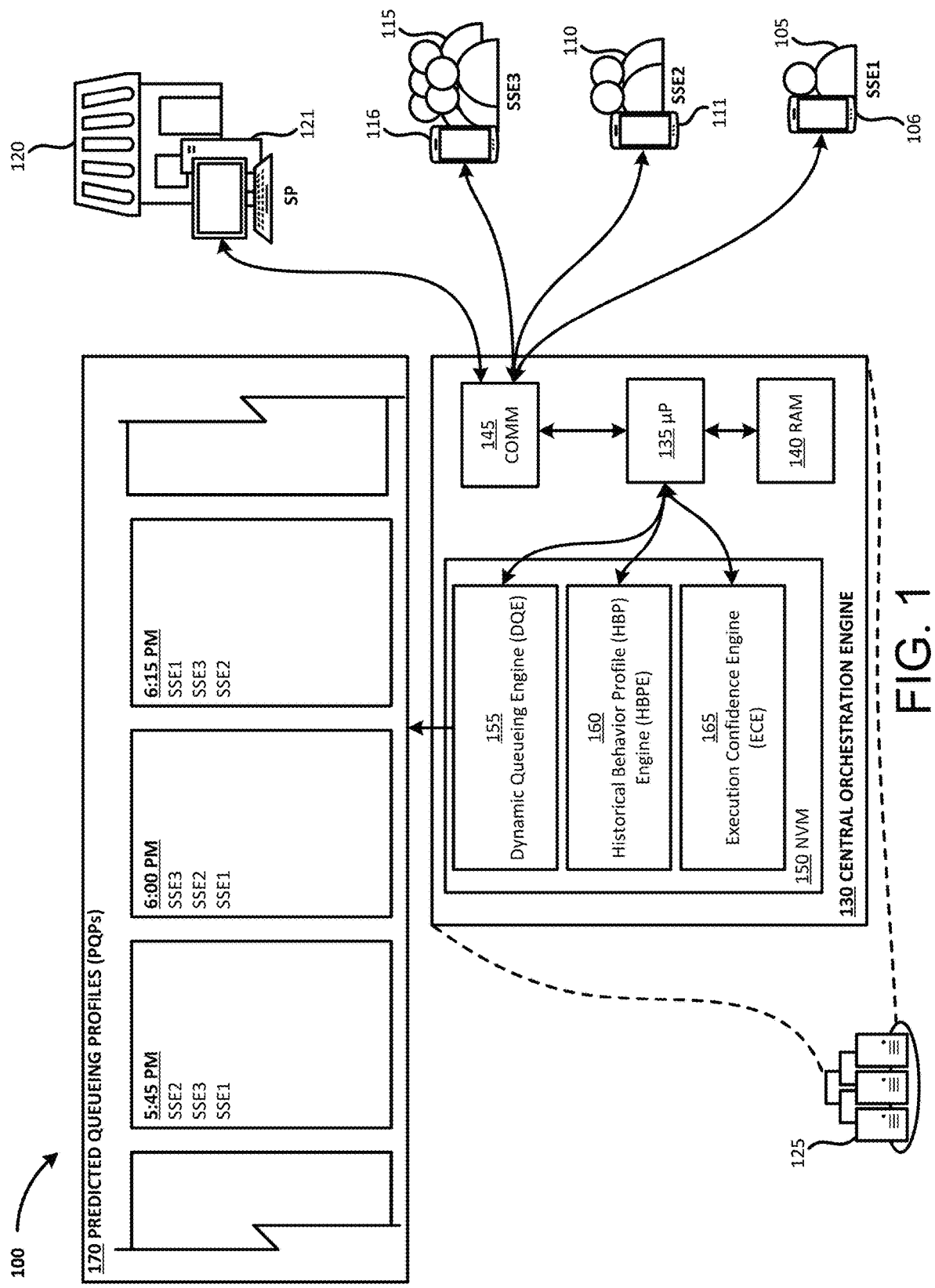
FIG. 1 depicts an exemplary central orchestration engine (COE) employed in an illustrative use-case scenario to generate predicted queuing profiles (PQPs) for an exemplary service provider (SP) for dynamic queuing events (DQEs) for exemplary service seeking (SSEs).

FIG. 1 depicts an exemplary central orchestration engine (COE) employed in an illustrative use-case scenario to generate predicted queuing profiles (PQPs) for an exemplary service provider (SP) for dynamic queuing events (DQEs) for exemplary service seeking entities (SSEs). In the depicted scenario 100, a first service seeking entity 105, a second service seeking entity 110, and a third service seeking entity 115 are dynamically prioritized to (potentially) receive service by a service provider 120. The service seeking entities 105, 110, and 115 interact with mobile devices 106, 111, and 116, respectively, to connect to a central orchestration system 125 (e.g., networked computing system, cloud service). The service provider (e.g., a restaurant) is connected to the central orchestration system 125 by a computing system 121.

The central orchestration system 125 includes at least one central orchestration engine 130. As depicted, the central orchestration engine 130 includes a microprocessor (μP) 135, a random-access memory (RAM) module 140, and a communication module 145. The devices 106, 111, 116, and 121 of the service seeking entities and the service provider communicate with the central orchestration engine 130 via the communication module 145. For example, devices may communicate with the communication module 145 via wired and/or wirelessly carried electromagnetic signals.

The central orchestration engine 130 includes at least one non-volatile memory (NVM) module 150. The nonvolatile memory module(s) 150 includes a dynamic queuing engine (DQE) 155, a historical behavior profiles (HBP) engine (HBPE) 160, and an execution confidence engine (ECE) 165. Engines 155, 160, and 165 may, by way of example and not limitation, be implemented as respective programs of instructions configured to be executed by the processor 135, (integrated) circuits, or some combination thereof.

In response to a request for service (e.g., a dynamic queueing event) from one of the service seeking entities, the dynamic queuing engine 155 may generate a corresponding dynamic queuing event profile (DQEP). For example, the dynamic queuing event profile may be stored in a memory module (e.g., nonvolatile, random access). The dynamic queuing event profile may, for example, include a requested time of service, an identifier corresponding to the service seeking entity requesting service, and an identifier corresponding to at least one service provider from whom service is sought.

The dynamic queuing engine 155 may retrieve, through microprocessor 135 by the historical behavior profile engine 160, at least one historical behavior profile corresponding to the service seeking entity, the service provider, or some combination thereof. For example, a historical behavior profile may correspond to past dynamic queuing event profiles associated with the entity (e.g., service seeking entity, service provider), results of the queuing event (e.g., successfully executed, early, late, canceled, no-show), or some combination thereof. The dynamic queuing engine 155 may communicate with the execution confidence engine 165 via the microprocessor 135 to generate a confidence level of execution (CLE) for the dynamic queuing event profile. The execution confidence engine 165 may, for example, generated confidence level of execution based at least in part on the corresponding historical behavior profile(s).

The dynamic queuing engine 155 generates at least one predicted queuing profile (PQP) corresponding to the requested time of service for the dynamic queuing event. As depicted, a predicted queuing profile may include a prioritized list of service seeking entities associated with the specific time for the associated service provider. For example, the service seeking entity 105 may request a reservation for service by the service provider 120 at 6:00 PM. Accordingly, the dynamic queuing engine 155 may generate a first dynamic queuing event profile associating the service seeking entity 105, the service provider 120, and the time 6:00 PM. The service seeking entity 110 may request a reservation for service by the service provider 120 at 6:00 PM. Accordingly, the dynamic queuing engine 155 may generate a second dynamic queuing event profile associated with the service seeking entity 110 for the service provider 120 at 6:00 PM. The service seeking entity 115 may request a reservation for service by the service provider 120 at 6:00 PM. Accordingly, the dynamic queuing engine 155 may generate a third dynamic queuing event profile associated with the service seeking entity 115 for the service provider 120 at 6:00 PM. The dynamic queuing engine 155 may generate a predicted queuing profile 170 associated with the first, second, and third dynamic queuing event profiles.

The historical behavior profile engine 160 may provide historical behavior profiles associated with each of the service seeking entities and the service provider 120 to the dynamic queuing engine 155. By way of example and not limitation, a first historical behavior profile associated with the service seeking entity 105 may indicate that the service seeking entity 105 is historically (e.g., on average, for the current time range in the day, for this type of event, for this day in the week, based on surrounding events, according to weather, for this service provider) approximately 15 minutes late. A second historical behavior profile associated with the service seeking entity 110 may indicate, for example, that the service seeking entity 110 is historically approximate 15 minutes early. A third behavior profile associated with the service seeking entity 115 may indicate, for example, that the service seeking entity 115 is historically approximately on time. The service provider 120 may, way of example and not limitation, not have historical behavior profile, or may have a historical behavior profile associated with serving on time (e.g., these patrons, at this time of day, on this day of the week, for this type of event). In various embodiments the dynamic queuing engine 155 and/or the historical behavior profile engine 160 may associate, for example, each historical behavior profile with the corresponding dynamic queuing event profile.

The execution confidence engine 165 may operate on the first, second, and third dynamic queuing event profiles and associated historical behavior profiles to determine a corresponding first, second, and third confidence level of execution, respectively, for each dynamic queuing event profile at the requested service time (e.g., 6:00 PM). For example, the first dynamic queuing event profile may be associated with a low confidence level of execution. The second dynamic queuing event profile may be associated with a high confidence level of execution. The third dynamic queuing event profile may be associated with a moderate confidence level of execution. The third confidence level of execution may, for example, be greater than the second confidence level of execution which may be greater than the first confidence level of execution.

The dynamic queuing engine 155 may prioritize, for example, the dynamic queuing event profiles in the predicted queuing profile associated with 6:00 PM according to the generated confidence levels of execution. As depicted, the predicted queuing profile associates the third dynamic queuing event profile with the highest priority (e.g., due to being associated with the highest confidence level of execution at the associated time of 6:00 PM), the second dynamic queuing event profile with middle priority, and the first dynamic queuing event profile with the lowest priority (e.g., due to being associated with the lowest confidence level of execution of the associated time). Accordingly, the service provider may advantageously determine a priority of service, an expected demand for service at a specific time, or some combination thereof.

The dynamic queuing engine 155 may further, by way of example and not limitation, determine a time corresponding to a maximum confidence level of execution for each dynamic queuing event profile. The dynamic queuing engine 155 may associate the dynamic queuing event profile with predicted queuing profiles corresponding to times other than the requested time of service. For example, the dynamic queuing engine 155 may associate a dynamic queuing event profile with predicted queuing profiles associated with time intervals adjacent to the requested time. The dynamic queuing engine 155 may associate, for example, a dynamic queuing event profile with a predicted queuing profile associated with a time corresponding to a maximum confidence level of execution for the dynamic queuing event profile (e.g., based on at least one historical behavior profile).

In the depicted example, the maximum confidence level of execution for the first dynamic queuing event profile may, for example, correspond to 6:15 PM. Accordingly, the dynamic queuing engine 155 may associate the first dynamic queuing event profile with a predicted queuing profile associated with 6:15 PM. At 6:15 PM, for example, a confidence level of execution for the first dynamic queuing event profile may be greater than a confidence level of execution for the third dynamic queuing event profile which may be greater than a confidence level execution for the second dynamic queuing event profile. Accordingly, the predicted queuing profile for the service provider 120 at 6:15 PM may prioritize the first dynamic queuing event profile, followed by the third dynamic queuing event profile, followed by the second dynamic queuing event profile.

In the depicted example, the maximum confidence level of execution for the second dynamic queuing event profile may, for example, correspond to 5:45 PM. Accordingly, the dynamic queuing engine 155 may associate the second dynamic queuing event profile with a predicted queuing profile associated with 5:45 PM. At 5:45 PM, for example, a confidence level of execution for the second dynamic queuing event profile may be greater than a confidence level of execution for the third dynamic queuing event profile, which may be greater than a confidence level of execution for the first dynamic queuing event profile.

Accordingly, the central orchestration engine 130 may dynamically prioritize service seeking entities in predicted queuing profiles according to their historical behavior. The service provider 120 may be, by way of example and not limitation, the restaurant. The service provider 120 may, for example, reserve service capacity (e.g., tables) for each service seeking entity in order of priority. For example, the service seeking entity 115 may be rewarded for historic timeliness by receiving highest priority at the requested time. The service seeking entity 110 may, for example, advantageously receive highest priority upon arrival 15 minutes earlier than requested. The service seeking entity 105 may, for example, advantageously receive highest priority upon arrival 15 minutes later than requested. The service seeking entity 105 may, for example, advantageously avoid penalization and/or longer wait despite being late to a reservation. The service provider 120 may advantageously allot resources (e.g., wait staff, cooking staff, food, tables) as needed and minimize resources allotted too late and/or too early.

In various embodiments a predicted queuing profile 170 may be regenerated dynamically according to further inputs. For example, a predicted queuing profile 170 may be regenerated in response to a request for service from an additional service seeking entity; a termination of a request for service by at least one of service seeking entities 105, 110, and 115; a change in conditions (e.g., walk-in service requests, accident, traffic, delay of a service seeking entity, weather); or some combination thereof.

As depicted, a single service seeking entity may correspond to one or more individual persons. For example, service seeking entity 105 corresponds to a single individual; service seeking entity 110 corresponds to 2 individuals (e.g., spouses, friends, business associates); and service seeking entity 115 corresponds to 5 individuals (e.g., a party, a church group, a business gathering, a family) Accordingly, a single dynamic queuing event profile may correspond to one or more individuals.

In various embodiments, a service provider may, by way of example and not limitation, include a hospitality service provider (e.g., restaurant, hotel); entertainment services provider (e.g., amusement park, theater); healthcare provider (e.g., medical office, hospital, clinic); professional services provider (e.g., accountant, lawyer, engineer, consultant), industrial, commercial, and/or residential service provider (e.g., manufacturer, transporter, contractor, house inspector, pest control service), or some combination thereof.

Figure 2:
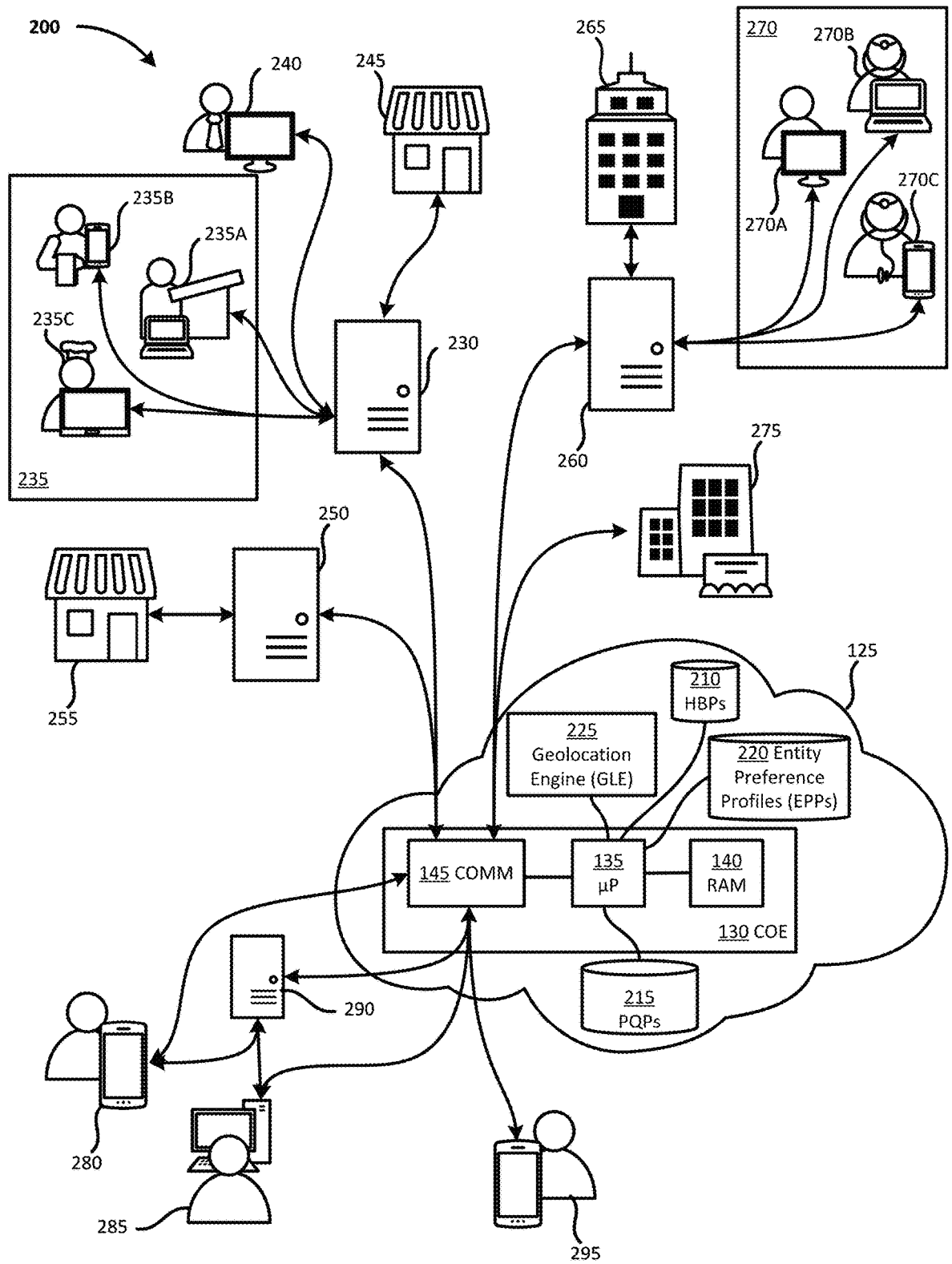
FIG. 2 is a block diagram depicting an exemplary central orchestration engine connecting healthcare and hospitality service providers to service seeking entities.

FIG. 2 is a block diagram depicting an exemplary central orchestration engine connecting healthcare and hospitality service providers to service seeking entities. In the depicted exemplary system 200, the central orchestration system 125 is implemented as a networked (e.g., remote, cloud) system. In addition to the central orchestration engine 130, the central orchestration system 125 is further provided with at least one data store of historical behavior profiles 210 and at least one data store of predicted queuing profiles 215. The central orchestration system 125 is further provided with at least one data store of entity preference profiles (EPPs) 220. The entity preference profiles may, for example, correspond to preferences expressed (e.g., directly expressed and/or stored, determined by machine learning) and/or predetermined by service seeking entities and/or service providers. An entity preference profile may include, by way of example and not limitation, special pricing (e.g., for specific customers, specific times, specific days of the week, specific times of the year, specific confidence levels, specific customer attributes, specific locations, specific products), booking levels (e.g., accept bookings up to a predetermined capacity), confidence interval level preferences (e.g., assign dynamic queuing event profiles a 'guaranteed' status once an associated confidence level reaches a predetermined threshold), geofence zones (e.g., distances, geofence profiles, location preferences), service provider preferences (e.g., types, locations, specific providers), service seeking entity preferences (e.g., historical behavior attributes) or some combination thereof.

As depicted, the central orchestration system 125 is further provided with a geolocation engine (GLE) 225. The GLE 225 may, for example, include circuits (e.g., processor module, RAM module, NVM module, dedicated/integrated circuit module) configured to communicate with geo-positioning devices (e.g., client devices, central devices). The GLE 225 may, for example, be configured to communicate with (remote) geolocating services and/or systems, provide an integrated geolocation system, or some combination thereof. In various embodiments the GLE 225 may retrieve, generate, and/or operate on positions determined by global navigation satellite systems (GNSS) such as, by way of example and not limitation, GPS (USA), GLONASS (Russia), Galileo (European Union), BeiDou (People's Republic of China), QZSS (Japan), IRNSS-NAVIC (India), or some combination thereof. Various embodiments may provide geolocation (GL) data (e.g., associated with a service seeking entity and/or service provider, such as corresponding to at least one dynamic queuing event profile) to the dynamic queuing engine 155 and/or the execution confidence engine 165.

As depicted, the central orchestration engine communicates, via the communication module 145, with a hospitality management system 230. The hospitality management system 230 may, by way of example and not limitation, be a (third-party) table management system, hotel management system, or some combination thereof. The hospitality management system 230 communicates with a hospitality provider 235, a (remote) manager 240, and a restaurant 245.

The hospitality provider 235 includes front staff 235A (e.g., hostess communicating through a laptop, front reservation staff at a hotel/restaurant), wait staff 235B (e.g., waiter communicating through a smartphone), and cook staff 235C (e.g., chef communicating through a tablet). Each may communicate directly and/or indirectly (e.g., through a local management system for hospitality provider 235) with the hospitality management system 230. The hospitality management system 230 may, for example, receive reservations (e.g., walk-in reservations and/or phone reservations taken by the front staff 235A), information on current resource levels (e.g., staff, tables, food, table status from wait staff 235B, order status from cook staff 235C), service provider preferences, or some combination thereof. For example, the hospitality provider 235 may manage available tables and/or rooms using at least one display generated by the hospitality management system 230. The hospitality provider 235 may, for example, input substantially all reservations and/or resource updates into the hospitality management system 230. Accordingly, the hospitality management system 230 may communicate a substantially accurate status (e.g., table inventory, hotel room inventory, conference room inventory, service availability) of the hospitality provider 235 to the central orchestration system 125.

In various embodiments the restaurant 235 may, by way of example and not limitation, be a standalone entity, or be operated as part of a larger entity (e.g., a hotel, amusement park, hospital, car dealership, event center). The manager 240 may, for example, be a (remote) manager of the hospitality provider 235 (e.g., a consultant, an administrative manager at a corporate office). The manager 240 may, for example, monitor performance and/or operations of the hospitality provider 235 via the hospitality management system 230.

The restaurant 245 may, for example, be a small local café informally using the hospitality management system 230. For example, the restaurant 245 may take reservations through the hospitality management system 230 (e.g., through a third-party app and/or website on a mobile device and/or other computing device, not shown), but may provide limited, irregular, or no updates on reservations received via other modes (e.g., walk-in, phone). Accordingly, updates (e.g., of table inventory, service availability) communicated to the central orchestration system 125 by the hospitality management system 230 for the restaurant 245 may be of limited accuracy.

The central orchestration system 125 further communicates with a table reservation system 250. The table reservation system 250 communicates with a restaurant 255 (e.g., via a computing device, not shown). The table reservation system 250 may, for example, be a third-party system and/or service, be dedicated (e.g., proprietary) to the restaurant 255, or some combination thereof.

The central orchestration system 125 further communicates with a healthcare management system 260 (e.g., third-party service/system, remote computing system). The healthcare management system 260 communicates with a hospital 265 (e.g., via a computing network(s), not shown) and a clinic 270. The hospital 265 may, for example, at least partially manage healthcare resources (e.g., beds, appointments, staff, inventory) via the healthcare management system 260. The healthcare management system 260 may communicate updates at least related to relevant resources (e.g., beds, appointments) to the central orchestration system 125.

The clinic 270 includes administrative staff (e.g., receptionist, bookkeeper, office manager) 270A communicating with the healthcare management system 260 via a (desktop, networked) computer. The clinic 270 further includes healthcare professionals (e.g., physicians, nurses, chiropractors, dentists, pharmacists) 270B and 270C communicating with the healthcare management system 260 (e.g., directly, indirectly via a local management system) via computing devices (e.g., smartphone, laptop, mobile device, computing station in a specific room such as lab, office, exam room). The healthcare management system 260 may, for example, manage appointments, staff schedules, and/or other resources for the clinic 270. The healthcare management system 260 may communicate updates related to relevant resources (e.g., appointments) to the central orchestration system 125.

The central orchestration system 125 further communicates directly with a professional services provider 275 (e.g., a law office) via one or more computing devices (not shown). The law office may, for example, provide appointment availability (e.g., by professional service providers, administrative staff, or some combination thereof) to the central orchestration system 125.

The central orchestration system 125 receives requests for service from service seeking entities 280 and 285. The service seeking entities 280 and 285 additionally communicate with a networking system 290. For example, the service seeking entity 280 communicates with the networking system 290 and the central orchestration system 125 via a smartphone. The service seeking entity 285 communicates with the systems via a desktop computer.

The service seeking entities 280 and 285 may, for example, the view availability and/or request service individually and/or as a party with the service providers 235, 245, 255, 265, 270, and/or 275 directly using the central orchestration system 125, the networking system 290, or some combination thereof. For example, the service seeking entity 285 may reserve a table with the restaurant 255 using the central orchestration system 125. The central orchestration system 125 may communicate with the hospitality management system 230 to determine service availability at the requested time, book a reservation, and provide prioritization of the request (e.g., as a dynamic queuing event profile) to the hospitality provider 235.

The service seeking entities 280 and 285 may, for example, communicate with the networking system 290 to form a 'social network' acting as a single service seeking entity. The combined party may, for example, seek to book a table at the restaurant 245. The networking system 290 may communicate with the central orchestration system 125 to provide service availability and/or book a table (e.g., via the hospitality management system 230) for the combined services seeking entity.

The central orchestration system 125 further communicates with a service seeking entity 295 via a mobile device. The service seeking entity 295 may, for example, request an appointment with a physician 270B at the clinic 270. The central orchestration system 125 may communicate with the healthcare management system 260 to determine appointment availability and/or reserve an appointment time. The service seeking entity 295 may, for example, request a video conference with a professional at the professional services provider 275.

The service seeking entity 295 may, for example, communicate directly with the professional services provider 275 via the central orchestration system 125. For example, the central orchestration system 275 may retrieve a schedule from the professional services provider 275 (e.g., already preloaded into an entity preference profile 220 for the service provider, dynamically retrieved from a scheduling system into a random-access memory module of the central orchestration system 125) at and/or around a requested time.

The system 125 may, for example, generate a dynamic queuing event profile. The dynamic queuing event profile may be associated with a predicted queuing profile of the professional services provider 275. The orchestration service may, for example, determine a recommended predicted queuing profile and/or generate a confidence level of execution of the dynamic queuing event profile in response to the request for service from the service seeking entity 295 based on a current location of the service seeking entity 295 and/or professional services provider 275. Accordingly, a service seeking entity and service provider may advantageously coordinate an event in at least one dynamically prioritized queue.

Figure 3:
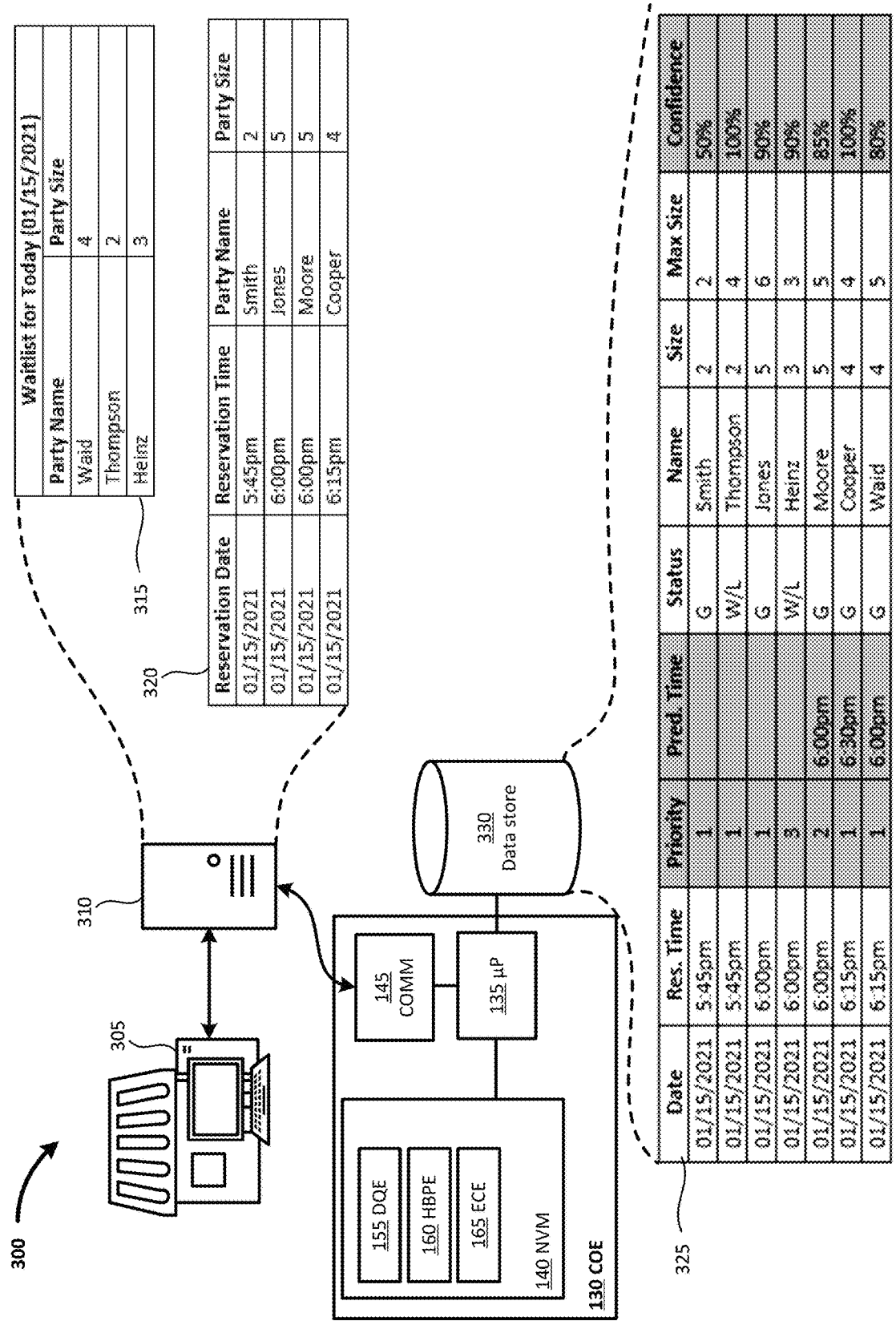
FIG. 3 depicts a combined waitlist and reservation list generated by the exemplary central orchestration engine for an exemplary service provider.

FIG. 3 depicts a combined waitlist and reservation list generated by the exemplary central orchestration engine for an exemplary service provider. In the depicted scenario 300, a service provider (e.g., a restaurant) 305 communicates via a computing system with a management system 310 (e.g., a third-party table management service hosted on at least one remote server). The service provider 305 may, for example, input available service times, service resources (e.g., tables, menus), or some combination thereof into the management system 310. The management system 310 may receive, for example, requests for and/or reservations of service (e.g., from a third-party service, from the service provider 305, directly from patrons). The management system 310 may generate reservations and waitlist requests in response to the requests for and/or reservations of service. In the depicted example, the management system 310 generates a waitlist 315 for the service provider 305 corresponding to requests for service for a particular day. The waitlist 315 includes a party identification (e.g., requestor last name) and a party size. In the depicted example, the management system 310 further generates a reservation list 320 corresponding a reservation date, reservation time, entity identifier (e.g., requestor last name) and party size. The reservation list may, for example, correspond to requests for service which are guaranteed to receive service at the reserved date and time. The waitlist may, for example, correspond to requests for service which have not (yet) been guaranteed service at the requested date.

The management system 310 communicates with the central orchestration engine 130 via the communication module 145. The central orchestration engine 130 may, for example, receive from and/or transmit to the management system 310 information corresponding to the reservations (e.g., depicted in the reservation list 320) and waitlisted requests for service (e.g., depicted in the waitlist 315). The central orchestration engine 130 generates an integrated service request list 325 in response to requests for service depicted in tables 315 and 320. As depicted, the service request list 325 includes the requested date, time, entity identifier, and party (service seeking entity) size. The request list 325 is stored by the central orchestration engine 130 (e.g., via the microprocessor 135) in a data store 330. The data store 330 may, for example, be integrated into the central orchestration system 125, be a remote data store, or some combination thereof.

Each request list 325 may, for example, correspond to a dynamic queuing event profile generated by the central orchestration engine 130 in response to the associated request for service (e.g., received via the management system 310). The central orchestration engine 130 may retrieve and/or generate a historical behavior profile for each service seeking entity the service provider 305 via the historical behavior profile engine 160. The central orchestration engine 130 enriches each dynamic queuing event profile in the request list 325 with a confidence level of execution ("Confidence"), which may be generated by the execution confidence engine 165 based at least partially on at least one corresponding historical behavior profile. The dynamic queuing engine 155 may, for example, generate an expected maximum size ("Max Size") of the service seeking entity. As depicted, the table 325 is enriched with the expected maximum size by the central orchestration engine 130. In some embodiments the expected maximum size may be received from a representative of the service seeking entity (e.g., via the management system 310).

The dynamic queuing engine 155 may generate predicted queuing profiles associated with each time interval (e.g., predetermined as 15-minute intervals) for the service provider 305. The dynamic queuing engine 155 may dynamically prioritize the service seeking entities associated with each predicted queuing profile. For example, each predicted queuing profile may be prioritized according to the associated confidence level of execution. As depicted, the central orchestration engine 130 enriches the table 325 with the priority level associated with each dynamic queuing event profile. For example, a priority level of "1" may be associated with highest priority. A priority level above 3 may, for example, correspond to guaranteed service.

The central orchestration engine 130 further enriches the table 325 with a status of each dynamic queuing event profile. The status may, for example, correspond to "G" (e.g., for guaranteed) and/or "W/L" (e.g., for waitlist). The status may, for example, be determined based on whether the dynamic queuing event profile list generated in response to an entry in the waitlist table 315 or the reservation list table 320, based on the priority level in the associated predicted queuing profile, or some combination thereof. For example, the central orchestration engine 130 may receive requests for service via the management system 310, generate and prioritize dynamic queuing event profiles in response, and provide data to the management system 310 corresponding to predicted queuing profiles. The management system 310 may, for example, populate the tables 315 and 320 according to a priority and/or status determined by the central orchestration engine 130 (e.g., depicted in the table 325).

Accordingly, the central orchestration engine advantageously dynamically coordinated and prioritized request for service by service seeking entities for a service provider 305. The central orchestration engine 130 may, for example, be advantageously integrated with existing services, systems, and/or infrastructure. In various embodiments the central orchestration engine 130 may, for example, replace the management system 310.

Figure 4:
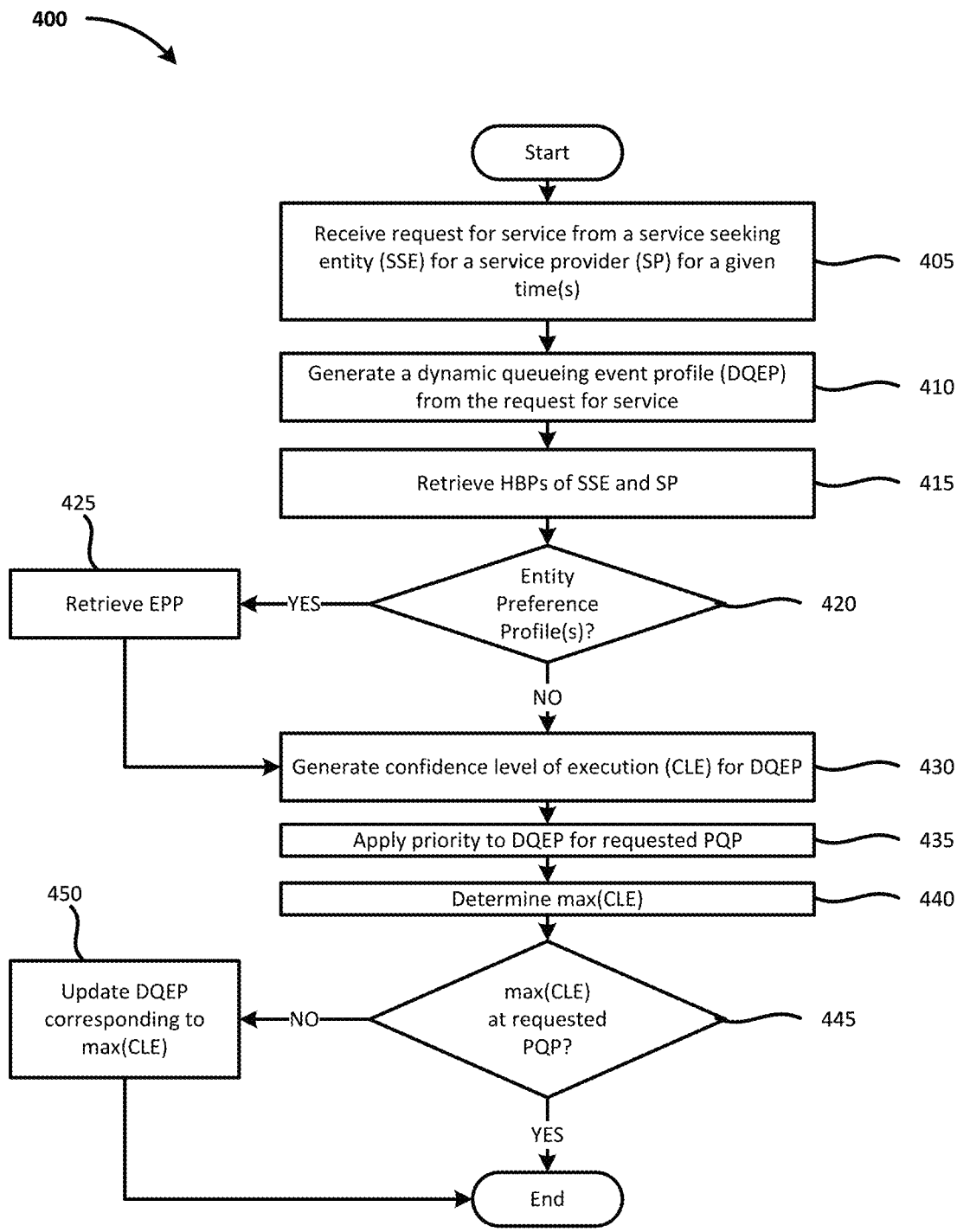
FIG. 4 depicts an exemplary method of dynamic prioritization.

FIG. 4 depicts an exemplary method of dynamic prioritization. In the depicted method 400, a request for service is received 405 from a service seeking entity requesting service from a service provider at a given time. The request for service may, for example, be received by the central orchestration engine 130. The request for service may be received from the service seeking entity, may be received via the service provider, or some combination thereof. The request may, for example, be communicated via at least one user device (e.g., mobile device, laptop computer, web interface). The request for service may, for example, be transmitted to the central orchestration engine 130 directly from the user's device, through a third-party (e.g., a management system, a reservation service).

In response to the request for service, a dynamic queuing event profile is generated 410. At least one historical behavior profile corresponding to at least one of the service seeking entity and the service provider is retrieved 415. The historical behavior profile may, for example, be retrieved from the data store 210 via the historical behavior profile engine 160. If at least one entity preference profile is associated 420 with at least one of the entities (e.g., the service provider, the service seeking entity), then the associated entity preference profile(s) is retrieved 425 (e.g., from the data store 220).

A confidence level of execution is then generated 430 for the dynamic queuing event profile based on the historical behavior profile(s) and the entity preference profile(s). If no entity preference profile exists, then the confidence level of execution is generated 430 based at least on the historical behavior profile(s). In some embodiments if no historical behavior profile exists for the service provider and/or the service seeking entity, then a historical behavior profile(s) may be generated. For example, the historical behavior profile may be generated and contain at least an identifier of the entity and an association with the dynamic queuing event profile. In various embodiments the historical behavior profile engine 160 may, for example, update the historical behavior profile(s) with an outcome of the dynamic queuing event (e.g., cancellation, successfully execution, time of execution, wait time until execution, no show).

Once the confidence level of execution is generated 430 for the dynamic queuing event profile, a priority is applied 435 to the dynamic queuing event profile for a predicted queuing profile for the service provider at the time requested by the service seeking entity. For example, the priority may be determined as a function of the confidence level of execution. In various embodiments a higher confidence level of execution (e.g., relative to other dynamic queuing event profiles associated with the predicted queuing profile) may correspond to a higher priority in the queue. Accordingly, the service provider may advantageously allocate service and/or other resources to those most likely to benefit from it.

A maximum possible confidence level of execution is determined 440 for the dynamic queuing event profile. For example, the historical behavior profile of the service provider may correlate to a tendency of the service provider to have a wait time of approximately five minutes. The historical behavior profile of the service seeking entity may correlate to a tendency of the service seeking entity to be approximately ten minutes late. Accordingly, a maximum confidence level of execution of the requested service represented by the dynamic queuing event profile may correspond to a predicted queuing profile for a time ten minutes after the time requested by the service seeking entity.

If the maximum confidence level of execution corresponds 445 to a time other than the predicted queuing profile associated with the requested time, then the dynamic queuing event profile is updated 450 to (additionally) correspond to a second predicted queuing profile for the time associated with the maximum confidence level of execution and the process ends. If the maximum confidence level of execution corresponds 445 to the predicted queuing profile associated with the requested time, then the process ends.

In various embodiments further steps may update the historical behavior profile based on the behavior of the service seeking entity and/or the service provider associated with the dynamic queuing event profile. For example, attributes of the dynamic queuing event profile (wait time, time of day requested, date requested, how far in the future the request was made, outcome of the dynamic queuing event, party size requested, party size which arrived for service, time of arrival for service, wait time, customer satisfaction) may be extracted by the historical behavior profile engine 160. The historical behavior profile engine 160 may, for example, update the corresponding historical behavior profile(s) as a function of the extracted attributes.

For example, various embodiments the historical behavior profile engine 160 may apply machine learning algorithms (e.g., classifiers, neural networks) to the dynamic queuing event profile, predicted queuing profile(s), the historical behavior profile(s), or some combination thereof, to update the historical behavior profile(s). Accordingly, the historical behavior profile of an entity may be advantageously updated to accurately reflect behavior of the entity. Accordingly, the dynamic queuing engine 155 and/or the execution confidence engine 165 may advantageously increase in accuracy of predicting confidence level of execution and/or prioritizing a queue.

In various embodiments the dynamic queuing engine 155 and/or the execution confidence engine 165 may include machine learning algorithms including, by way of example and not limitation, classifiers, neural networks, supervised learning, unsupervised learning, or some combination thereof. For example, historical dynamic queuing event profiles may be used in a training mode to generate a set of training requests for service corresponding to known outcomes of the request. At least one machine learning algorithm may be applied to the set(s) of training requests to generate a dynamic queue prioritization model (e.g., by and/or for application by the dynamic queuing engine 155) and/or an execution confidence model (e.g., by and/or for application by the execution confidence engine 165). Historical dynamic queuing event profiles may, for example, be used to generate at least one set of test requests for service.

A generated model(s) may be applied to the set(s) of test requests for service. The corresponding historical dynamic queuing event profiles may further be used to generate known test outcomes of the request for service. Outputs (e.g., prioritization, confidence level of execution) generated by the model(s) when applied to the set(s) of test requests for service may be compared to the corresponding set(s) of test outcomes. If the difference between the output and the set(s) of test outcome is below at least one (predetermined) training accuracy threshold, then the model may be considered trained and may, for example, be applied in production. If the difference is above the training accuracy threshold(s), then training steps may be repeated until the model may be considered trained. Accordingly, the central orchestration engine 130 may advantageously predict execution and/or prioritize queues based on historical behavior profiles.

Figure 5:
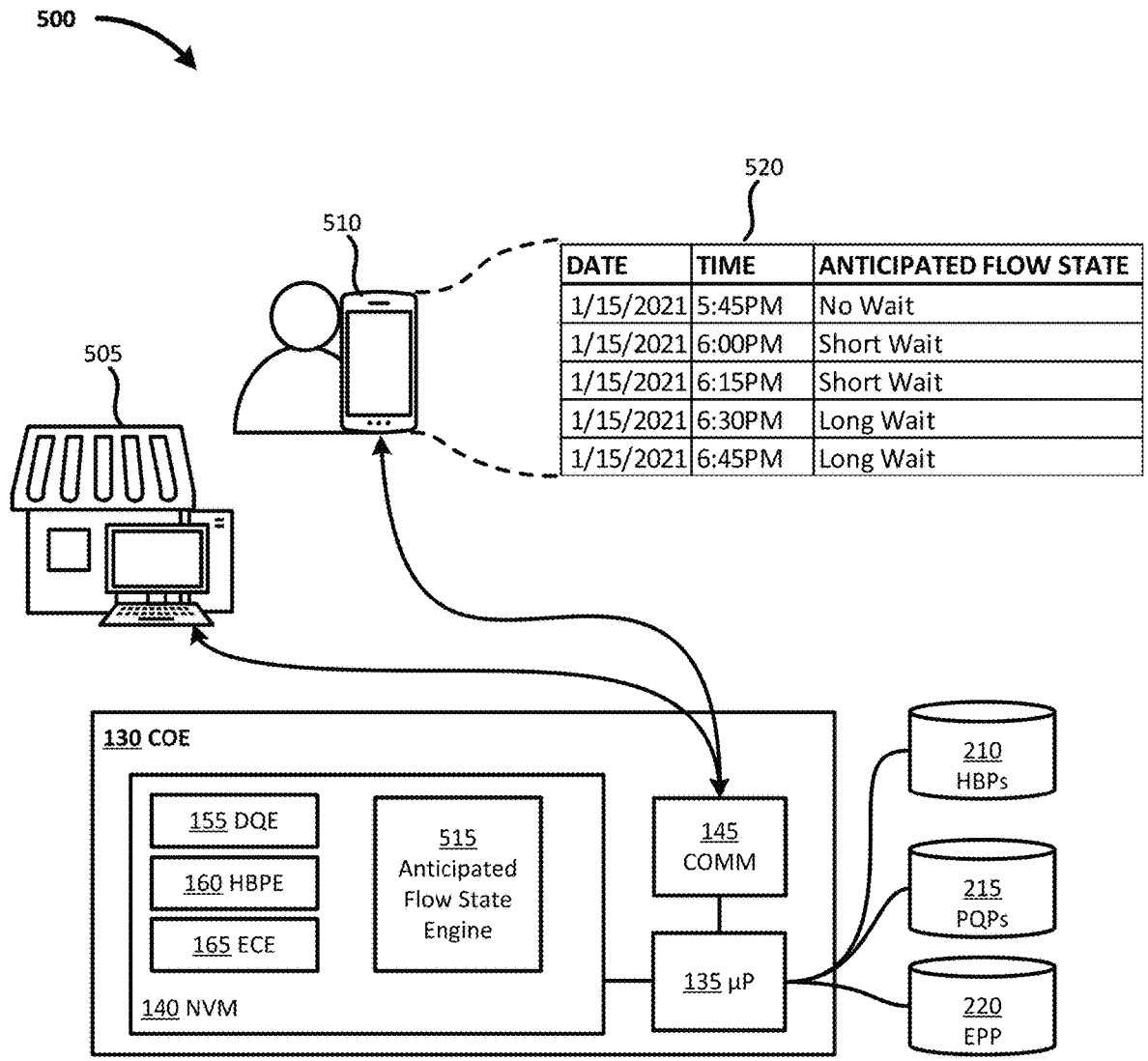
FIG. 5 depicts an exemplary anticipated flow state (AFS) provided to a user depicting an exemplary AFS profile generated by an exemplary AFS engine for an exemplary service provider.

FIG. 5 depicts an exemplary anticipated flow state (AFS) provided to a user depicting an exemplary AFS profile generated by an exemplary AFS engine for an exemplary service provider. In the depicted scenario 500, a service provider 505 communicates with the central orchestration engine 130 via the communication module 145 using at least one computing device. A service seeking entity 510 corresponds with the central orchestration engine 130 via a smartphone. The service seeking entity 510 may, for example, inquire about service from the service provider 505 at a time of 6:15 PM on Jan. 15, 2021. For example, the service seeking entity 510 may, for example, not actually want to request service (yet), but may want to determine if an expected (e.g., predicted) wait time is acceptable at a desired time. The entity 510 may, for example, wish to choose another time and/or other service provider if the wait time is unacceptable.

Accordingly, the central orchestration engine 130 receives the inquiry (e.g., as a 'tentative' request for service). The processor 135 operates an anticipated flow state engine (AFSE) 515 (e.g., embodied as a program of instructions on at least one memory module) to determine an anticipated flow state (AFS) of the service provider at the requested time and surrounding times. The central orchestration engine 130 may generate a display and/or provide data used in generating a display for the user corresponding to an anticipated flow state of the service provider at multiple times corresponding to the time of service requested in the inquiry from the entity 510. In the depicted example, the requesting entity 510 is provided with a display 520 of anticipated flow state at the requested time (6:15 PM) and times (e.g., determined by queue intervals, such as in an entity preference profile for the service provider 505) before and after the requested time. Accordingly, the entity 510 may advantageously determine whether to request service at the requested time based on a predicted wait time. For example, the entity 510 may choose to request service at 5:45 PM (30 minutes earlier than originally considered) to have no expected wait for service (e.g., which may provide a 'guaranteed' reservation).

The anticipated flow state engine 515 may interact with the dynamic queuing engine 155, the historical behavior profile engine 160, the execution confidence engine 165, or some combination thereof. For example, the anticipated flow state engine may determine an anticipated flow state at a particular time as a function of historical behavior profile(s) 210 of the service provider 505 and/or the entity 510, predicted queuing profiles 215 corresponding to the particular time, entity preference profiles 220 of the service provider 505 and/or the entity 510, or some combination thereof.

The anticipated flow state engine 515 may, for example, determine an anticipated flow state as a function of predicted queuing profile(s) associated with and/or surrounding the requested time. The predicted queuing profile(s) may be determined by the dynamic queuing engine 155 based at least on a confidence level(s) of execution determined by the execution confidence engine 165 for dynamic queuing event profile(s) associated with the predicted queuing profile(s). The confidence level(s) of execution may be a function at least of historical behavior profiles for the corresponding service seeking entities and the service provider 505. Accordingly, the anticipated flow state engine 515 may advantageously predict an expected experience of the entity 510 as a function of historical behavior and/or preferences of the service provider 505, entity 510, other service seeking entities, or some combination thereof.

Figure 6:
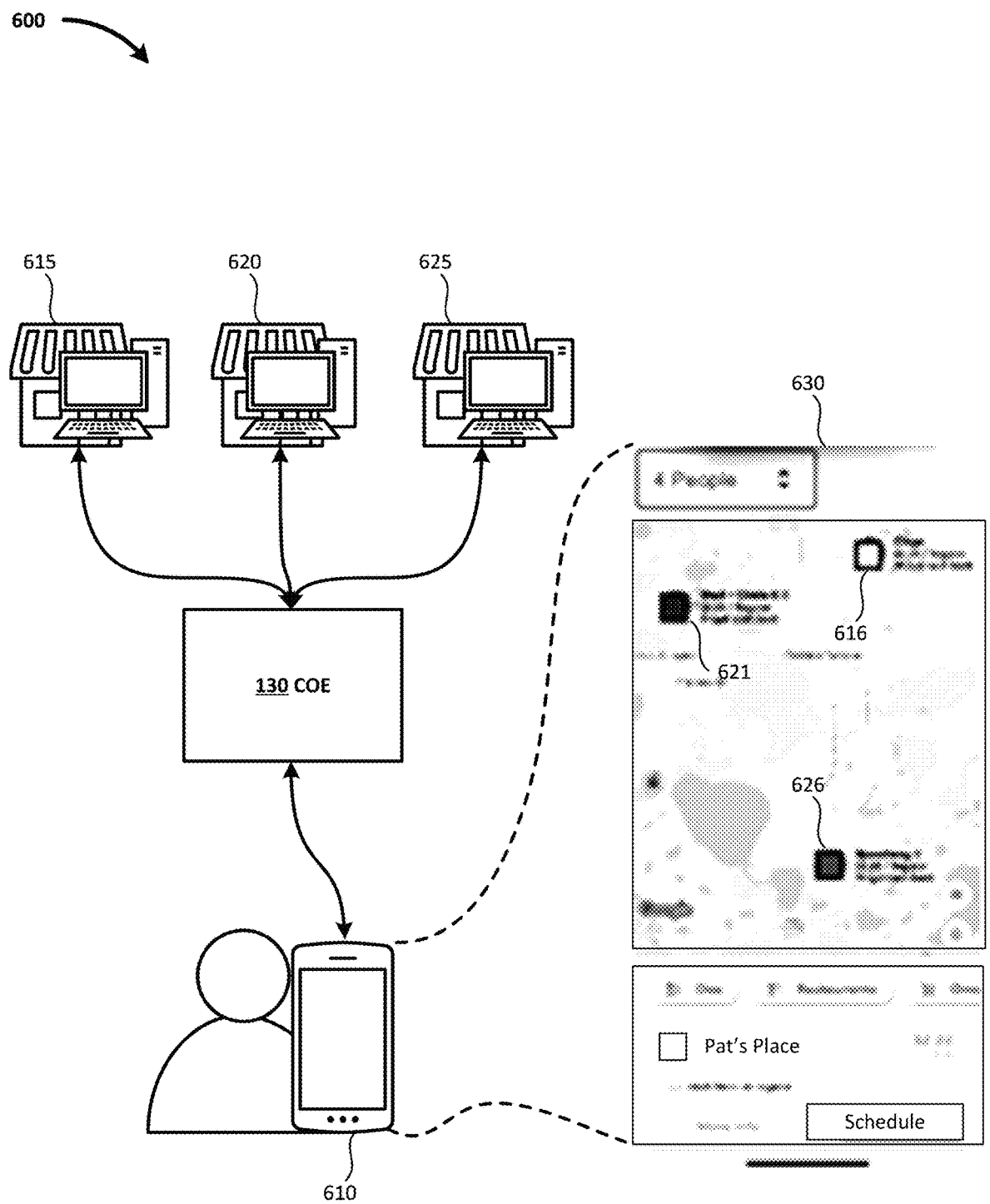
FIG. 6 depicts an exemplary display generated by the central orchestration engine depicting AFSs for exemplary service providers.

FIG. 6 depicts an exemplary display generated by the central orchestration engine depicting AFSs for exemplary service providers. In the depicted example 600, a service seeking entity 610 communicates with the central orchestration engine 130 via a mobile device. Service providers 615, 620, and 625 communicate with the central orchestration engine using respective (networked) computing devices. The entity 610 may, for example, request a geographically distributed list of service providers matching certain attributes. The entity 610 may, for example, further request an anticipated flow state of the service providers. For example, the entity 610 may search (e.g., via a map interface) for fast-food restaurants within 5 miles of a given location (e.g., a current location, a planned location) for a given party size (e.g., 4 people, as depicted). The entity 610 may, for example, request an anticipated flow state of the restaurants at a given time (e.g., immediately in the future, at a given date/time in the future).

The central orchestration engine 130 may determine (e.g., using the anticipated flow state engine 515) an anticipated flow state of each service provider 615, 620, and 625, respectively at the requested time based at least on a historical behavior profile(s) of each service provider and/or the entity 610, and data corresponding to the requested time (e.g., table availability, reservations, requests for service, current predicted queuing profiles and/or dynamic queuing event profiles). A geographical (e.g., map) display 630 may then be generated containing visual indicia of the anticipated flow state of each service provider at the requested time.

As depicted, the display 630 includes a visual indicium 616 indicating a first anticipated flow state corresponding to the service provider 615, a visual indicium 621 indicating a second anticipated flow state corresponding to the service provider 620, and a visual indicium 626 indicating a third anticipated flow state corresponding to the service provider 625. By way of example and not limitation, the visual indicum 616 may correspond to a 'no wait' (e.g., service in 0-5 minutes) flow state, the visual indicium 621 may correspond to a 'short wait' (e.g., service in 6-15 minutes) flow state, and the visual indicum 626 may correspond to a 'long wait (e.g., service in 16+ minutes) flow state. In various embodiments flow state may, by way of example and not limitation, be given in expected wait time (e.g., minutes), in predetermined ranges (e.g., no wait, short wait, long wait), or some combination thereof.

The user may, for example, provide input (e.g., touch, tap, click) selecting the visual indicia 616. The central orchestration engine 130 and/or a program of instructions (e.g., an app) being executed on the mobile device of the entity 610 may generate a (further) display depicting details of the service provider 615 (e.g., name, address, phone, email, website, menu, prices, reviews, nearby locations). As depicted, the display generated may include a visual indicia (depicted as "Schedule") prompting the entity 610 to submit a request for service (e.g., a scheduling request). Accordingly, the user may advantageously select a desired service provider with a desired and/or acceptable anticipated flow state and submit a request for service. The central orchestration engine 130 may receive the request for service and generate a dynamic queuing event profile. The central orchestration engine 130 may further dynamically prioritize the dynamic queuing event profile in at least one predicted queuing profile. The central orchestration engine 130 may, for example, provide a reservation status (e.g., waitlist, guaranteed) to the user. In various embodiments the display 630 may further include at least one visual indicium prompting the entity 610 to change a time and/or location of inquiry, a party size, or some combination thereof, if desired.

Figure 7:
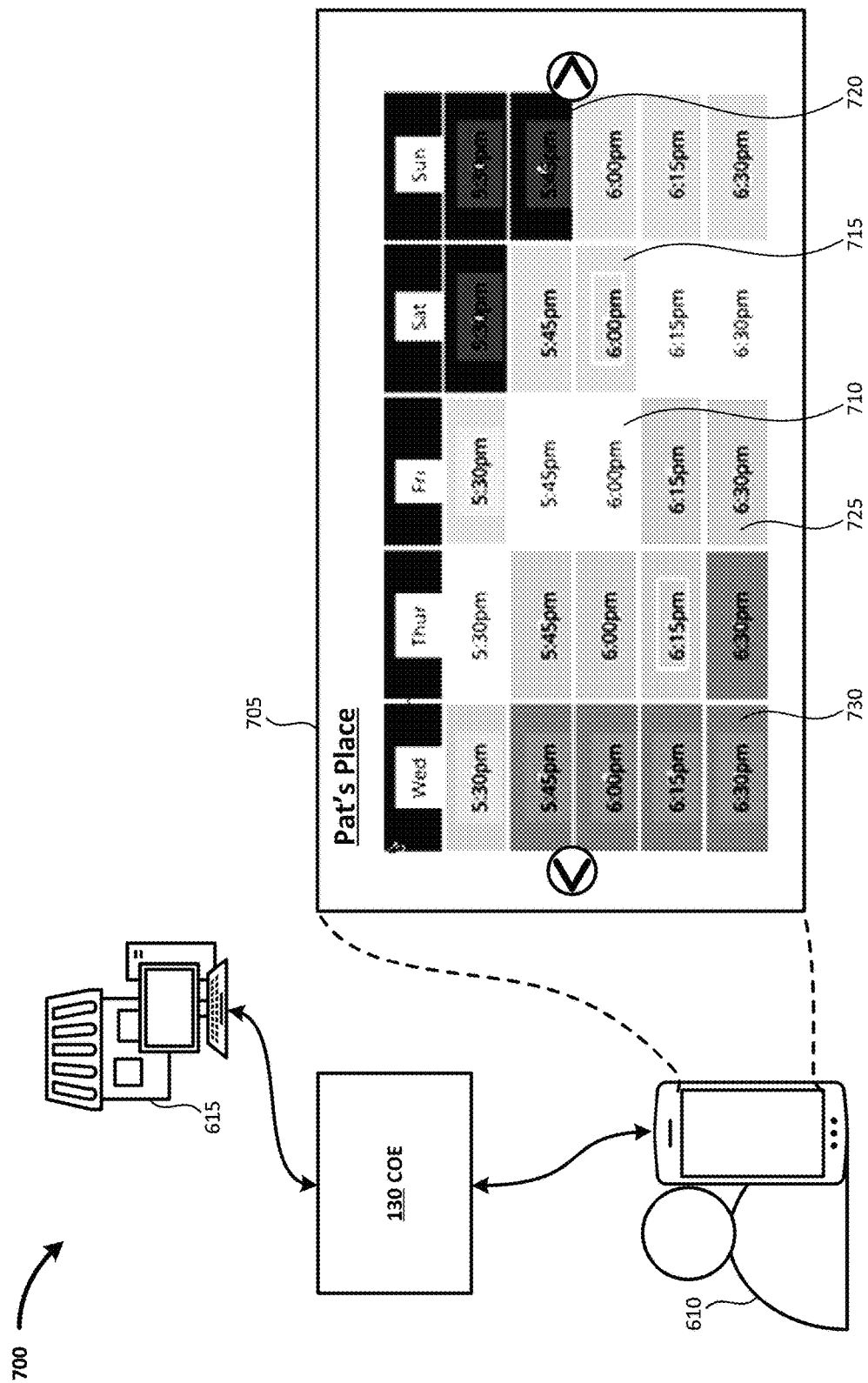
FIG. 7 depicts an exemplary display generated by the central orchestration engine depicting exemplary AFSs corresponding to future predicted queuing profiles of an exemplary service provider.

FIG. 7 depicts an exemplary display generated by the central orchestration engine depicting exemplary AFSs corresponding to future predicted queuing profiles of an exemplary service provider. In the depicted scenario 700, the service seeking entity 610 may inquire, through the central orchestration engine 130 via the mobile device, about service from the service provider 615 at a future time (e.g., later in the day, another day). The entity 610 may, for example, on a Wednesday, desire to reserve guaranteed service with the service provider 615 for 6:00 PM on the following Friday.

The central orchestration engine 130 may, for example, generate a profile of anticipated flow states across multiple predicted queuing profiles. As depicted, the central orchestration engine 130 generates a profile of anticipated flow states across predicted queuing profiles spanning from 30 minutes before to 30 minutes after the requested time across two days before the requested day to two days after the requested day. The central orchestration engine 130, the mobile device of the entity 610, and/or another computing device generates a display 705 of the anticipated flow state profile for the service provider 615. The display 705 includes visual indicia of anticipated flow state at predicted queuing profiles included in the anticipated flow state profile. Accordingly, the entity 610 may advantageously (e.g., at a glance) select a desired intersection of anticipated flow state (e.g., corresponding to expected wait time to service) and time/date.

For example, in the depicted example, the display 705 indicates that 5:45 PM and 6:00 PM on Friday (as well as 5:30 PM Thursday and 6:15-6:30 PM Saturday) correspond to a first anticipated flow state 710 (e.g., a wait of approximately 30 minutes which may, for example, be indicated by a yellow color). The display 705 further indicates that 5:30 PM Friday, 5:45-6:00 PM Saturday, and 6:00-6:30 PM Sunday correspond to a second anticipated flow state 715 (e.g., a wait of approximately 45 minutes which may, for example, be indicated by a darker yellow/mustard color). The display 705 further indicates that 5:30 PM Saturday and 5:30-5:45 PM Sunday correspond to a third anticipated flow state 720 (e.g., a wait of approximately 60 minutes which may, for example, be indicated by a red color). The display 705 further indicates that 5:30 PM Wednesday and 5:45-6:15 PM Thursday correspond to a fourth anticipated flow state 725 (e.g., a wait of approximately 15 minutes which may, for example, be indicated by a yellow-green color). The display 705 further indicates that 5:45-6:30 PM Wednesday corresponds to a fifth anticipated flow state 730 (e.g., a wait of approximately less than 5 minutes which may, for example, be indicated by a green color). As depicted, the display 705 further includes left and right arrows which may serve as input prompts for the entity 610 to browse other times and/or dates. Accordingly, the entity 610 may advantageously quickly visually identify a desired time to request service.

For example, the entity 610 may send a request for service (e.g., by tapping the corresponding time on an interface showing the display 705) for 6:00 PM Wednesday. The central orchestration engine 130 may generate a dynamic queuing event profile associated with the request and prioritize the dynamic queuing event profile into a guaranteed position in the corresponding predicted queuing profile for the service provider 615. The entity 610 may, for example, further send an indication in the request for service of a preferred time of 6:00 PM on Friday. The central orchestration engine 130 may further associate the dynamic queuing event profile with a predicted queuing profile associated with the preferred time. The dynamic queuing event profile may, for example, be associated with a waitlist status in the predicted queuing profile for the preferred time.

As the predicted queuing profile is dynamically updated by the central orchestration engine 130, if the dynamic queuing event profile is raised to a confidence level of execution corresponding to a guaranteed status, the central orchestration engine 130 may provide the entity 610 with the option of canceling from the queue for 6:00 PM Wednesday and confirming a reservation for 6:00 PM Friday. In response to a confirmation from the entity 610, the central orchestration engine 130 may disassociate the dynamic queuing event profile from the predicted queuing profile for 6:00 PM Wednesday and associate the dynamic queuing event profile with a guaranteed status for the predicted queuing profile of 6:00 PM Friday. Accordingly, the entity 610 may advantageously join a waitlist for a desired time and secure a guaranteed time based on an anticipated flow state.

Figure 8:
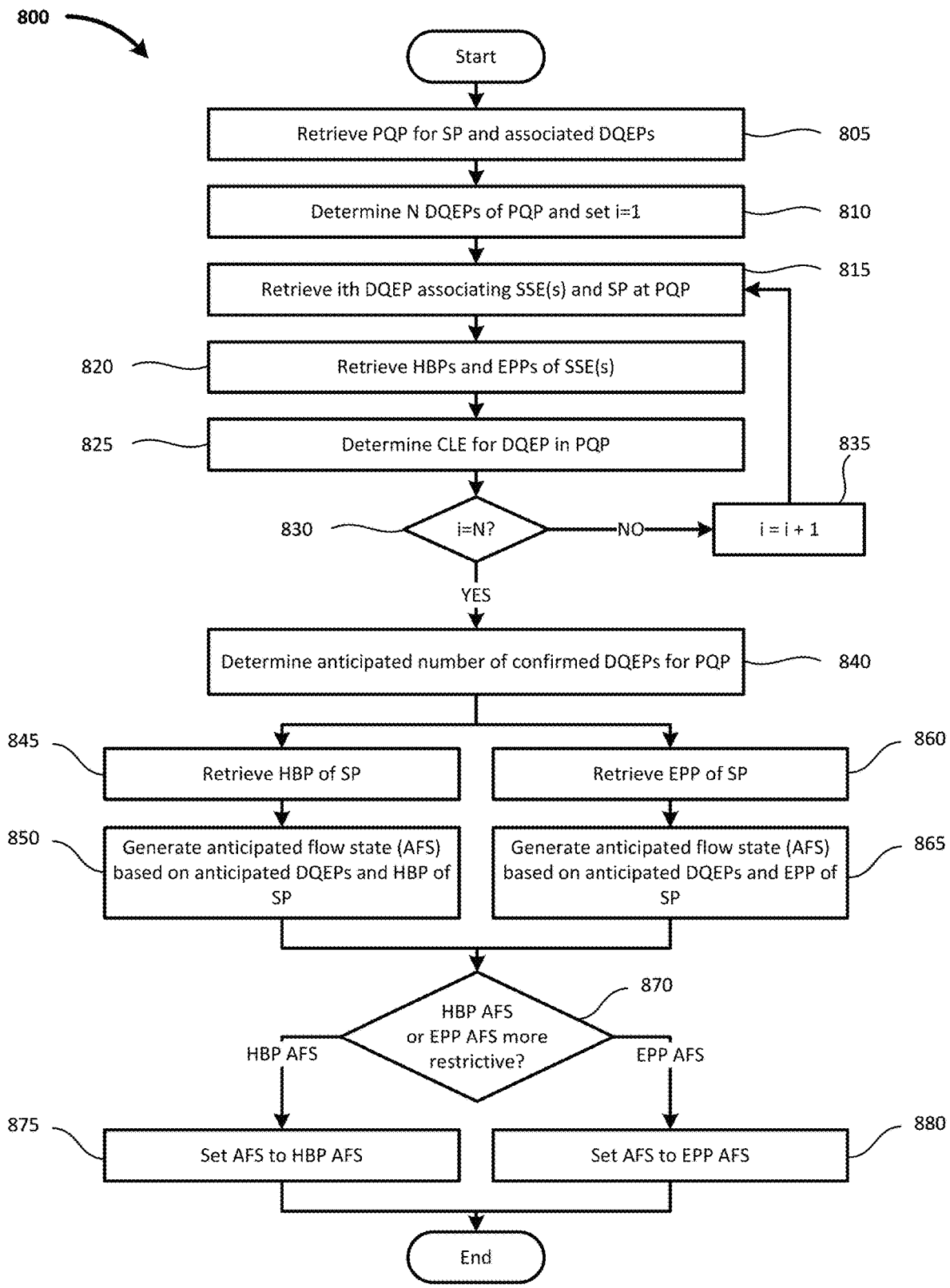
FIG. 8 depicts an exemplary method of generating an AFS.

FIG. 8 depicts an exemplary method of generating an AFS. In the depicted method 800 a predicted queuing profile, and dynamic queuing event profiles associated therewith, are retrieved 805 (e.g., from data store 215 by the dynamic queuing engine 155 and/or the anticipated flow state engine 515) for a service provider. A number (N) of the dynamic queuing event profiles associated with the predicted queuing profile is determined 810, and a counting variable (i) is initiated (set to 1 in the depicted example).

The dynamic queuing event profile associated with the current value of the counting variable is retrieved 815 and at least one corresponding service seeking entity is determined. At least one historical behavior profile and/or entity preference profile associated with the at least one service seeking entity is retrieved 820 (e.g., by the historical behavior profile engine 160, from the data store 210, from data store 220). A confidence level of execution is determined 825 (e.g., by the execution confidence engine 165) for the currently selected dynamic queuing event profile based on the retrieved historical behavior profile(s) and/or entity preference profile(s). Each determined confidence level of execution may, for example, be associated with the corresponding dynamic queueing event profile.

If the counting variable does not equal N 830 (e.g., all dynamic queuing event profiles associated with the predicted queuing profile have not been considered), then the counting variable is incremented 835 and the steps 815 through 830 are repeated. Once the counting variable equals N 830 (e.g., all the dynamic queuing event profiles associated predicted queuing profile the been considered), then an anticipated number of confirmed dynamic queuing event profiles are determined 840. In various embodiments the anticipated number of confirmed dynamic queuing event profiles may correspond, by way of example and not limitation, to a number of dynamic queuing event profiles having a confidence level of execution above a (predetermined) confidence threshold. Accordingly, an expected actual demand for service at the time represented by the predicted queuing profile may be advantageously predicted.

In the depicted example, at least one historic behavior profile associated with the service provider is retrieved 845. An anticipated flow state is then generated 850 based on the anticipated confirmed dynamic queueing event profiles (e.g., at least as a function of the corresponding confidence levels of execution) and the historic behavior profile of the service provider. Further, at least one entity preference profile of the service provider is retrieved 860, and an anticipated dynamic queueing event profile is generated 865 based on the anticipated confirmed dynamic queueing event profiles and the entity preference profile (e.g., maximum allowed wait time preference, inventory denoted as available).

If the anticipated flow state generated as a function of the historic behavior profile of the service provider is more restrictive 870 (e.g., indicating a busier flow state/lower inventory of available service resources) than the anticipated flow state generated as a function of the entity preference profile of the service provider, then the anticipated flow state generated as a function of the historic behavior profile is used to set 875 the anticipated flow state of the service provider for the predicted queuing profile. If the reverse is true (the entity preference profile based anticipated flow state is more restrictive then the historic behavior profile based anticipated flow state), then the anticipated flow state generated as a function of the entity preference profile is used to set 880 the anticipated flow state of the service provider for the predicted queuing profile. Accordingly, an anticipated flow state may be advantageously dynamically determined for a service provider for a predicted queuing profile (e.g., corresponding to a future time). In some embodiments the anticipated flow state may be directly set as a function of the both the entity preference profile(s) and the historic behavior profile(s) of the service provider.

In various embodiments the method 800 may be repeated for other predicted queuing profiles. The display 705 may, by way of example and not limitation, be generated using results of the method 800 for a predicted queuing profile associated with each displayed time (queue). In various embodiments the method 800 may be subsequently repeated for a predicted queuing profile to dynamically update the associated anticipated flow state.

Figure 9:
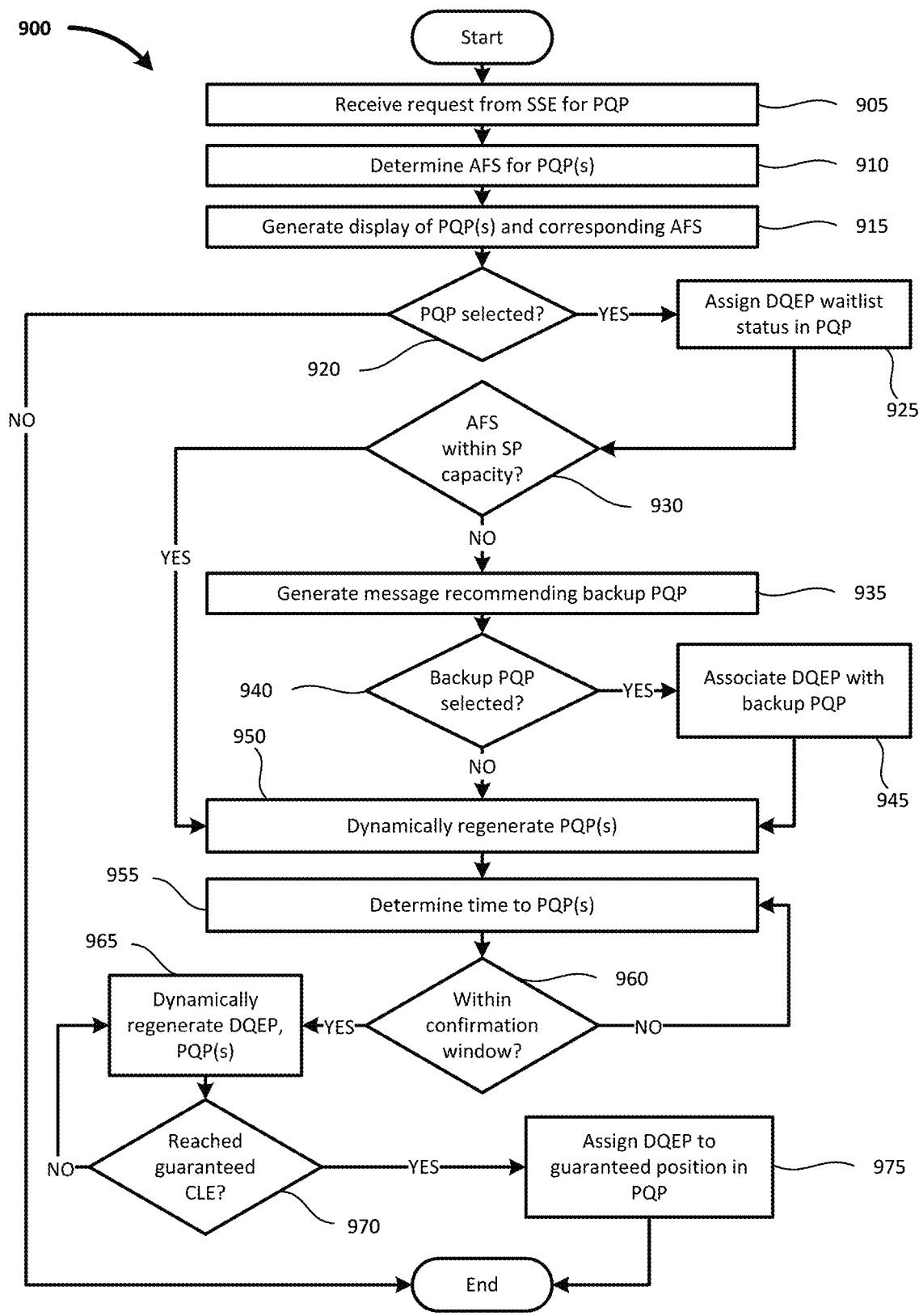
FIG. 9 depicts an exemplary method of dynamic prioritization and queue recommendations based on AFSs.

FIG. 9 depicts an exemplary method of dynamic prioritization and queue recommendations based on AFSs. In the depicted method 900, a request is received 905 from a service seeking entity for at least one particular predicted queuing profile (e.g., a specific time with at least one specific service provider). In various embodiments a dynamic queueing event profile may, for example, be generated in response to the request for service. An anticipated flow state is determined 910 for the predicted queuing profile(s) (e.g., using method 800). A display is generated 915 of available predicted queuing profile(s) and a corresponding anticipated flow state of the service provider(s).

If no input signal is received 920 indicating that the service seeking entity has selected at least one predicted queuing profile, then the method ends. If an input signal(s) is received 920 indicating that the service seeking entity has selected at least one predicted queuing profile (e.g., corresponding to an anticipated flow state more restrictive than a predetermined 'guaranteed' status threshold), then a waitlist status is assigned 925 to the dynamic queueing event profile in the predicted queuing profile. If the anticipated flow state is not within a capacity of the service provider 930 (e.g., as determined by an entity preference profile and/or historic behavior profile of the service provider), then a message (e.g., audio, text, video, popup) is generated 935 for the service seeking entity recommending selection of a backup predicted queuing profile. In various embodiments, for example, the service seeking entity may be presented with one or more predicted queuing profiles which may be available (e.g., by proactively performing prioritization of a hypothetical request for service, by identifying unfilled predicted queuing profiles) for reservation (e.g., receiving a 'guaranteed' status).

If a signal(s) is received 940 corresponding to a selection by the service seeking entity of a backup predicted queuing profile, then the dynamic queueing event profile is associated 945 with the backup predicted queuing profile (e.g., with a 'guaranteed' status). Once the dynamic queueing event profile is associated with the backup predicted queuing profile(s) 945, or no backup predicted queuing profile(s) is selected 940, or if the anticipated flow state is within the service provider capacity 930, then the selected predicted queuing profile(s) is dynamically regenerated 950. In various embodiments each predicted queuing profile associated with the dynamic queueing event profile may, by way of example and not limitation, be regenerated in response to a change in priority, a cancelled request for service, a new request for service, a change in environment, a change in schedule of a service seeking entity, a change in historic behavior profile and/or entity preference profile of a service seeking entity and/or service provider associated with the predicted queuing profile(s), a change in confidence level of execution of a service seeking entity and/or service provider associated with the predicted queuing profile(s), or some combination thereof.

A time difference between the predicted queuing profile and a current time is (repeatedly) determined 955 until the time difference is within a (predetermined) confirmation window 960 (e.g., as determined by an entity preference profile(s) of the service provider and/or service seeking entity). In various embodiments the confirmation window may, for example, correspond to a (predetermined) window of time before the predicted queuing profile in which the service seeking entity may 'confirm' their reservation to achieve a higher confidence level of execution (e.g., which may correspond to a higher priority in the predicted queuing profile). Once the time until the predicted queuing profile is within the confirmation window 960, then the dynamic queueing event profile and associated predicted queuing profiles are dynamically regenerated 965. For example, the dynamic queueing event profile may be updated based on whether a signal(s) from the service seeking entity has been received confirming intent to appear at the requested time for service.

In various embodiments, by way of example and not limitation, dynamically regenerating predicted queuing profile(s) in step 965 may include generating an updated confidence level of execution in the predicted queuing profile(s) regenerated in 955, updating other predicted queuing profile(s) associated with the dynamic queueing event profile as a result of a change in confidence level of execution of the dynamic queueing event profile (e.g., if the dynamic queueing event profile is more likely to execute in a first predicted queuing profile, a confidence level of execution in a backup predicted queuing profile may be reduced), or some combination thereof.

If the confidence level of execution of the dynamic queueing event profile in the preferred predicted queuing profile has reached the threshold associated with a guaranteed status 970 (e.g., after receiving confirmation from the service seeking entity, after cancellation of higher priority service seeking entities), then the dynamic queueing event profile is assigned 975 a guaranteed status in the preferred predicted queuing profile, and the method ends. If the dynamic queueing event profile has not reached the threshold 970, then steps 950-970 are repeated. Accordingly, a service seeking entity may, by way of example and not limitation, advantageously reserve a backup 'guaranteed' service time and join a (automatic) dynamic waitlist for a preferred service time.

In various embodiments a confidence level of execution corresponding to a guaranteed status in a predicted queuing profile may, by way of example and not limitation, be predetermined or dynamic. For example, some embodiments may offer a guaranteed status if certain attributes are present and/or within one or more corresponding predetermined thresholds. In various embodiments attributes may include, by way of example and not limitation, availability of service resources such as relative to resource availability thresholds set in an entity preference profile, confidence level of execution at time of reservation such as based on the service seeking entity's historic behavior profile, loyal customer of the service provider, VIP member status of the service seeking entity with the service provider and/or an orchestration service, or some combination thereof.

In various embodiments (with reference to FIG. 9, as well as embodiments regarding a confidence level of execution and/or dynamic prioritization such as embodiments disclosed at least with reference to FIGS. 1-8 and 10-23) a predicted queuing profile, dynamic queueing event profile, and/or confidence level of execution may, for example, be regenerated in response to receiving new information which may affect execution of a queuing event. For example, input may be provided from a service seeking entity automatically and/or manually regarding factors affecting execution of a planned queuing event represented in a dynamic queueing event profile. In various embodiments input may, by way of example and not limitation, include (continued) intent of the service seeking entity to execute the planned queuing event, scheduling changes of the service seeking entity and/or service provider surrounding the predicted queuing profile(s) associated with the dynamic queueing event profile (e.g., a previous meeting which is predicted to extend into the predicted queuing profile and/or to end without sufficient time for the service seeking entity to travel to a location associated with the requested service), geolocation (e.g., from the geolocation engine 225) indicating that the service seeking entity is within a geofence (e.g., predetermined in an entity preference profile of the service provider) indicative of ability and/or intent to execute the dynamic queueing event profile at the predicted queuing profile time, or some combination thereof.

Figure 10:
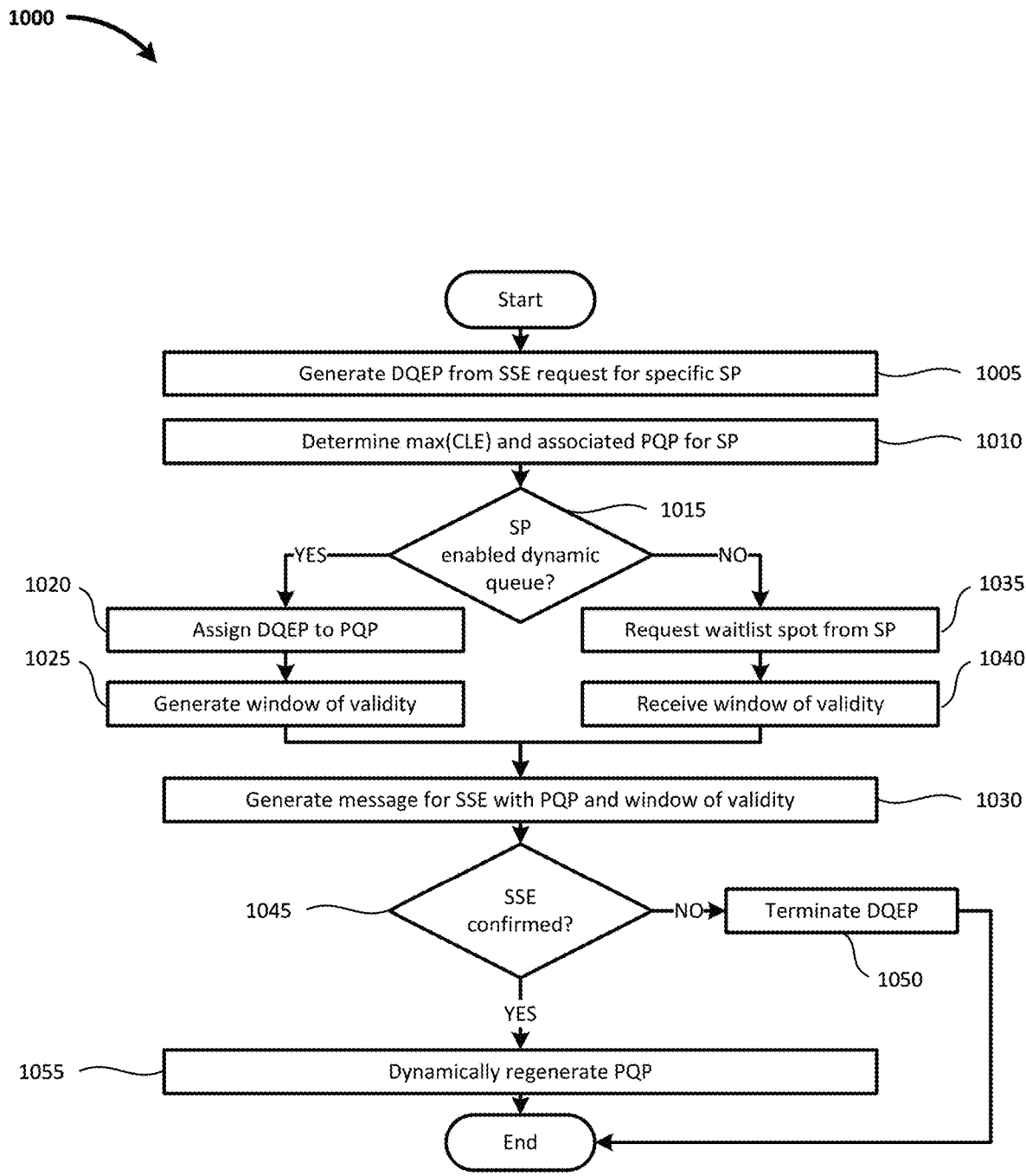
FIG. 10 depicts an exemplary method of generating a recommended soonest available queue for a service provider.

FIG. 10 depicts an exemplary method of generating a recommended soonest available queue for a service provider. In the depicted method 1000, a dynamic queueing event profile is generated 1005 from a request for service from a service seeking entity for a specific service provider. The request for service may, by way of example and not limitation, correspond to a request for soonest service. A maximum confidence level of execution is determined 1010 for the dynamic queueing event profile, and at least one predicted queuing profile of the service provider for the time(s) associated with the maximum confidence level of execution is associated with the dynamic queueing event profile.

In various embodiments the maximum confidence level of execution may be determined 1010 based on at least one historic behavior profile for the service provider and/or service seeking entity, at least one entity preference profile for the service provider and/or service seeking entity, other factors (e.g., geolocation, traffic, weather, service seeking entity loyalty, service seeking entity membership status, service seeking entity payment status), or some combination thereof. In various embodiments the dynamic queueing event profile may be (additionally) associated with predicted queuing profile(s) not associated with the maximum confidence level of execution. For example, in various embodiments (e.g., as disclosed with reference to FIGS. 1-23), the dynamic queueing event profile may be associated with predicted queuing profile(s) with predicted queuing profile(s) within a specific (e.g., predetermined based on at least one entity preference profile, dynamically determined based on one or more entity preference profile and/or historic behavior profile) range of time surrounding the time corresponding to the maximum confidence level of execution.

If the service provider has enabled a dynamic queue 1015 (e.g., as determined by at least one parameter in an entity preference profile associated with the service provider) such that, for example, the central orchestration engine 130 may manage the service provider's queues, then the dynamic queueing event profile is assigned 1020 to at least one predicted queuing profile. For example, the predicted queuing profile(s) (e.g., corresponding to the time of maximum confidence level of execution) which was associated with the dynamic queueing event profile in step 1010, may now, for example, be updated with the dynamic queueing event profile such that the dynamic queueing event profile is prioritized within the predicted queuing profile.

In various embodiments the dynamic queueing event profile may, by way of example and not limitation, be added with a predetermined status (e.g., waitlist, guaranteed, 'provisional' such as corresponding to a tentative reservation pending confirmation from the service seeking entity). Once the dynamic queueing event profile has been assigned 1020 to the predicted queuing profile(s), a window of validity is generated 1025. The window of validity may, for example, correspond to a time period (e.g., defined in an entity preference profile of the service provider) in which a position of the service seeking entity in the predicted queuing profile(s) is reserved before removal of the dynamic queueing event profile from the predicted queuing profile(s).

If the service provider has not enabled a dynamic queue 1015, then a waitlist spot is requested 1035 from the service provider. In various embodiments, a waitlist reservation may be requested, by way of example and not limitation, by sending an electronic message (directly) to the service provider (e.g., SMS/MMS message, email, message via an electronic interface, audio/video recording), by communicating with a management system (e.g., 230, 250, 260, 310) such as, for example, by a predetermined electronic message and/or file, or some combination thereof. A window of validity is received 1040 (e.g., by electronic message) in response to the request sent in step 1035. In various embodiments, by way of example and not limitation, the service provider and/or management system may accept the request and reply with a window in which the service seeking entity must confirm the waitlist request in order to maintain a place in the queue, the service provider and/or management system may accept the request and the central orchestration engine 130 may generate a window of validity based on an entity preference profile (e.g., of the service provider), or some combination thereof.

Once a window of validity is determined, a message is generated 1030 for the service seeking entity indicating a predicted queuing profile available (e.g., provisionally 'joined') and a window of validity in which the service seeking entity place in the queue (e.g., in a waitlist) may be reserved. If the service seeking entity does not confirm 1045 (e.g., as determined by lack of receipt of an electronic signal and/or message from a device of the service seeking entity), then the dynamic queueing event profile is terminated 1050 and the method ends. If the service seeking entity confirms 1045 (e.g., as determined by receipt of an electronic message from a device of the service seeking entity), then the predicted queuing profile is dynamically regenerated 1055 (e.g., corresponding to an increased confidence level of execution corresponding to confirmation of the request, corresponding to a guaranteed status of the dynamic queueing event profile) and the method ends.

Accordingly, in various embodiments a service seeking entity may advantageously be provided with a soonest available time to join a predicted queuing profile. In various embodiments the service seeking entity may request a specific anticipated flow state (e.g., no wait), maximum predicted wait time (e.g., less than 15 minutes), best available wait time at a specific time (e.g., lowest wait time in 30 minutes), or some combination thereof. Such attributes of the request may, for example, be submitted with the request for service (e.g., through an electronic interface), be determined from entity preference profile of the service seeking entity, or some combination thereof. In various embodiments (additional) steps may, by way of example and not limitation, include determining a confidence level execution from geolocation, subsequent confirmation from the service seeking entity (e.g., within a predetermined time window before the time of the predicted queuing profile), or some combination thereof.

Figure 11:
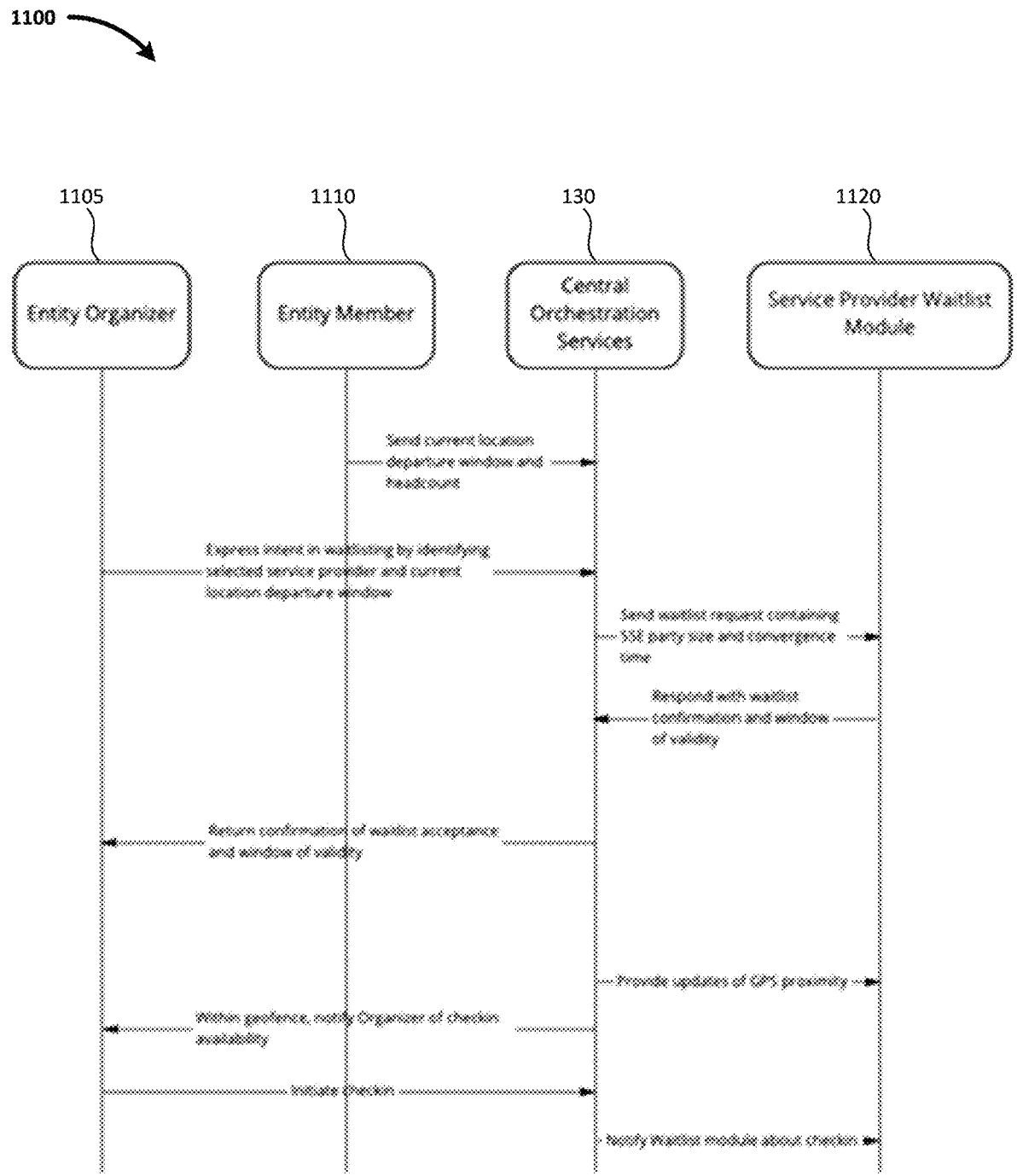
FIG. 11 is a swim lane diagram depicting an exemplary process of dynamically generating and updating a predicted queuing profile for an exemplary service provider.

FIG. 11 is a swim lane diagram depicting an exemplary process of dynamically generating and updating a predicted queuing profile for an exemplary service provider. In the depicted process 1100, a service seeking entity may include multiple members (e.g., a multi-person party). At least one member may serve as the organizer 1105 of the entity. A member 1110 (e.g., a family of 4) of the entity may send (e.g., using a computing device such as a smartphone running an app) their current location (e.g., via geolocation), expected time window for departure to a location at which service is requested, and an expected headcount for the member (e.g., 4 persons). The organizer 1105 may than express an intent to waitlist (e.g., a request for service) to the central orchestration service 130 by identifying the selected service provider and an expected departure window from the current location (e.g., manually identified and/or automatically determined by geolocation).

The central orchestration service 130 may generate a dynamic queueing event profile and/or determine an associated predicted queuing profile (e.g., as disclosed at least with reference to steps 1005-1015 of method 1000). The central orchestration service 130 generates and sends a waitlist request (e.g., via an electronic message and/or file according to a predetermined format) to a waitlist module 1120 of the service provider (e.g., managed by the central orchestration service 130, managed by a third-party management system, (locally) managed by the service provider) containing a (expected) party size of the service seeking entity and an expected convergence time. In various embodiments the expected convergence time may be, by way of example and not limitation, determined by geolocation of the service provider and/or entity members, determined based on entity preference profile(s) of the service seeking entity member(s), determined based on historic behavior profile(s) of the service seeking entity member(s), or some combination thereof.

The waitlist module 1120 response to the waitlist confirmation and a window of validity of the confirmation (e.g., as disclosed at least with reference to steps 1025 and 1040 of method 1000). The central orchestration engine 130 returns a confirmation of the waitlist acceptance and the window of validity to the entity organizer 1105. The central orchestration service 130 monitors location of at least one member of the entity (e.g., using the geolocation engine 225) and provides corresponding updates of the proximity as determined by at least one GPS system to the waitlist module 1120.

When the entity is within a predetermined geo-fence (e.g., set by the service provider in at least one entity preference profile), the central orchestration service 130 notifies the entity organizer 1105 of availability of check-in to the queue. For example, the central orchestration service 130 may enable check-in (e.g., using mobile device of the organizer 1105) when at least some members of the entity are within a predetermined zone (e.g., 1 mile, 5 miles, 10 miles, in a shopping center, in a parking lot, 10 minutes of expected drive time) around the location of the service provider. The entity organizer 1105 initiates check-in (e.g., by sending an electronic message and/or signal to the central orchestration service 130). Accordingly, the central orchestration service 130 notifies the waitlist module 1120 that the entity has checked in for the queue.

In various embodiments the central orchestration service 130 may, for example, update the predicted queuing profile based on geolocation and/or input (e.g., check-in) from the entity. In various embodiments the process 1100 may advantageously enable a multi-member entity to coordinate service with a desired service provider at a predetermined time.

Figure 12:
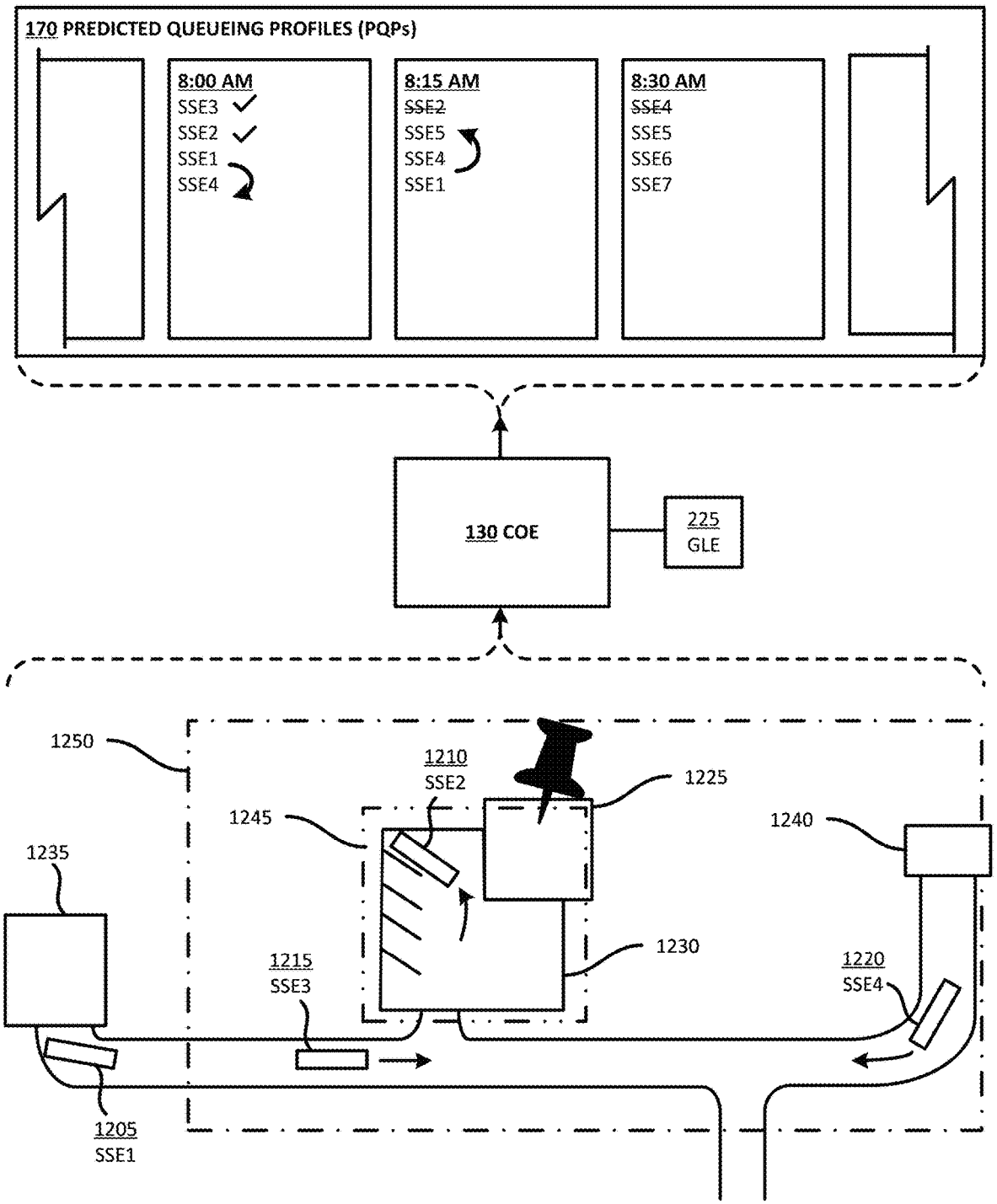
FIG. 12 depicts exemplary predicted queuing profiles generated for an exemplary service provider using an exemplary geolocation engine.

FIG. 12 depicts exemplary predicted queuing profiles generated for an exemplary service provider using an exemplary geolocation engine. In the depicted scenario 1200, a first service seeking entity 1205, a second service seeking entity 1210, a third service seeking entity 1215, and a fourth service seeking entity 1220 may all have requested service at 8:00 AM from a service provider 1225. The central orchestration engine 130 has generated predicted queuing profiles 170 corresponding to the requested time (8:00 AM) and surrounding times (8:15 AM and 8:30 AM). The service provider 1225 may, for example, have enabled dynamic queue prioritization by the central orchestration engine 130. The scenario 1200 may, for example, represent the locations of the service seeking entities 1205-1220 at approximately 7:55 AM.

As depicted, the second service seeking entity 1210 has just pulled into a parking lot 1230 of the service provider 1225. The first service seeking entity 1205 has not yet left a current location (e.g., a residence). The geolocation engine 225 may, for example, determine that a drive time from the parking lot 1230 to the service provider 1225 may take approximately 10 minutes. Because the service seeking entity 1205 is not capable of arriving at the requested time of 8:00 AM, the central orchestration engine 130 regenerates the predicted queuing profile for 8:00 AM and lowers the service seeking entity 1205 ("SSE1") in priority (e.g., due to a regenerated confidence level of execution which may, for example, be zero). However, the service seeking entity 1205 may have (recently) confirmed the request for service. In the confirmation, the service seeking entity 1205 may, for example, have indicated that the service seeking entity 1205 is running about 10 minutes late.

The central orchestration engine 130 may, for example, determine based on a historic behavior profile of the service seeking entity 1205 that the service seeking entity 1205 is historically about 15 minutes late, but no later. Accordingly, the central orchestration engine 130 also regenerates the predicted queuing profile for 8:15 AM to raise the priority of the service seeking entity 1205 (e.g., based on an increased confidence level of execution for the 8:15 AM predicted queuing profile based on confirmation received from the service seeking entity 1205, the historic behavior profile of the service seeking entity 1205, and geolocation of the service seeking entity 1205 as being able to reach the service provider 1225 by 8:15 AM). The historic behavior profile of the service seeking entity 1205 may indicate that the service seeking entity 1205 never shows up beyond 15 minutes after the requested time. Accordingly, the confidence level of execution for 8:30 AM may be so low (e.g., zero, below a (predetermined) threshold) that the dynamic queueing event profile of the service seeking entity 1205 is not associated with the predicted queuing profile for 8:30 AM.

Because the second service seeking entity 1210 is in the parking lot 1230, the central orchestration engine 130 regenerates the predicted queuing profile for 8:00 AM to indicate that the service seeking entity 1210 is actually keeping the request for service (as indicated by the check mark). The geolocation engine 225 may, for example, determine that the service seeking entity 1210 is in the parking lot 1230 based on a geofence 1245 (e.g., predetermined in an entity preference profile of the service provider) around the parking lot 1230.

The central orchestration engine 130 further removes the service seeking entity 1210 from the predicted queuing profile associated with 8:15 AM (as depicted by the strike-through). For example, the historic behavior profile of the service seeking entity 1210 may have caused a confidence level of execution to be approximately equal at 8:00 AM and 8:15 AM. The geolocation information confirming arrival at 8:00 AM may alter the relative confidence levels of execution. Accordingly, because the service seeking entity 1210 has arrived at 8:00 AM, then the dynamic queueing event profile of the service seeking entity 1210 is removed from the predicted queuing profile for 8:15 AM.

The central orchestration engine 130 determines by geolocation (e.g., using geolocation engine 225) that the third service seeking entity 1215 is approaching the geofence 1245, and is expected to be within it well before 8:00 AM (e.g., within 1 minute). The central orchestration engine 130 may also, for example, have received recent confirmation from the service seeking entity 1215 of an intent and/or ability to keep the request for service at 8:00 AM. Accordingly, the central orchestration engine 130 may regenerate the predicted queuing profile by assigning the dynamic queueing event profile of the service seeking entity 1215 ("SSE3") a status associated with certainty (e.g., indicated by the check mark) for the 8:00 AM predicted queuing profile.

The fourth service seeking entity 1220 has departed from a location 1240 (e.g., another retail location and/or a business office). The central orchestration engine 130 determines by geolocation that the service seeking entity 1220 could possibly arrive in time for 8:15 AM. However, the service seeking entity 1220 may have not confirmed the request for service within a confirmation window. Furthermore, geolocation indicates that the service seeking entity 1220 may turn left before reaching the geofence 1245. Accordingly, the confidence level of execution remains low at 7:55 AM. For example, the historic behavior profile of the service seeking entity 1220 may indicate that it is highly likely that the service seeking entity 1220 will not keep the request for service (e.g., at all and/or in association with not confirming). The historic behavior profile may, for example, indicate that it is likely for the service seeking entity 1220 to turn left (e.g., to go to another location at the requested time).

Furthermore, the central orchestration engine 130 may determine based on geolocation (e.g., because the service seeking entity 1220 is in route and within 10 minutes of the service provider 1225) that if the service seeking entity 1220 is going to keep the request for service, the service seeking entity 1220 will arrive by 8:15 AM. The central orchestration engine 130 may further determine that the confidence level of execution for 8:30 AM is now below a predetermined threshold. For example, if the service seeking entity 1220 proceeds to the service provider 1225, they will arrive by 8:15 AM, but if not, they are not coming to the service provider 1225 (e.g., they turned left and went to another location). Accordingly, the central orchestration engine 130 regenerates the predicted queuing profile for 8:30 AM and removes the dynamic queueing event profile of the service seeking entity 1220.

Accordingly, various embodiments may advantageously permit a service provider to prioritize service to service seeking entities based on dynamically prioritized queues. Various embodiments may, for example, advantageously allow the service provider to allocate resources (e.g., tables, seats, staff, food, beverages, equipment) based on predetermined confidence level of execution thresholds. Various embodiments may, for example, advantageously allow service seeking entities to have a high probability of receiving service at an actual time of arrival. Accordingly, various embodiments may, by way of example and not limitation, advantageously enable service providers and/or service seeking entities to adjust their behavior such that service seeking entities may receive service tailored specifically to their characteristics (e.g., by historic behavior profiles and/or entity preference profiles).

Figure 13:
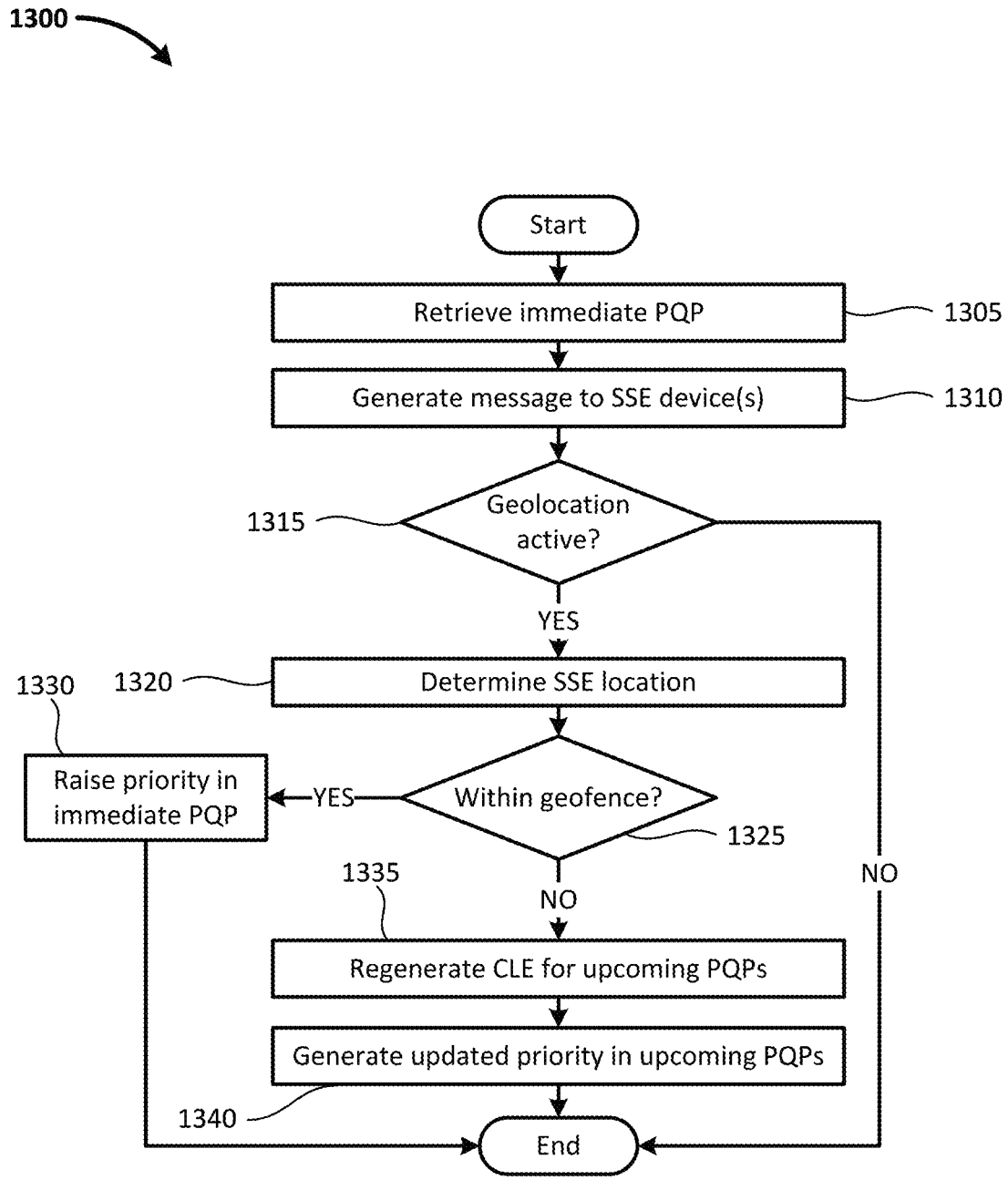
FIG. 13 depicts an exemplary method of regenerating a predicted queuing profile based on geolocation.

FIG. 13 depicts an exemplary method of regenerating a predicted queuing profile based on geolocation. In the depicted method 1300, a predicted queuing profile is retrieved 1305. The predicted queuing profile may, by way of example and not limitation, be an "immediate" predicted queuing profile (e.g., corresponding to a time within a 'now'/confirmation threshold/window such as within 5, 10, 30 minutes). A (electronic) message is generated 1310 and transmitted to a (mobile) device of the service seeking entity. The message may, by way of example and not limitation, include a request for current location (e.g., geographic coordinates), permission to access location (e.g., through a third-party service), an identifier for determining location through a geolocation engine (e.g., a third-party service, geolocation engine 225), or some combination thereof. The message may, by way of example and not limitation, include a 'wake' and/or status message to determine if service seeking entity device is active (e.g., if an app communicating with the central orchestration engine 130 is active), to initiate communication with the device of the service seeking entity, to determine if geolocation services are enabled and/or active on the device of the service seeking entity, or some combination thereof.

If geolocation is not active 1315, the method ends. For example, the predicted queuing profile may not be able to be updated based on geolocation. In various embodiments further steps may include sending an electronic message to the service seeking entity (e.g., using an alternative device, seeking confirmation of intent and/or ability to keep the request for service), reducing the confidence level of execution of the dynamic queueing event profile in the predicted queuing profile, or some combination thereof. If geolocation is active 1315, then the location of the service seeking entity is determined 1320 (e.g., using geolocation engine 225).

If the location of the service seeking entity is within a (predetermined) geofence 1325, then a confidence level of execution of the dynamic queueing event profile for the predicted queuing profile may be increased (e.g., by the execution confidence engine 165). The priority of the dynamic queueing event profile is raised 1330 in the predicted queuing profile (e.g., by the dynamic queuing engine 155), and the method ends.

If the location of the service seeking entity is not within the geofence 1325, then a confidence level of execution is (re)generated 1335 for the dynamic queueing event profile for one or more subsequent predicted queuing profiles. For example, the dynamic queueing event profile may be associated with and/or updated in relation to predicted queuing profile(s) for times in which, based on geolocation, the service seeking entity would be able and/or expected to arrive at the location of service. In various embodiments the confidence level of execution of the dynamic queueing event profile in the current ('immediate') predicted queuing profile may be reduced and/or the dynamic queueing event profile may be removed from the current predicted queuing profile.

Once the confidence level(s) of execution is regenerated 1335 for the dynamic queueing event profile for subsequent predicted queuing profile(s), an updated priority is generated 1340 for the dynamic queueing event profile in those predicted queuing profile(s) based on the regenerated confidence levels of execution. Accordingly, queues for a service provider(s) may be advantageously dynamically prioritized based on geolocation of a service seeking entity(ies).

Figure 14:
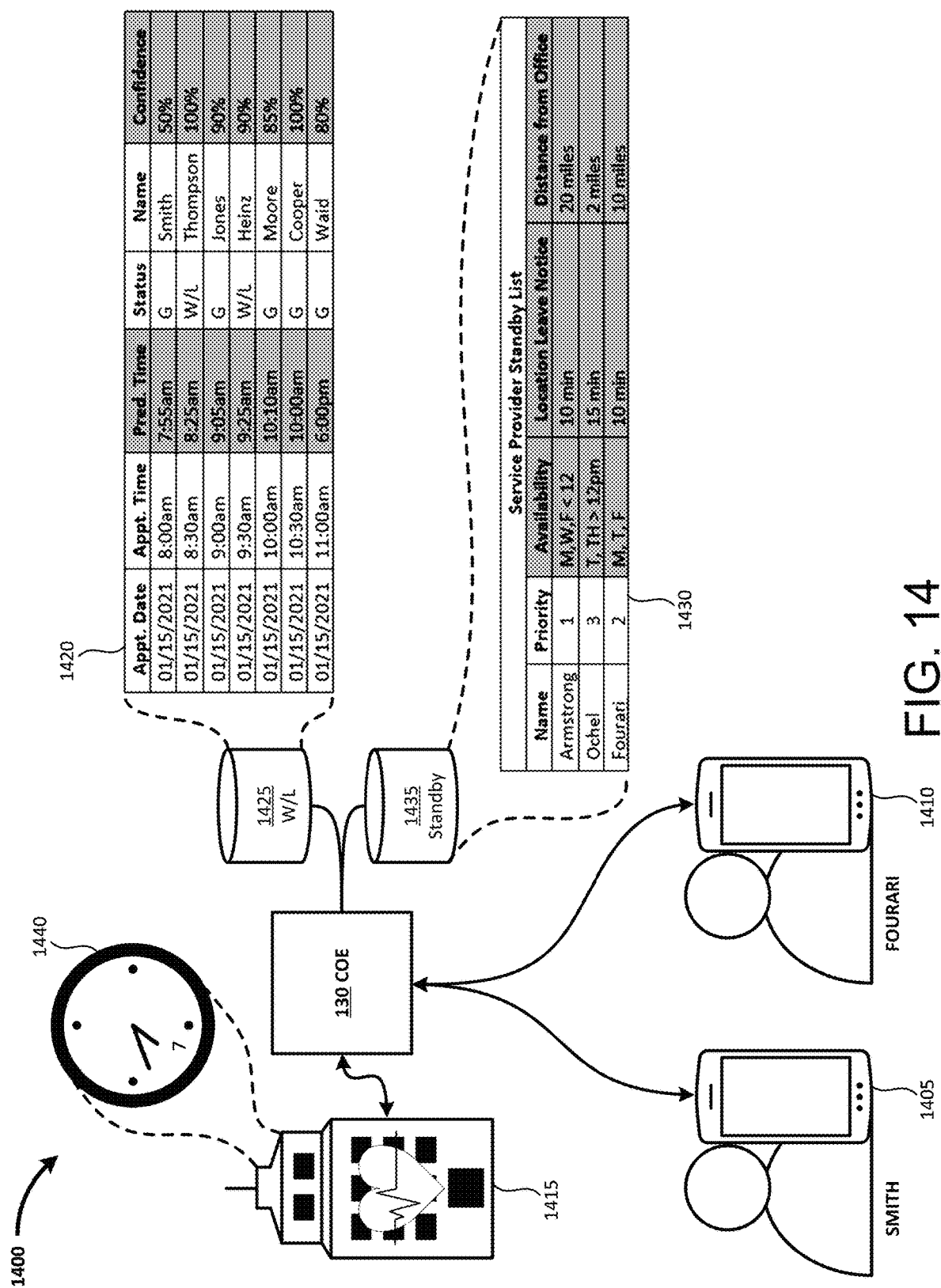
FIG. 14 depicts an exemplary standby list generated by the central orchestration engine.

FIG. 14 depicts an exemplary standby list generated by the central orchestration engine. In the depicted scenario 1400, a first service seeking entity 1405 ("Smith") has reserved service from a service provider 1415 (e.g., a healthcare provider) through the central orchestration engine 130 (e.g., via a mobile device) 8:00 AM on Jan. 15, 2021. A second service seeking entity ("Fourari") 1410 has also requested service on Jan. 15, 2021. The central orchestration engine is maintaining a waitlist 1420 in at least one data store 1425. The waitlist 1420 may, for example, be configured as disclosed at least with reference to table 325 of FIG. 3.

The central orchestration engine 130 may, for example, determine that there is no availability to add service seeking entity 1410 to the waitlist 1420. As depicted, the waitlist 1420 includes dynamic queueing event profiles that fill the capacity of the service provider 1415 (e.g., as determined by at least one entity preference profile of the service provider 1415 which may set one appointment available every 30 minutes from 8:00 AM to 11:00 AM), at least for predicted queuing profiles of times requested by the service seeking entity 1410.

The service seeking entity 1410 may request (e.g., in response to prompt(s) from the central orchestration engine 130) to be added to a standby list 1430 maintained by the central orchestration engine 130 in a data store 1435 for the service provider 1415. In the depicted example, the standby list 1430 includes the name of the service seeking entity, their priority in the standby list (e.g., based on a confidence level of execution for a predicted queuing profile to be proposed, based on entity preference profiles of the service seeking entity and/or the service provider, based on order of joining the standby list), an availability profile, a time required for notice before being able to leave a current location, and a distance from the service provider 1415.

In various embodiments the availability profile may include at least one day (e.g., in any given week, specific date ranges) in which the service seeking entity may be available to be added to a predicted queuing profile. The availability profile may include at least one time range in the available day(s) in which the service seeking entity may be available to be added to a predicted queuing profile. In various embodiments the location leave notice may correspond to a time required from notice of availability of a predicted queuing profile until the service seeking entity may leave their current location (e.g., logout, lock a door). The time required for notice may, for example, be manually provided by the service seeking entity, be determined from an entity preference profile (e.g., entered by the user previously, determined by machine learning from a historic behavior profile), be determined from a historical behavior profile (e.g., dynamically based on machine learning), or some combination thereof.

In the depicted example, the service seeking entity 1410 is available on Mondays, Thursdays, and Fridays during business hours of the service provider 1415, requires (approximately) 10 minutes notice before departure, and is typically located about 10 miles away. At a time 1440 of 7:40 AM, an 8:00 AM appointment of the service provider 1415, the service seeking entity 1405 may cancel their appointment for 8:00 AM (e.g., via the central orchestration engine 130 and/or contacting the service provider 1415). Accordingly, the service provider 1415 now has an opening on Jan. 15, 2021, for 8:00 AM.

Because Jan. 15, 2021, is a Friday and the time is before 12:00 PM, a dynamic queuing event profile for a service seeking entity "Armstrong" has highest priority in the standby list 1430. However, Armstrong is located 20 miles from the office. The central orchestration engine 130 may, for example, determine (e.g., by applying a standard travel time per mile factor, using a geolocation engine such as 225 to determine a travel time based on a location associated with the standby list 1430 and/or in an entity preference profile of the service seeking entity Armstrong) an estimated travel time of approximately 20 minutes from Armstrong's location to the service provider 1415. In combination with the location with Armstrong's location leave notice time of 10 minutes, Armstrong may be predicted to arrive at 8:10 AM, after the appointment time of 8:00 AM.

Accordingly, the central orchestration engine 130 may determine not to contact Armstrong and so may move to the next available service seeking entity in order of priority. The central orchestration engine 130 may, therefore, determine that the service seeking entity 1410 is available. For example, the central orchestration engine 130 may determine an estimated travel time of 10 minutes for the service seeking entity 1410. The combined leave notice time and travel time may thereby be estimated at 20 minutes, which would allow the service seeking entity 1410 to arrive on time for the proposed appointment at 8:00 AM.

The central orchestration engine 130 may, therefore, associate the dynamic queuing event profile of the service seeking entity 1410 with the 8:00 AM predicted queuing profile of the service provider 1415. The central orchestration engine 130 may generate and transmit an electronic message notifying the service seeking entity 1410 of the availability of the appointment time. The central orchestration engine 130 may, for example, request confirmation from the service seeking entity 1410 before updating the predicted queuing profile for 8:00 AM of the service provider 1415.

Accordingly, in various embodiments a service provider may advantageously fill a canceled appointment time without losing time and/or opportunity by manually contacting people from a separate standby list. A service seeking entity may advantageously receive an earlier appointment than expected within the parameters of their schedule. A service seeking entity may advantageously not be bothered by offers of canceled appointment times which the service seeking entity is clearly unable to avail themselves of. In some embodiments a canceling service seeking entity may advantageously avoid a late cancellation fee because the service provider is able to fill the canceled appointment.

Figure 15:
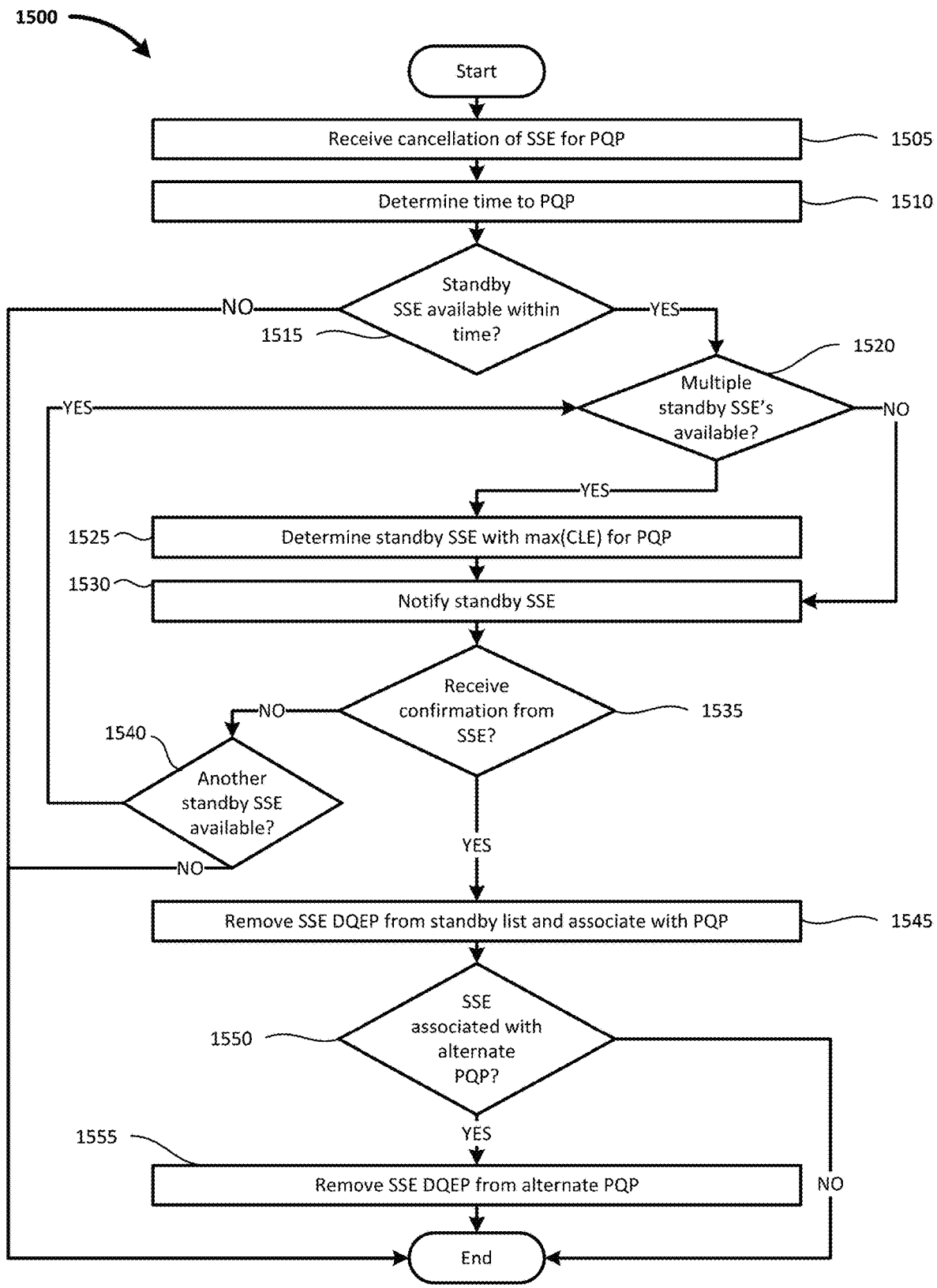
FIG. 15 depicts an exemplary method for dynamically merging a waitlist into available queuing profiles.

FIG. 15 depicts an exemplary method for dynamically merging a waitlist into available queuing profiles. In the depicted method 1500, a cancellation of the request for service for a service seeking entity is received 1505 for at least one predicted queuing profile. For example, a cancellation signal, message, and/or file may be manually generated by the service seeking entity, may be manually and/or automatically generated by the service provider (e.g., in response to contact and/or lack of contact from the service seeking entity), may be automatically generated by the central orchestration engine (e.g., in response to a confidence level of execution below a predetermined threshold), or some combination thereof.

A time remaining to the predicted queuing profile is determined 1510. If no dynamic queuing event profile for a service seeking entity is available 1515 for the service provider (e.g., on a standby list 1430 maintained in the data store 1435) with an availability profile (e.g., time, date, location/estimated travel time, notice time) indicating availability of the standby service seeking entity for the predicted queuing profile associated with the canceled request for service for the predicted queuing profile, then the method ends. If a standby service seeking entity is available 1515, and if multiple standby service seeking entities are available 1520, then a standby service seeking entity having a dynamic queuing event profile with a maximum confidence level of execution for the predicted queuing profile is determined 1525. The confidence level of execution for each of the multiple standby service seeking entities available may, by way of example and not limitation, be determined based on priority in the standby list, historical behavior profile(s), entity preference profile(s), availability profile(s) (e.g., travel time+notice time within a safety factor) or some combination thereof.

Once a service seeking entity having a maximum confidence level of execution for the predicted queuing profile is determined 1525, or if only one standby service seeking entity is available 1520, then the selected standby service seeking entity is notified 1530 (e.g., via electronic message). If confirmation is not received 1535 from the selected service seeking entity and if no other standby service seeking entity is available 1540, then the method ends (e.g., the cancellation is not replaced). If confirmation is not received 1535 from the selected service seeking entity and if another standby service seeking entity is available 1540, then steps 1520 through 1535 are repeated. If confirmation is received 1535 from the service seeking entity, then the dynamic queueing event profile of the service seeking entity is removed 1545 from the standby list and added to the predicted queuing profile.

If the dynamic queueing event profile of the service seeking entity is also associated 1550 with another predicted queuing profile (e.g., as a backup time selected by the service seeking entity when placed on the standby list), then the dynamic queueing event profile of the service seeking entity is removed 1555 from the alternate predicted queuing profile (e.g., because the dynamic queueing event profile is now added to a sooner, preferred predicted queuing profile). Accordingly, in various embodiments a cancellation may advantageously be filled and/or a service seeking entity may advantageously receive a sooner (e.g., more preferred) service time.

Figure 16:
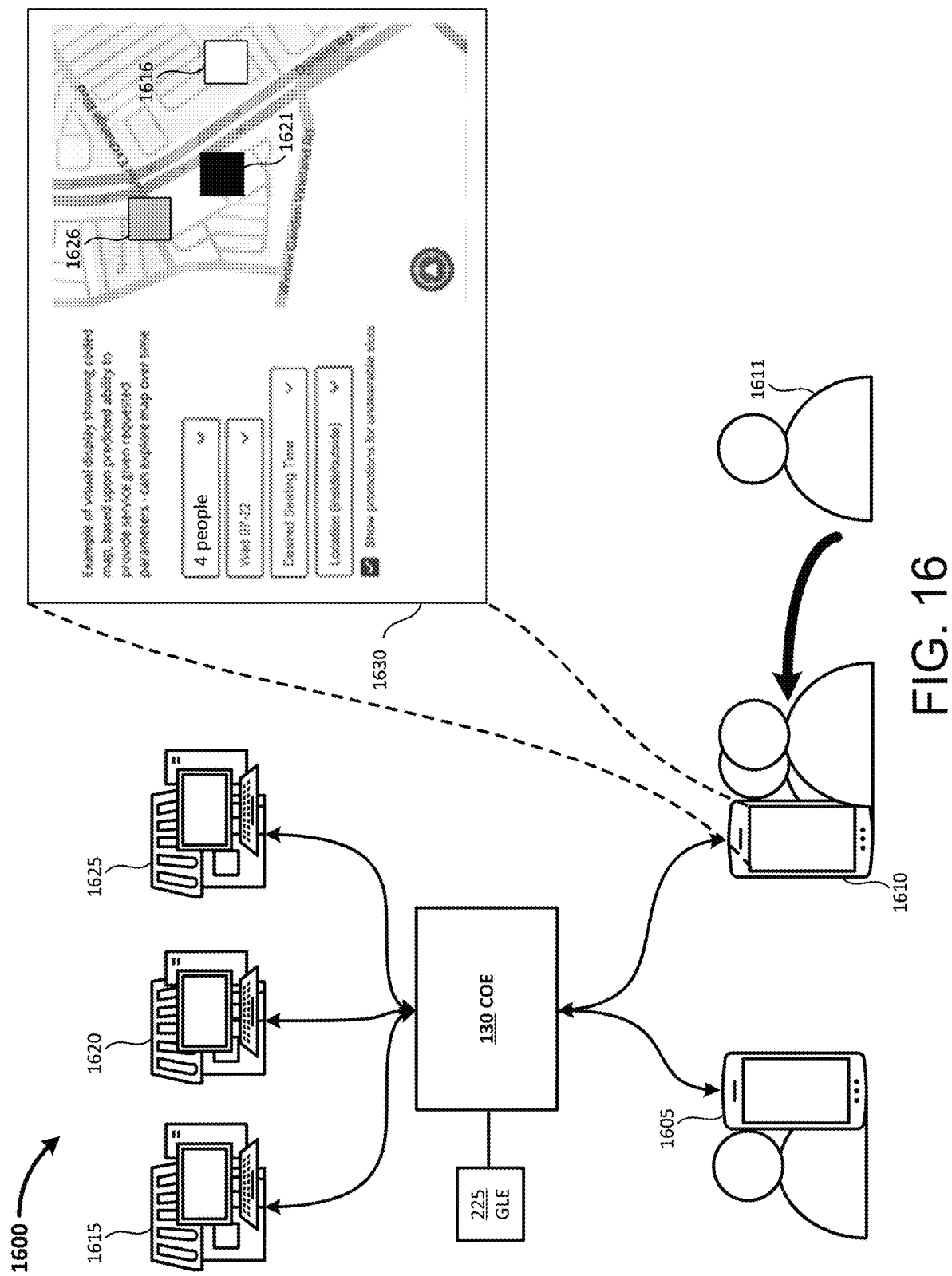
FIG. 16 depicts an exemplary display of available service providers based on AFS and geolocation for an exemplary ad hoc social network formed using the central orchestration engine.

FIG. 16 depicts an exemplary display of available service providers based on AFS and geolocation for an exemplary ad hoc social network formed using the central orchestration engine. In the depicted scenario 1600, a first individual 1605, a couple 1610, (e.g., spouses, friends), and a second individual 1611 (e.g., friend, associate, family member of the couple 1610) may form a single service seeking entity (e.g., a social network group). At least some members of the service seeking entity may, for example, communicate using the central orchestration engine 130. For example, the social network group (the service seeking entity) may be formed using the central orchestration engine 130 by communication of the individual 1605 and the couple 1610 with the central orchestration engine. The individual 1611 may communicate directly with the couple 1610. The couple 1610 may, for example, be an entity organizer.

For example, the entity members 1605, 1610, and 1611 may wish to arrange a casual dinner on Wednesday, July 22.

The entity organizer 1610 may, for example, request service on behalf of the service seeking entity via the central orchestration engine 130. The request for service may, by way of example and not limitation, include the specific type of service requested (e.g., casual dining), a requested geographical region (e.g., a specific town, within a specific distance of a given location such as a selected location or a current location of the user 1610), a desired date and/or time, and/or a number of persons in the group (e.g., manually added/update and/or determined automatically by the central orchestration engine 130) via the central orchestration engine 130.

In response to the request for service, the central orchestration engine 130 may, for example, determine that service providers 1615, 1620, and 1625 are potential matches for the request for service. For example, the service providers 1615-1625 may be Italian food restaurants within the requested geographical region. Accordingly, the central orchestration engine 130 may generate a response to a device of the user 1610 such that a display 1630 is generated on the device of the member 1610. As depicted, the display 1630 includes a map view of the requested region, current parameters of the request for service (e.g., the date, the number of people, a seating time, and a location in a service provider). The display 1630 further includes geographically distributed visual indicia 1616, 1621, and 1626 corresponding to the service providers 1615, 1620, and 1625, respectively. The visual indicia 1616-1626 may, for example, indicate an anticipated flow state of the corresponding service providers at the requested time (e.g., color coded). In some embodiments a display similar to 1630 may be used to generate the input for the request for service (e.g., an interactive map interface with input fields for parameters of the request for service).

The member 1605 may, for example, submit a time range of availability for joining the entity, input requests (e.g., desired service provider, desired menu items) which may, for example, be viewed and/or acted upon by the organizer 1610 and/or directly by the central orchestration engine 130. In various embodiments the member 1605 and/or member 1611 may also view the display 1630. In various embodiments the central orchestration engine 130 may, for example, receive inputs of availability and/or location of the members 1605-1611 (e.g., current locations, expected locations prior to the time of requested service) and (automatically) suggest and/or assign a predicted queueing profile for the dynamic queueing event profile generated for the request for service of the multi-party service seeking entity.

In various embodiments the central orchestration engine 130 may, for example, determine a confidence level of execution for the dynamic queueing event profile in relation to at least one requested, suggested, and/or expected predicted queueing profile (e.g., as disclosed at least with reference to methods 400, 800, 900, 1000, 1300, 1500). In various embodiments the central orchestration engine 130 may, for example, determine an expected convergence time of the members 1605-1611 of the service seeking entity. The central orchestration engine 130 may, for example, determine an expected convergence time based on geolocation using at least the geolocation engine 225. In various embodiments the central orchestration engine 130 may, by way of example and not limitation, determine a confidence level of execution for each entity member (1605, 1610, and/or 1611) and/or a combined confidence level of execution for the entity based on historic behavior profiles and/or entity preference profiles of the service provider, member(s) of the service seeking entity, and/or of the multi-member service seeking entity itself.

In various embodiments the central orchestration engine 130 may, for example, determine a confidence level of execution of the entity and/or members thereof based on geolocation (e.g., expected travel time). The central orchestration engine 130 may, by way of example and not limitation, request confirmation of each member in at least one predetermined window before the time of a predicted queueing profile associated with the dynamic queueing event profile, request confirmation of size of the party in at least one predetermined window before the time of a predicted queueing profile associated with the dynamic queueing event profile, (re)generate a confidence level of execution of each member and/or of the service seeking entity as a whole based on geolocation of one or more members of the service seeking entity, or some combination thereof.

Various embodiments may advantageously allow creation and/or management of a social network between multiple users. Various embodiments may advantageously dynamically coordinate service for a multi-party service seeking entity. Various embodiments may advantageously dynamically prioritize a multi-party service seeking entity in a queue. In various embodiments a size of the party may be dynamically determined.

Figure 17:
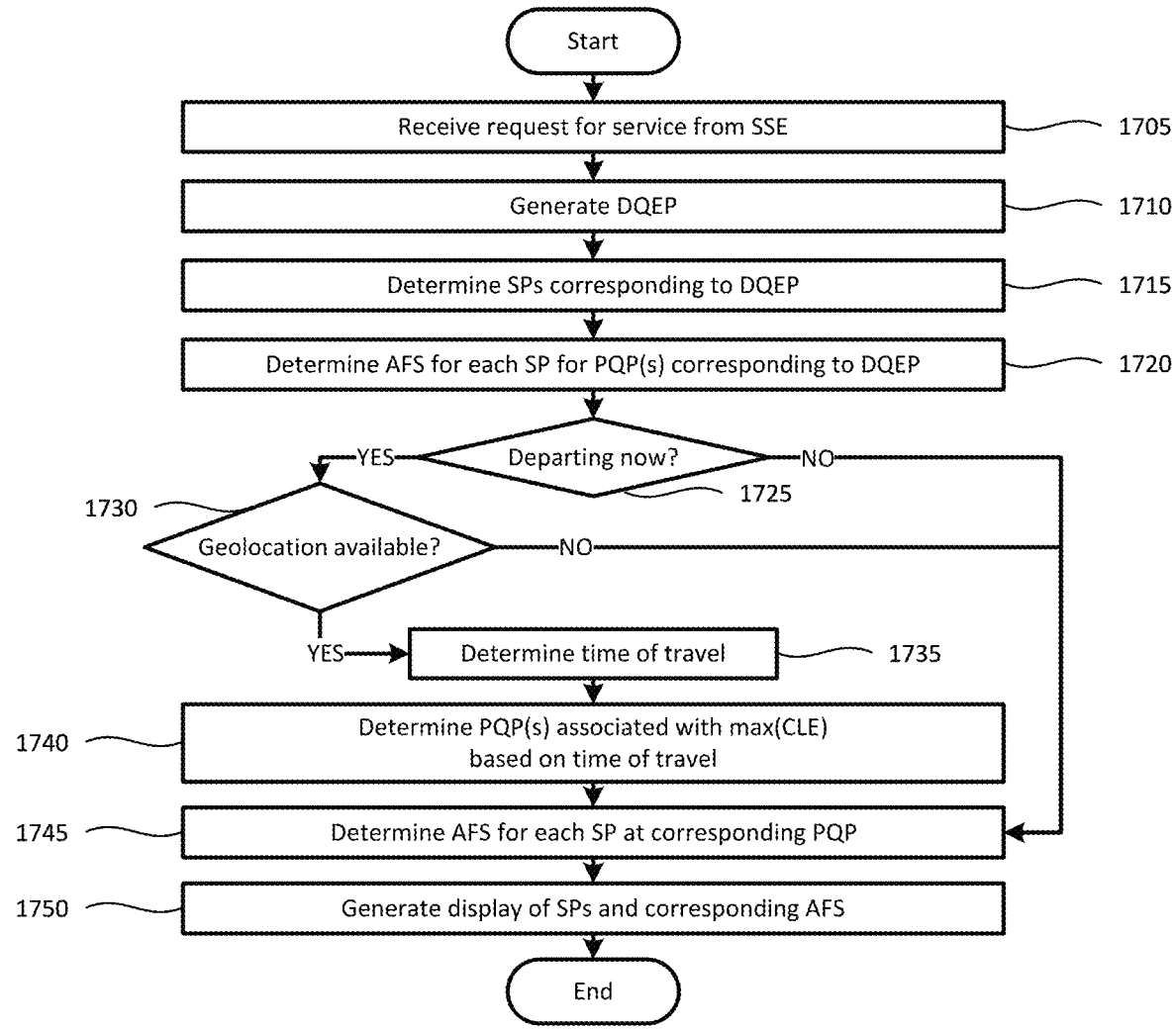
FIG. 17 depicts an exemplary method for generating a display of available service providers for a service seeking entity based on AFS and geolocation.

FIG. 17 depicts an exemplary method for generating a display of available service providers for a service seeking entity based on AFS and geolocation. In the depicted method 1700, a request for service is received 1705 from a (multi-member) service seeking entity. In response to the request for service, a dynamic queueing event profile is generated 1710. At least one service provider matching parameter(s) of the dynamic queueing event profile is determined 1715. At least one identified service provider (e.g., via at least one predicted queueing profile thereof) may, for example, be (tentatively) associated with the dynamic queueing event profile.

An anticipated flow state is determined 1720 for each service provider for at least one predicted queueing profile of the service provider corresponding to the dynamic queueing event profile. If the service seeking entity is departing now 1725 (e.g., at least one member of the service seeking entity is leaving from a current location), and if geolocation is available 1730 for at least one member of the service seeking entity, then a time of travel is determined 1735. At least one predicted queueing profile for each identified service provider is determined 1740 corresponding to a maximum confidence level of execution (e.g., for that service provider) based at least partially on the time of travel determined in 1735 (e.g., of one or more members of the service seeking entity and/or of the service seeking entity as a whole). In some embodiments, the maximum confidence level of execution may also, by way of example and not limitation, be based on one or more historic behavior profile(s) and/or entity preference profile(s) of the service provider, service seeking entity, and/or member(s) of the service seeking entity.

If the service seeking entity is not departing now 1725 (e.g., all members, an organizer of the service seeking entity, some members), or if geolocation is not available 1730 (e.g., for some members of the service seeking entity, for an organizer of the service seeking entity, for all members of the service seeking entity), or once the maximum confidence level of execution is determined 1740, then an anticipated flow state of each service provider at the selected predicted queueing profile(s) for that service provider is determined 1745. In some embodiments, if step 1740 was not completed, then a maximum confidence level of execution may be determined based on, for example, historic behavior profile(s) and/or entity preference profile(s) corresponding to a predicted queuing profile(s) at a requested time of service. In some embodiments a time of travel may, for example, be received as an estimate from at least one third-party (e.g., a map service) and/or at least one member of the service seeking entity.

Once an anticipated flow state is determined 1745 for at least one predicted queuing profile for each selected service provider, a display is generated 1750 with visual indicia corresponding to the selected service provider(s) and the corresponding anticipated flow state(s). In various embodiments the display may, by way of example and not limitation, be configured such as is depicted by the display 1630 of FIG. 16. Accordingly, various embodiments may advantageously coordinate service for a multi-party service seeking entity. In some embodiments, the display may, by way of example and not limitation, include a window of validity for the anticipated flow state and/or for joining a queue (e.g., having the service seeking entity's dynamic queueing event profile be assigned to a specific predicted queuing profile based on capacity of the service provider and previously assigned dynamic queueing event profile(s)).

Figure 18:
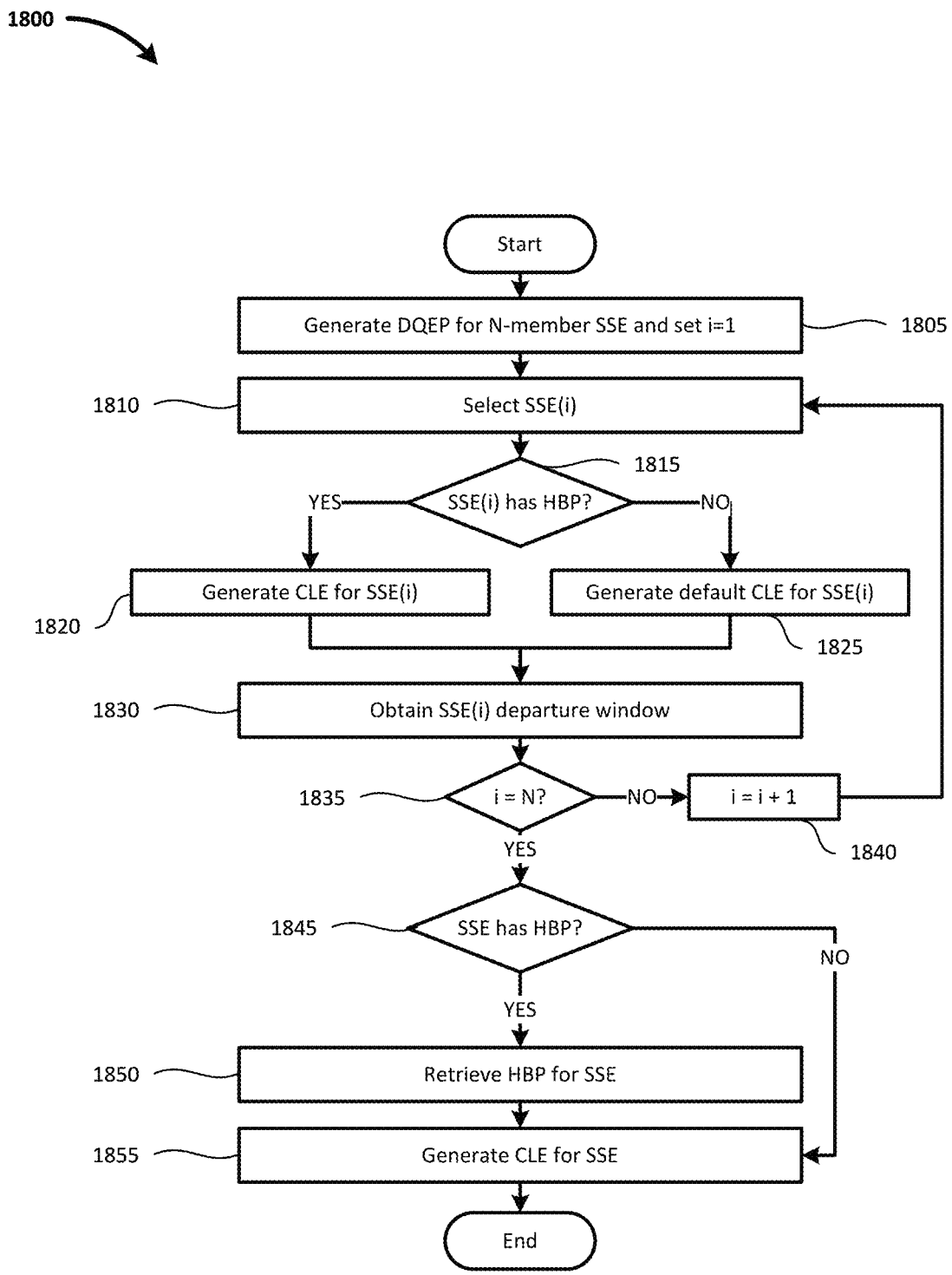
FIG. 18 depicts an exemplary method of prioritizing a service seeking entity made up of multiple members.

FIG. 18 depicts an exemplary method of prioritizing a service seeking entity made up of multiple members. In the depicted method 1800, the dynamic queuing event profile is generated 1805 for a multi-member service seeking entity having N members (e.g., by the central orchestration engine 130 in response to a request for service from at least one member of the service seeking entity), and accounting variable (i) is initialized (e.g., set to 1). A member of the service seeking entity corresponding to the current accounting variable value (e.g., a first member of the service seeking entity) is selected 1810. If the current member (SSE(i)) has a historical behavior profile 1815, then a confidence level of execution is generated 1820 for the current member. For example, the confidence level of execution may be generated for at least one predicted queuing profile associated with a requested time, requested service provider, suggested time, suggested service provider, or some combination thereof.

If the current member does not have a historic behavior profile 1815, then a default confidence level of execution is generated 1825 for the current member. In various embodiments a default confidence level of execution may, by way of example and not limitation, be generated based on other members of the service seeking entity, based on one or more profiles associated with the service provider(s), an entity preference profile of the member, or some combination thereof. Once a confidence level of execution has been generated, a departure window is obtained 1830 for the current member. In various embodiments the departure window may be obtained, by way of example and not limitation, using geolocation, using a prediction based on at least one historic behavior profile, using input received from at least one member of the service seeking entity, or some combination thereof.

If the counting variable i does not correspond 1835 to the total number of members N of the service seeking entity, the counting variable is incremented 1840 and the method returns to step 1810. Once all members have been considered 1835, if the service seeking entity has a historic behavior profile 1815, then the historic behavior profile for the multi-member service seeking entity is retrieved 1850. Once the historical behavior profile for the service seeking entity is retrieved 1850, or if the service seeking entity does not have a historical behavior profile 1845, then a confidence level of execution is generated 1855 for the service seeking entity and the method ends. In various embodiments the confidence level of execution for the service seeking entity may be generated as a function of at least one historical behavior profile for the service seeking entity as a whole, at least one entity preference profile for the service seeking entity as a whole, of confidence levels of execution for individual members (e.g., average; weighted average based on at least one parameter such as accuracy, leadership, and/or number of people represented by the member), at least one profile (e.g., entity preference profile, historic behavior profile) for a service provider, or some combination thereof. In various embodiments the method 1800 may advantageously provide for generation of a confidence level of execution to assist in dynamic prioritization and/or coordination of a multi-member service seeking entity.

Figure 19:
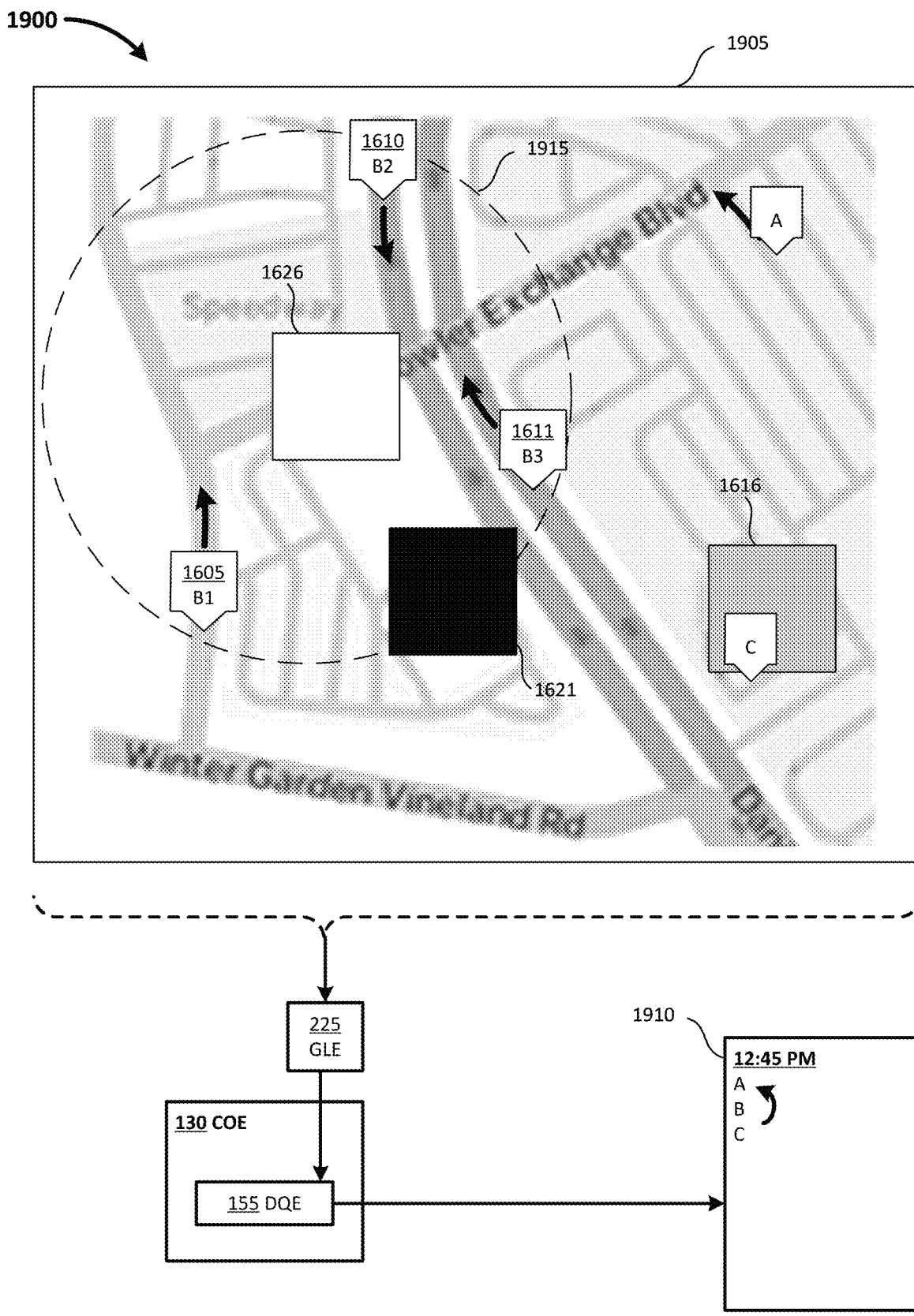
FIG. 19 depicts an exemplary dynamically prioritized queuing profile generated in response to convergence of members of an exemplary service seeking entity within a geo-fence.

FIG. 19 depicts an exemplary dynamically prioritized queuing profile generated in response to convergence of members of an exemplary service seeking entity within a geo-fence. In the depicted scenario 1900, the multi-member service seeking entity disclosed at least with reference to FIG. 16 has selected the service provider 1625 and are in the process of converging at the service provider 1625. As depicted, all three members (1605, 1610, and 1611) have geolocation enabled such that the central orchestration engine 130 may track the location of each member of the entity. The central orchestration engine 130 may, for example, generate a display 1905 and/or provide data to another service and/or device to generate the display 1905 depicting convergence of the members at the service provider 1625 (indicated on the display by visual indicium 1626).

The corresponding dynamic queuing event profile of the multi-member service seeking entity (denoted as "B") has been assigned to a 12:45 PM predicted queuing profile 1910 of the service provider 1625 by the dynamic queuing engine 155 of the central orchestration engine 130. Two other service seeking entities ("A" and "C") are also represented by corresponding dynamic queuing event profiles associated with the predicted queuing profile 1910. As depicted in the representation of the predicted queuing profile 1910, service seeking entity A has highest priority, followed by service seeking entity B and then service seeking entity C. As depicted in the display 1905, all three members 1605, 1610, and 1611 are converging at the location of the service provider 1625 and are already within a geo-fence 1915. Accordingly, based on the current location (e.g., also based on the historic location such as used to determine direction and/or speed of travel) the confidence level of execution of the dynamic queuing event profile of the service seeking entity B may be increased.

As depicted in the display 1905, the service seeking entity A is currently in route but is not within the geo-fence 1915. For example, a historical behavior profile of the service seeking entity A may have caused a confidence level of execution to be generated corresponding to a high likelihood of execution for the predicted queuing profile 1910. The service seeking entity A may, for example, have been uncharacteristically delayed (e.g., by traffic). Based on the current geolocation of the service seeking entity A, the central orchestration engine 130 may (re)generate a confidence level of execution for service seeking entity A for the predicted queuing profile 1910. The confidence level of execution for service seeking entity A may, for example, be lower (e.g., less confident of execution) than the confidence level of execution for service seeking entity B.

In the depicted example the service seeking entity C is not in route based on geolocation. Furthermore, the location of service seeking entity C is associated (e.g., within a geofence) of the service provider 1615 (indicated by visual indicum 1616). The central orchestration engine 130 may determine that service provider 1615 has a high probability of being mutually exclusive with service provider 1620 (e.g., both may be casual dining restaurants). The central orchestration engine 130 may, therefore, regenerate the confidence level of execution for service seeking entity C for the predicted queuing profile 1910. For example, the confidence level of execution for service seeking entity C may be (significantly) lower than for service seeking entity A and service seeking entity B. The confidence level of execution for service seeking entity C may, however, not be below a (predetermined) threshold for removal from the predicted queuing profile because there may still be time for service seeking entity C to travel from the current location to the service provider 1625.

The central orchestration engine 130 (e.g., by the dynamic queuing engine 155) updates the predicted queuing profile 1910. As depicted, service seeking entity C remains at lowest priority. However, service seeking entity B is reprioritized from middle place to have highest priority (e.g., due to an increased confidence level of execution vs service seeking entity A). Accordingly, service seeking entity B may receive highest priority (e.g., for seating at a table). In various embodiments the service seeking entity A may, for example, be reprioritized in a subsequent predicted queuing profile (e.g., 12:50 PM) based on an expected time of travel to reach the service provider 1625.

In various embodiments convergence may, for example, be determined by geolocation (e.g., by GPS) of at least one member of a service seeking entity, by status updates (e.g., 5 miles out) from at least one member of a multi-member service seeking entity, or some combination thereof. Various embodiments may advantageously dynamically prioritize a queue and/or coordinate service between a service provider(s) and a service seeking entity(ies) according to convergence of a (multi-member) service seeking entity at the service provider based on geolocation.

Figure 20:
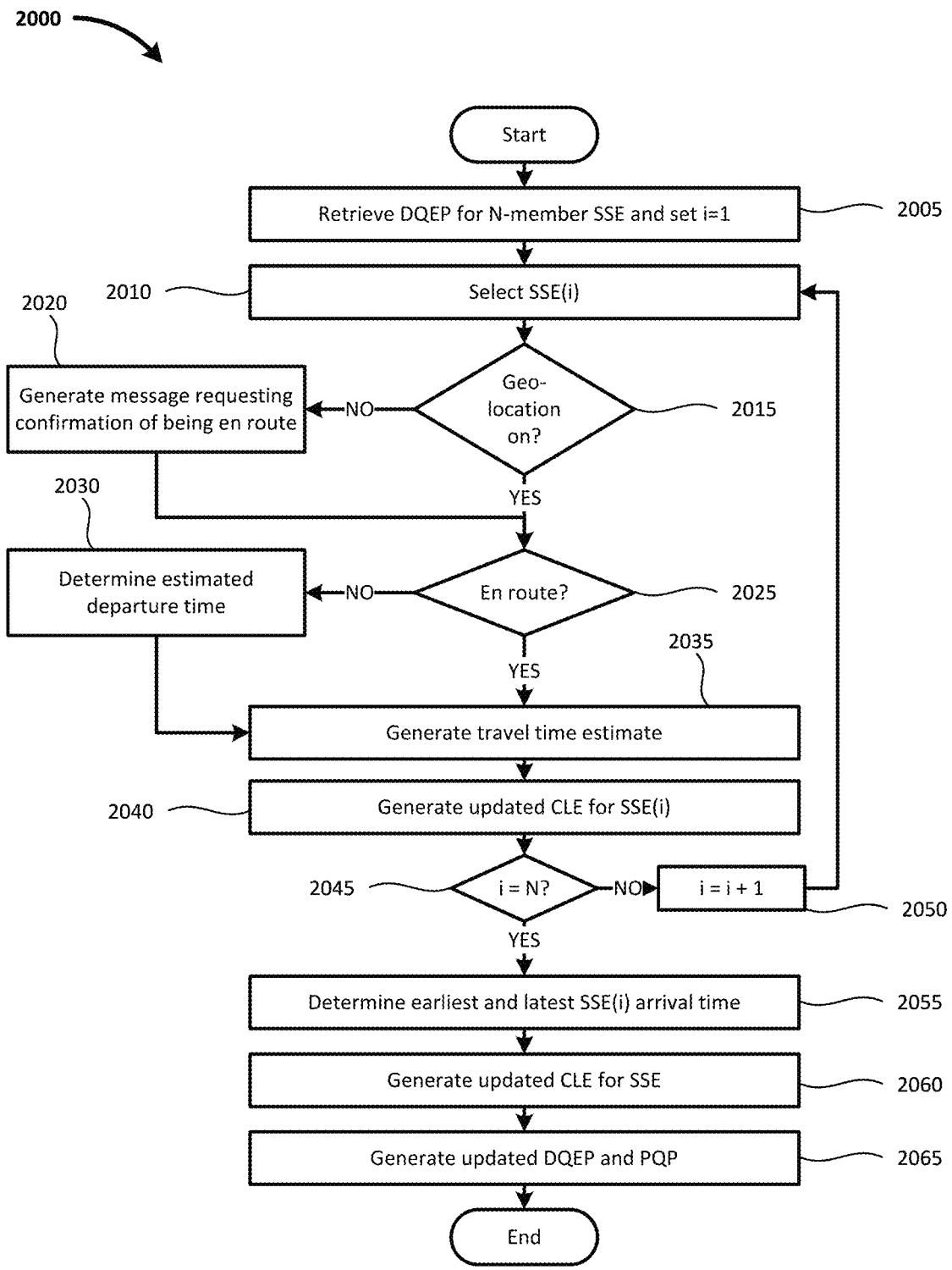
FIG. 20 depicts an exemplary method of dynamically reprioritizing a predicted queuing profile according to geographical convergence of members of an exemplary service seeking entity.

FIG. 20 depicts an exemplary method of dynamically reprioritizing a predicted queuing profile according to geographical convergence of members of an exemplary service seeking entity. In the depicted method 2000, a dynamic queueing event profile is retrieved 2005 (e.g., by the central orchestration engine 130) for a multi-member service seeking entity having a number of members ("N"), and a counting variable ("i") is initialized (e.g., set to 1, as depicted). A member of the service seeking entity corresponding to the counting variable i (e.g., a first member when i=0) is selected 2010. If geolocation is not enabled 2015 for the currently selected member, then a message is generated 2020 prompting the currently selected member for confirmation of being en route.

If the member is not en route 2025, then an estimated departure time is determined 2030. In various embodiments the estimated departure time may, for example, be determined by input from the currently selected member, input from another member of the service seeking entity, historic behavior profile(s) and/or entity preference profile(s) for the member, current location of the user (e.g., by geolocation), current event(s) of the user (e.g., another dynamic queueing event profile which may be indicated as not being completed), or some combination thereof. If the member is en route, or once an estimated departure time is determined 2030, then a travel time estimate is generated 2035. In various embodiments travel time may be estimated based on input from at least one member of the service seeking entity, based on input from the service provider, based on geolocation (e.g., an estimated route time using a geolocation engine and/or third-party mapping service), based on one or more historic behavior profile and/or entity preference profile, or some combination thereof.

A confidence level of execution for the predicted queuing profile for the currently selected member of the service seeking entity is (re)generated 2040. For example, the confidence level of execution may be generated and/or updated based on the travel time estimate generated in step 2035. If not all members of the service seeking entity have been considered 2045 (e.g., i≠N), then the counting variable is incremented 2050, and the method returns to step 2010. Once all members of the service seeking entity have been considered, then the earliest and latest arrival time(s) of the various members of the service seeking entity are determined 2055.

Based on the earliest and/or latest arrival times and/or individual confidence level(s) of execution for the members of the service seeking entity, an updated confidence level of execution is generated 2060 for the service seeking entity as a whole. An updated dynamic queueing event profile and/or predicted queuing profile(s) for the service seeking entity are then generated 2065 based on the updated confidence level of execution, and the method ends. Various embodiments may, for example, advantageously dynamically re-prioritize a predicted queuing profile based on convergence of at least one multi-member service seeking entity on the location of service.

Figure 21:
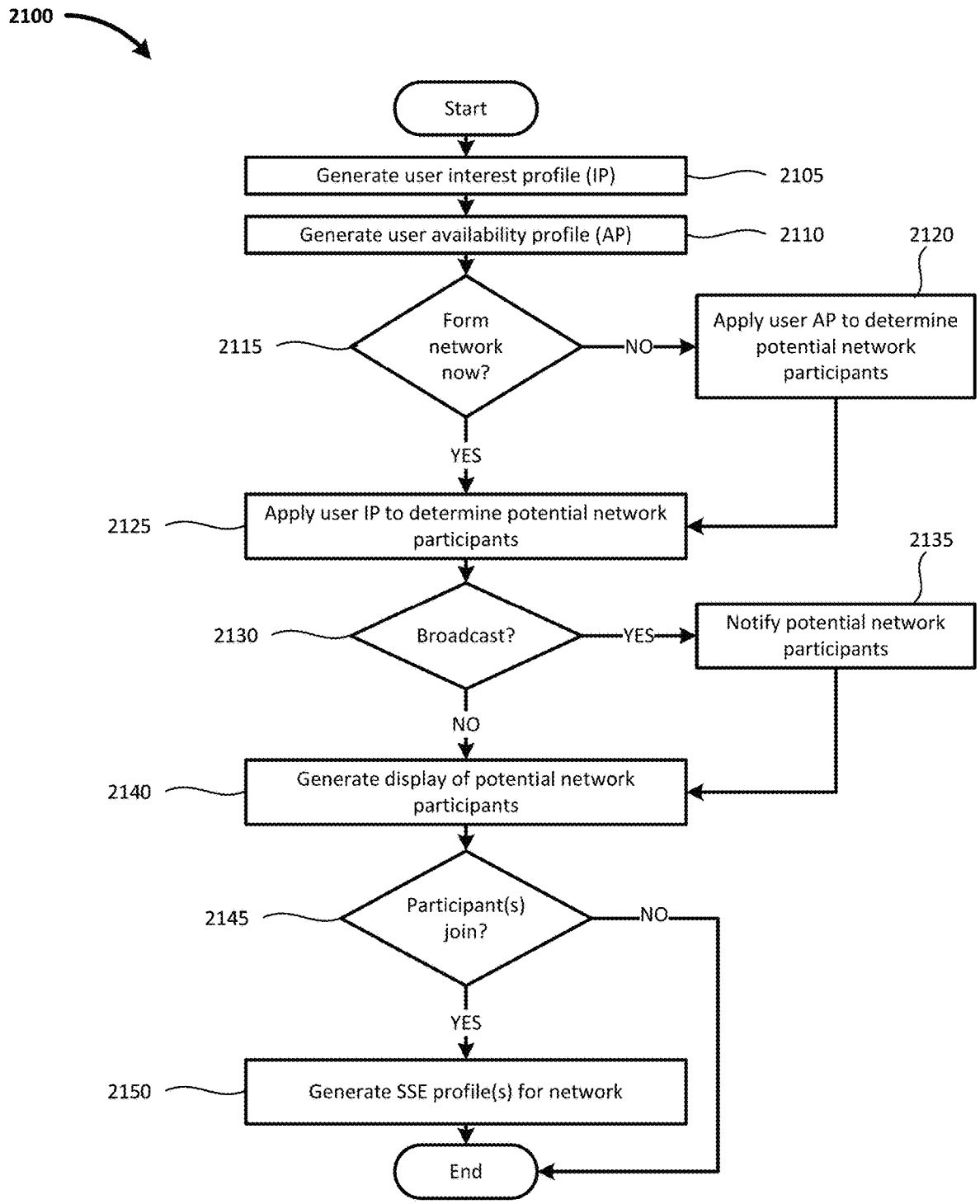
FIG. 21 depicts an exemplary method of forming an ad hoc social network using the central orchestration engine.

FIG. 21 depicts an exemplary method of forming an ad hoc social network using the central orchestration engine. In the depicted method 2100, a user interest profile (IP) is generated 2105 for a user (e.g., a service seeking entity, a member of a service seeking entity). The interest profile may, by way of example and not limitation, be generated based on manual input from a user, a user historic behavior profile (e.g., service providers visited and/or inquired about) and/or entity preference profile (e.g., indications of interest), third-party sources of interests (e.g., a social media networking service which the user has (publicly) posted to, a media publishing service on which the user has published content), or some combination thereof. In various embodiments, for example, at least one machine learning algorithm may process various sources to determine and/or suggest interests for an interest profile. Some embodiments may, for example, integrate an interest profile into a historic behavior profile and/or entity preference profile for the user.

A user availability profile is further generated 2110 for the user. The availability profile may, by way of example and not limitation, be generated based on manual input from a user (e.g., "I am normally available for social events between 6-10 PM on Fridays"), user and/or third-party scheduling services (e.g., a calendar accessible by the central orchestration engine 130), at least one historic behavior profile (e.g., determining that the user typically has joined multi-party service seeking entities at specific time(s) and/or date(s)) and/or entity preference profile of the user, or some combination thereof.

If the user does not request to form a (social) network with other users now 2115 (e.g., the user is not currently available to join a social event), then the user availability profile is applied 2120 to determine potential (future) participants (e.g., other users) in a social network with the user. For example, other social networks which are broadcasting for potential members may be selected based on the availability profile of the user. Once potential networks are selected 2120 based on the availability profile of the user, or if the user requests to form a network now 2115 (e.g., the user wishes to find and/or form a social event this afternoon), then the user's interest profile is applied 2125 to (further) determine potential network participants. For example, other users and/or social networks (e.g., currently broadcasting for members and/or to join a network) sharing at least one interest characteristic may be selected (e.g., enjoying formal dining, enjoying British history, enjoys dining downtown).

If the user permits and/or requests broadcasting to other users 2130 (e.g., of their interest profile and/or availability profile), then the selected potential network participants are notified 2135. Subsequently, or if the user chooses not to broadcast 2130, then a display is generated 2140 of potential network participants. If at least one participant joins 2145 a network with the user, then a service seeking entity profile(s) (e.g., an historic behavior profile, entity preference profile) is generated 2150 for the multi-party network (e.g., by the central orchestration engine 130). Accordingly, various embodiments may advantageously enable an ad hoc social network to form and to dynamically coordinate service with one or more service providers (e.g., as disclosed at least with reference to FIGS. 16-20).

Figure 22:
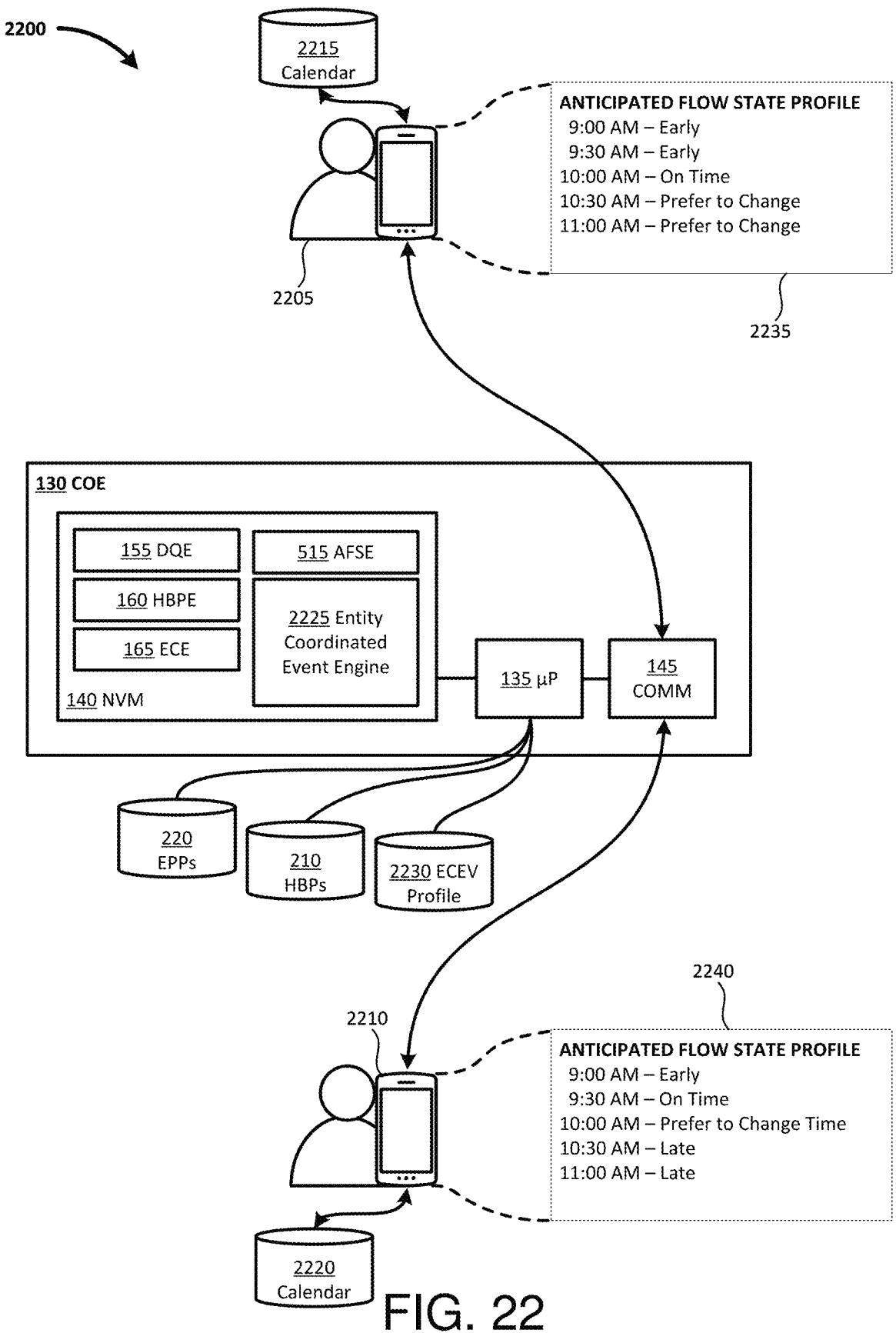
FIG. 22 depicts exemplary anticipated flow state profiles generated by the central orchestration engine for exemplary coordinating entities seeking to arrange an entity coordinated event.

FIG. 22 depicts exemplary anticipated flow state profiles generated by the central orchestration engine for exemplary coordinating entities seeking to arrange an entity coordinated event. In the depicted scenario 2200, a first coordinating entity 2205 and a second coordinating entity 2210 are seeking to coordinate an entity coordinated event. The coordinated event may, by way of example and not limitation, be a business meeting, social meeting, family get-together, or some combination thereof. The coordinating entities 2205 and 2210 communicate (e.g., via respective computing devices) with the central orchestration engine 130 via the communication module 145. The coordinating entities 2205-2210 may, for example, provide access to their calendars (as depicted, stored in corresponding data stores) 2215 and 2220, respectively.

As depicted, the microprocessor 135 executes code stored on various non-volatile memory modules 140 including dynamic queuing engine 155, historic behavior profile engine 155, execution confidence engine 155, anticipated flow state engine 515, an entity coordinated event engine 2225, or some combination thereof. The microprocessor may, for example, retrieve data from and/or store data to entity preference profile data store 220, historic behavior profile data store 210, and an entity coordinated event (ECEV) profile (ECEVP) data store 2230.

In the depicted example, the coordinating entities 2205 and 2210 may be seeking to coordinate an event before noon on a given day. The central orchestration engine 130 may, for example, in response to a request for event coordination between the entities 2205-2210, generated a first anticipated flow state profile (AFSP) 2235 for the entity 2205. The anticipated flow state profile may, for example, be generated according to the entity coordinated event engine 2225. The entity coordinated event engine 2225 may, for example, use the anticipated flow state engine 515 to generate the anticipated flow state profile. The anticipated flow state profile may, for example, be based on (e.g., using the historic behavior profile engine 155) at least one historic behavior profile and/or entity preference profile of the entity 2205, confidence level(s) of execution for time intervals (e.g., generated using the execution confidence engine 165), prioritization of other events (e.g., using the dynamic queuing engine 155, generated according to events in the calendar 2215), or some combination thereof. In various embodiments an entity preference profile may, by way of example and not limitation, be generated and/or updated in response to an input (e.g., operating a (virtual) toggle, radio button, selecting at least one of a list of (predetermined) anticipated flow state options) from a user (e.g., a coordinating entity) via an interface (e.g., of a mobile app).

In the depicted example, the anticipated flow state profile 2235 for the requested time (range) indicates that the entity 2205 will have an anticipated flow state associated with being "early" to a proposed event from 9:00-9:30 AM, an anticipated flow state associated with being "on time" at 10:00 AM, and an anticipated flow state associated with preferring to change the time of the proposed event from 10:30-11:00 AM. An anticipated flow state profile 2240 is likewise generated for the entity 2210. The anticipated flow state profile 2240 indicates that the entity 2210 will have an anticipated flow state associated with being early at 9:00 AM, an anticipated flow state associated with being on time at 9:30 AM, an anticipated flow state associated with preferring to change time of the proposed event at 10:00 AM, and an anticipated flow state associated with being late from 10:30-11:00 AM.

The entities 2205-2210 may, for example, selected to meet at 9:00 AM. In various embodiments the anticipated flow state profile(s) of the entities may be dynamically regenerated (e.g., in response to geolocation, changes in schedule, status updates from the entities). Accordingly, the entities may, for example, choose to reschedule their meeting based on updated anticipated flow state profiles. For example, if a later meeting is cancelled for entity 2205 and an unexpected 8:30 AM meeting is likely to run over time for entity 2210, the anticipated flow state profiles 2235 and 2240 may be updated accordingly, and the entities 2205 and 2210 may choose to reschedule to 10:00 AM. In various embodiments rescheduling may, by way of example and not limitation, be performed manually (e.g., at the user's instigation, in response to a suggestion(s) from the central orchestration engine 130), be performed automatically by the central orchestration engine 130, or some combination thereof. Various embodiments may advantageously enable coordinating entities to dynamically coordinate proposed and/or planned events.

Figure 23:
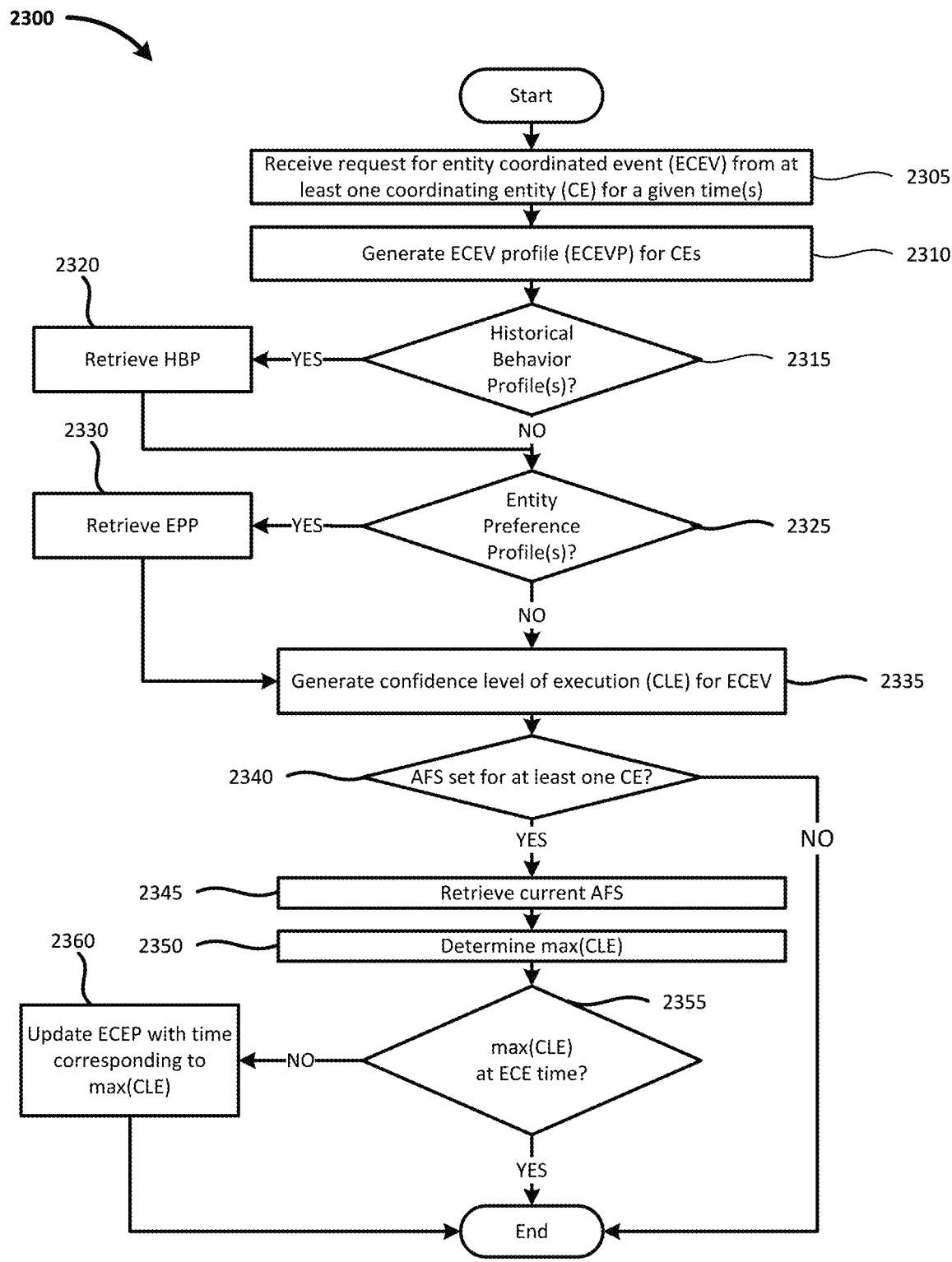
FIG. 23 depicts an exemplary method of generating an entity coordinated event profile for coordinating entities.

FIG. 23 depicts an exemplary method of generating an entity coordinated event profile for coordinating entities. In the depicted method 2300, a request is received 2305 for an entity coordinated event from at least one coordinating entity for at least one given time. An entity coordinated event profile is generated 2310 for the coordinating entities in response to the request (e.g., by the entity coordinated event engine 2225 of the central orchestration engine 130).

If a historic behavior profile is available 2315 for at least one of the coordinating entities, then the historic behavior profile(s) is retrieved 2320. If an entity preference profile is available 2325 for at least one of the coordinating entities, then the entity preference profile(s) is retrieved 2330. A confidence level of execution is generated 2335 for the entity coordinated event at one or more times (e.g., defined in the request and/or at least one entity preference profile). The confidence level of execution may be generated, by way of example and not limitation, based on the historic behavior profile(s) and/or entity preference profile(s) of the coordinating entities, if available; from scheduling data received from at least one coordinating entity; from historic behavior profile(s) and/or entity preference profile(s) of related entities (e.g., entities having events with at least one of the coordinating entities near, such as before, a proposed coordinated event time(s)).

If no anticipated flow state is set 2340 for any of the coordinating entities, the method ends. If an anticipated flow state is set 2340 (e.g., manually, automatically) for at least one of the coordinating entities, then the current anticipated flow state(s) is retrieved 2345 and a maximum confidence level of execution is determined 2350 for the entity coordinated event profile (e.g., corresponding to each of one or more times). If the maximum confidence level of execution corresponds to a proposed time for the coordinated event 2355, then the method ends. If a time associated with the maximum confidence level of execution does not correspond to the proposed event time, then the entity coordinated event profile is updated 2360 (e.g., automatically, manually, automatically after confirmation from some or all coordinating entities) accordingly and the method ends. In various embodiments an anticipated flow state of a coordinating entity may, by way of example and not limitation, be self-declared and/or automatically generated.

In various embodiments an entity coordinated event may be established (e.g., by an entity coordinated event profile) at an agreed upon meeting time and place. The central orchestration engine 130 may, for example, dynamically update all the coordinating entities. In some embodiments at least one coordinating entity may provide a (dynamic) personal self-declared flow state. The self-declared flow state may, for example, communicate to the other coordinating entities that the declaring coordinating entity may be running late. Each coordinating entity may, for example, be provided with an interface in which a self-declared flow state may be enabled and/or set.

For example, in an exemplary scenario, if two coordinating entities schedule lunch for Thursday at 12:00 PM and then the Monday before one coordinating entity's boss schedules an intensive meeting for 11:00 AM on Thursday, that coordinating entity can update the system that shares their personal anticipated flow state accordingly, thereby putting the other coordinating entity on notice that the event meeting time may be in jeopardy. The coordinating entities may, for example, reschedule in response (e.g., manually, manually in response to a suggestion from the central orchestration engine 130, automatically by the central orchestration engine 130).

In various embodiments the central orchestration engine 130 may be provided with access to all a coordinating entity's coordinated events, corresponding locations, and the type of each event (e.g., phone call, physical location with address). Accordingly, the central orchestration engine 130 may, for example, predict whether the coordinating entity is going to make a particular entity coordinated event. The central orchestration engine 130 may, by way of example and not limitation, predict and/or notify a user if a coordinated event is going to be delayed, if other entities for planned events are actually available to meet early, or some combination thereof.

Various embodiments may, for example, advantageously enable multiple entities (e.g., individuals, parties) to coordinate a time mutually and dynamically for a planned event. In various embodiments the entity coordinated event profile may be updated (e.g., based on updated confidence level(s) of execution) in response, by way of example and not limitation, to updates in schedule(s) and/or environments for at least one of the coordinating entities.

Although various embodiments have been described with reference to the figures, other embodiments are possible. For example, although exemplary systems have been described with reference to the various figures, other implementations may be deployed in other industrial, scientific, medical, commercial, and/or residential applications.

Various embodiments may, for example, implement one or more machine learning algorithms. In various embodiments, for example, an execution confidence engine may implement at least one machine learning algorithm to generate, by way of example and not limitation, a confidence level of execution based on entity profile(s), other events, or some combination thereof. A dynamic queuing engine may implement at least one machine learning algorithm to, by way of example and not limitation, dynamically prioritize predicted queuing profiles, to determine suggested predicted queuing profiles, or some combination thereof. A historic behavior profile engine may implement at least one machine learning algorithm to generate and/or update, by way of example and not limitation, historic behavior profiles based on received data, to identify and/or discover data related to entities for inclusion in a historic behavior profile, determine historic behavior profile parameters based on discovered and/or identified data, or some combination thereof.

In various embodiments an entity preference profile may include booking preferences of a service provider. For example, a service provider may prefer under-capacity booking (e.g., 75% of available capacity) to reserve room for walk-ins. A service provider may, for example, prefer booking substantially at capacity. A service provider may, for example, prefer overbooking (e.g., to mitigate no-shows). In various embodiments a service provider may set one or more booking parameters (such as capacity, confidence level of execution ranges for guaranteed booking, overbooking ratio). In various embodiments the central orchestration engine 130 may, by way of example and not limitation, auto-generate suggested changes to one or more parameters (e.g., if a historic behavior profile(s) of the service provider indicates long wait times due to overbooking or low capacity utilization due to under booking, at least at certain times), auto-apply auto-generated suggestions (e.g., if permitted by an entity preference profile of the service provider), or some combination thereof. For example, in some embodiments an entity preference profile may include at least one predicted queuing profile preferences profile which may, by way of example and not limitation, include booking preferences (e.g., which may affect prioritization of a predicted queuing profile(s) of the service provider).

In various embodiments service seeking entities may, for example, purchase and/or bid for an increased priority. A confidence level of execution may, for example, be at least partially a function of a loyalty and/or rewards membership with a service provider or other entity (e.g., an organization, a company operating a central orchestration engine 130), a successful bid for a certain level of priority (e.g., a confidence level of execution corresponding to a guaranteed status), a pre-purchased ticket for service, or some combination thereof. In various embodiments an entity other than a given service provider may, for example, sell a (previously purchased) ticket for service at the given service provider. For example, the central orchestration engine 130 may receive a listing for the ticket and may promote the ticket to service seeking entities on a waitlist for the corresponding service provider.

In various embodiments a service provider may, by way of example and not limitation, 'bid' for customers. For example, a service provider may provide incentives which may attract service seeking entities to join a predicted queuing profile at a desired time. The service provider may, for example, include in their entity preference profile discounts at times which may correspond to slow times, may include in the entity preference profile discounts for any predicted queuing profile which is below a predetermined percentage of capacity, or some combination thereof. In various embodiments a service provider may, for example, bid for and/or purchase increased priority in presentation to customers who are seeking service providers (e.g., a disclosed at least with reference to FIGS. 16-20).

In various embodiments a historic behavior profile may include, for example, one or more predicted queuing profile fulfillment profiles. A fulfillment profile may, for example, correlate (e.g., by dynamic queueing event profile identifier, predicted queuing profile identifier) associating a fulfilment outcome (e.g., served on time, served late, served early, customer dissatisfied, customer satisfied) of at least some dynamic queueing event profile(s) in the corresponding historic predicted queuing profile(s). In some embodiments, by way of example and not limitation, a fulfillment profile may include corresponding confidence levels of execution and outcomes for (each) dynamic queueing event profile in the historic predicted queuing profile.

In various embodiments a multi-party service seeking entity may be formed (e.g., an ad hoc social network, such as disclosed at least with reference to FIG. 21 and/or FIGS. 22-23). The members may, for example, join an entity coordinated event (e.g., as disclosed at least with reference to FIGS. 22-23) to walk around and enjoy an area of town or other defined meeting point. In various embodiments a central orchestration engine 130 may generate advertising for nearby service providers. The service providers may, for example, set in an entity preference profile preferred customers, target bid amounts, or some combination thereof. In various embodiments the central orchestration engine 130 may determine (e.g., by machine learning, based on historic behavior profile(s)) preferences of the service provider and may apply them accordingly (e.g., in combination with bid amounts and/or spend caps in at least one associated entity preference profile).

In various embodiments the central orchestration engine 130 may, for example, generate advertising based on a historic behavior profile and/or entity preference profile of a service seeking entity and/or coordinating entity. In various embodiments a service seeking entity and/or coordinating entity may, by way of example and not limitation, be prompted to enter preferences (e.g., a preference for Mexican and Italian food). In various such embodiments, the central orchestration engine 130 may, for example, generated advertised specials to individuals and/or service seeking entities with corresponding entity preference profiles and/or historic behavior profiles who are nearby their location.

In various embodiments an anticipated (e.g., future such as next day, immediate future, such as soonest possible future) flow state may, by way of example and not limitation, be one of at least four values: No wait+Special pricing (e.g., actively advertising specials to attract customers, such as outside of peak times), No wait, Short wait, Long wait.

In various embodiments a service seeking entity may be provided with a wish list profile (e.g., in an entity preference profile, in a separate data store and/or profile). For example, a user may denote a service provider as a 'wish to use' in response to a suggestion from someone (e.g., in person, reading a review). An app may, for example, provide an interface for the user to manage one or more wish lists of service providers.

In various embodiments a wish list may be used by the central orchestration engine 130 to suggest social networks and/or entity coordinated event related to that service provider. In various embodiments the central orchestration engine 130 may, for example, notify the service seeking entity of incentives offered by the service provider (e.g., corresponding to a flow state of No wait+Special pricing). The central orchestration engine 130 may, by way of example and not limitation, offer a suggested dynamic queueing event profile to the service seeking entity when the service seeking entity is geographically near a service provider on a wish list of the service seeking entity (e.g., at a time when the service seeking entity normally would request service at a similar service provider).

In various embodiments the central orchestration engine 130 may provide an interface in which a (member of a) service seeking entity may (provisionally) request a change in size of the service seeking entity. For example, an organizer of a multi-party service seeking entity may test adding a person to the service seeking entity. The central orchestration engine 130 may, for example, determine an updated confidence level of execution for the corresponding dynamic queueing event profile in a requested predicted queuing profile and indicate whether the person may be added while maintaining a desired (e.g., guaranteed) status in the predicted queuing profile. In various embodiments a single service seeking entity may, for example, request to convert to a multi-party service seeking entity. Various embodiments may advantageously permit dynamic updating and coordinating of schedules of multiple members of a service seeking entity.

In various embodiments a service provider may require confirmation (e.g., as indicated in an associated entity preference profile) of a request for service by a service seeking entity. For example, a service seeking entity may be prompted to select (or, for example, the central orchestration engine 130 may automatically select) one or more predicted queuing profiles available (e.g., associated with a confidence level of execution for the service seeking entity above a predetermined threshold). A confirmation message may, for example, be provided to the service provider. The service provider may subsequently select and/or confirm at least one of the time (blocks) requested. A dynamic queueing event profile, predicted queuing profile, and/or confidence level of execution associated with the request for service may then be updated (e.g., to guaranteed status) based on the confirmation.

In various embodiments generating a display may, by way of example and not limitation, include generating a set of data (e.g., transmitted as a file, an electronic message, and/or an electromagnetic signal) which may be transmitted to another device and/or service for actual generation of the display on a user device. For example, in various embodiments the central orchestration engine 130 may generate at least one display file and/or message (e.g., parameters necessary to generate a custom display) and transmit it to a user device (e.g., running an app configured to receive and act upon the file/message received from the central orchestration engine 130). The user device may physically generate the display, in response to receiving the file and/or message from the central orchestration engine 130.

In various embodiments, by way of example and not limitation, an anticipated flow state, a dynamic queueing event profile, a predicted queuing profile, a confidence level of execution, a historic behavior profile, other appropriate profile, or some combination thereof, may be updated (e.g., by operating an appropriate engine(s) and/or applying an appropriate method(s)) in response to, by way of example and not limitation, a new request for service, an altered request for service, an updated service availability from a service provider, updated inventory factors (e.g., tables available, wait staff, food), environmental factors (e.g., traffic conditions, weather conditions), or some combination thereof.

In various embodiments a dynamic queueing event profile may include meta data that allows a central orchestration engine 130 to predict behaviors to allow a service provider (and/or the central orchestration engine 130 on behalf of the service provider) to virtually queue people in a prioritized way and/or overbook the queue with confidence.

In various embodiments a profile such as, by way of example and not limitation, a dynamic queueing event profile, predicted queuing profile, historic behavior profile, entity preference profile, availability profile, fulfillment profile, execution profile, or some combination thereof, may be generated, processed, transmitted, and/or stored as a file and/or electronic message. For example, a profile may be stored in a data based on one or more NVMs and/or RAMs. In some embodiments a profile may be represented as a specific file format including, by way of example and not limitation, meta data, pointers, identifiers (e.g., of persons such as name and/or identification number, of other profiles and/or data structures). In various embodiments one or more profiles may, for example, be a unique file format containing predetermined data elements and/or types. In some embodiments a profile may, for example, be stored in and/or retrieved from a database.

In various embodiments a geolocation engine 225 may, for example, determine when a service seeking entity leaves a service provider (e.g., determined by exiting a geofence). For example, the central orchestration engine 130 may determine a duration of service. The central orchestration engine 130 may, for example, update a historic behavior profile of the service seeking entity and/or the service provider (e.g., using the historic behavior profile engine 160). In various embodiments an algorithm of service seeking entity and/or service provider flow calculations may be advantageously trained. Various embodiments may, for example, advantageously increase accuracy of confidence level of execution based on historical durations of service for service providers and/or service seeking entities. Various embodiments may, for example use duration of service to improve anticipated flow state calculations and/or to update entity preference profiles for booking rates (e.g., overbooking rates) of associated service providers.

In various embodiments a central orchestration engine 130 may provide a service seeking entity an indication of probability of clearing a waitlist. For example, a service provider may select a threshold confidence level of execution before allowing a service seeking entity to be moved from 'waitlist' status to 'reserved' status (e.g., whether under booking, at capacity booking, and/or over booking). In various embodiments the central orchestration engine 130 may (additionally) determine, based on at least one historic behavior profile of the service provider, that although the service provider has reserved 20% of capacity for walk-ins (e.g., in an entity preference profile of the service provider), the service provider historically has 15% (e.g., for similar times and/or predicted queuing profile characteristics). Accordingly, the central orchestration engine 130 may indicate to the service seeking entity a reasonable expectation of being able to be served at the requested time (e.g., corresponding to a confidence level of execution threshold determined by the service seeking entity and/or the central orchestration engine 130).

Various such embodiments may, for example, advantageously permit a service seeking entity to plan accordingly (e.g., whether to make arrangements related to the requested time, whether to make backup plans assuming the request for service will not be fulfilled). For example, if a service seeking entity injures their back on a Wednesday evening and requests service for Thursday or Friday at the chiropractor (e.g., through the central orchestration engine 130), but the first available predicted queuing profile with a guaranteed status is a week and a half later, the service seeking entity may join a standby list. The central orchestration engine 130 may, for example, generate an indication of probability (e.g., corresponding to one or more confidence level of execution for earlier predicted queuing profiles, based on historic behavior profiles and/or entity preference profiles of the service provider and/or service seeking entities associated with the earlier predicted queuing profiles) of availability of being moved from the standby list (e.g., as disclosed at least with reference to FIGS. 14-15) to a predicted queuing profile on Thursday or Friday. If the service seeking entity determines that the indicated probability is too low, for example, the service seeking entity may choose to request service with a different service provider.

In various embodiments the central orchestration engine 130 may, for example, update a historic behavior profile in response to outcomes of a dynamic queueing event profile. For example, a historic behavior profile may, by way of example and not limitation, include indications of how many times, what dates/times, what service providers, and/or what types of requests for service are kept by a user. A historic behavior profile may, for example, include data regarding whether a service seeking entity has confirmed a request for service. The historic behavior profile may, for example, correlate confirmation from a service seeking entity to outcome of the dynamic queueing event profile. The historic behavior profile may, for example, affect later confidence levels of execution generated for the service seeking entity and/or predicted queuing profiles which the service seeking entity seeks to join.

For example, a service seeking entity with a record of being on time may receive a high confidence level of execution for a requested predicted queuing profile. A service seeking entity with a record of being late may, for example, receive a low confidence level of execution for a requested predicted queuing profile (but may, for example, receive a higher confidence level of execution for a later predicted queuing profile). A service seeking entity with a record of showing up after confirming may, for example, receive a high confidence level of execution for a requested predicted queuing profile after confirmation. A service seeking entity with a history of not showing up after confirmation may, for example, receive a very low confidence level of execution for a requested predicted queuing profile, even or especially after confirmation.

In various embodiments a dynamic queueing event profile of an entity (e.g., service seeking entity, service provider, coordinating entity) may, for example, include a dynamic queueing event profile execution profile. For example, a dynamic queueing event profile execution profile may correlate historical dynamic queueing event profile(s) with at least one corresponding outcome (e.g., cancelled, no-showed, arrived, arrived on-time, arrived 6 minutes early, arrived 15 minutes late, purchased, visited competing service provider, provided service late, provided service on-time, provided service early, provided service satisfying customer). Various embodiments disclosed herein may, by way of example and not limitation, update a historic behavior profile such that the historic behavior profile includes a dynamic queueing event profile execution profile (e.g., using historic behavior profile engine 160 and/or dynamic queuing engine 155), apply a dynamic queueing event profile execution profile of at least one historic behavior profile (e.g., execution confidence engine 155), or some combination thereof.

Service providers may offer various services to service seeking entities. For example, service providers may offer dining, hospitality, professional consultation, healthcare, construction, transportation, or some combination thereof. Service providers may, for example, receive requests for service from service seeking entities. The service providers may, for example, make lists of request for service.

Service providers may maintain lists for request using tables, lists, calendars, or some combination thereof. A service provider may, for example, maintain a reservation list, a wait list, an appointment list, a standby list, or some combination thereof. Service providers may, for example, request confirmation form a service seeking entity that the service seeking entity still intends to keep the appointment. Service providers may, for example, send reminders prior to a planned time of service. Service providers may, for example, overbook to compensate for users who will not arrive at a planned time of service.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an exemplary aspect, a computer program product may include a program of instructions tangibly embodied on a computer readable medium. When the instructions are executed on a processor, the processor may causes operations to be performed to automatically prioritize predicted events in a dynamic predicted queueing profile (PQP) for a service provider (SP) for a finite future time period. The operations may include generate, in response to a request signal representing a request for service from a service seeking entity (SSE) seeking service from the SP at the future time period, a dynamic queueing event profile (DQEP) associating the SSE with the PQP for the SP at the future time period. The operations may include generate a confidence level of execution for each DQEP in the PQP for the SP at the future time period based at least on both a historical behavior profile (HBP) of the SP and a HBP of the corresponding SSE. The operations may include apply the confidence level of execution to each corresponding DQEP to assign a priority in the PQP.

The operations may further include generate a predicted convergence time of the DQEP corresponding to a maximum confidence level based at least on the HBP of the corresponding SSE. The operations may further include if the predicted convergence time is not within the future time period, then associating the DQEP with at least one additional PQP corresponding to the predicted convergence time. The HBP of the SSE may include a DQEP execution profile associated with a first at least one historical PQP. The HBP of the SP may include at least one PQP fulfillment profile associated with a second at least one historical PQP. The confidence level of execution may at least partially be determined as a function of the DQEP execution profile of the HBP and the PQP fulfillment profile of the HBP. The confidence level of execution may be at least partially determined as a function of a PQP preferences profile of the SP, the PQP preferences profile containing an availability of service of the SP for at least one future PQP. The operations may further include apply the PQP preferences profile of the SP and the confidence level of execution for each DQEP associated with the PQP to assign at least one of the DQEPs a guaranteed service status.

A first DQEP of the DQEPs may be associated with the PQP is assigned a guaranteed status. A second DQEP of the DQEPs associated with the PQP may be assigned to a standby list associated with the SP. The second DQEP may be associated with an availability profile defining availability of a second SSE for at least one future time period. The operations may further include receive a cancellation of the first DQEP. The operations may further include, if the availability profile associated with the second DQEP defines availability of the second SSE for a time period defined by the PQP, then associate the second DQEP with the PQP and generate at least one electronic message to notify the second SSE of the association of the second DQEP with the PQP.

The request signal representing the request for service may further represent a request for service for at least one additional SP. The operations may further include prioritize, for the at least one additional SP, the DQEP in a corresponding at least one additional PQP. The operations may further include generate a DQEP confidence level of execution for each of the PQP and the at least one additional PQP as a function of the priority of the DQEP in each PQP.

The operations may further include receive current geolocation coordinates of the SSE in a predetermined time window before the future time period of the PQP. The operations may further include determine whether the geolocation coordinates are within a predetermined geofence associated with the SP. The operations may further include regenerate the confidence level of execution based at least on the presence of the geolocation coordinates of the SSE within the predetermined geofence associated with the SP.

The operations may further include receiving a networking request from each of a plurality of entities, each entity having an HBP. The operations may further include associate the plurality of entities together as the SSE. The operations may further include generate the HBP of the SSE based on each HBP of the plurality of entities.

In another exemplary aspect, a computer-implemented method may be performed by at least one processor to automatically prioritize predicted events in a dynamic predicted queueing profile (PQP) for a service provider (SP) for a finite future time period. The method may include generate, in response to a request signal representing a request for service from a service seeking entity (SSE) seeking service from the SP at the future time period, a dynamic queueing event profile (DQEP) associating the SSE with the PQP for the SP at the future time period. The method may include generate a confidence level of execution for each DQEP in the PQP for the SP at the future time period based at least on both a historical behavior profile (HBP) of the SP and a HBP of the corresponding SSE. The method may include apply the confidence level of execution to each corresponding DQEP to assign a priority in the PQP.

The method may further include generate a predicted convergence time of the DQEP corresponding to a maximum confidence level based at least on the HBP of the corresponding SSE. The method may further include, if the predicted convergence time is not within the future time period, then associate the DQEP with at least one additional PQP corresponding to the predicted convergence time. The HBP of the SSE may include a DQEP execution profile associated with a first at least one historical PQP. The HBP of the SP may include at least one PQP fulfillment profile associated with a second at least one historical PQP. The confidence level of execution may be at least partially determined as a function of the DQEP execution profile of the HBP and the PQP fulfillment profile of the HBP.

The confidence level of execution may be at least partially determined as a function of a PQP preferences profile of the SP, the PQP preferences profile containing an availability of service of the SP for at least one future PQP. The method may further include apply the PQP preferences profile of the SP and the confidence level of execution for each DQEP associated with the PQP to assign at least one of the DQEPs a guaranteed service status.

A first DQEP of the DQEPs associated with the PQP may be assigned a guaranteed status. A second DQEP of the DQEPs associated with the PQP may be assigned to a standby list associated with the SP. The second DQEP may be associated with an availability profile defining availability of a second SSE for at least one future time period. The method may further include receive a cancellation of the first DQEP. The method may further include, if the availability profile associated with the second DQEP defines availability of the second SSE for a time period defined by the PQP, then associate the second DQEP with the PQP and generate at least one electronic message to notify the second SSE of the association of the second DQEP with the PQP.

The request signal representing the request for service may further represent a request for service for at least one additional SP. The method may further include prioritize, for the at least one additional SP, the DQEP in a corresponding at least one additional PQP. The method may further include generate a DQEP confidence level of execution for each of the PQP and the at least one additional PQP as a function of the priority of the DQEP in each PQP.

The method may further include receive current geolocation coordinates of the SSE in a predetermined time window before the future time period of the PQP. The method may further include determine whether the geolocation coordinates are within a predetermined geofence associated with the SP. The method may further include regenerate the confidence level of execution based at least on the presence of the geolocation coordinates of the SSE within the predetermined geofence associated with the SP.

The method may further include receive a networking request from each of a plurality of entities, each entity having an HBP. The method may further include associate the plurality of entities together as the SSE. The method may further include generate the HBP of the SSE based on each HBP of the plurality of entities.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer program product comprising:
   a program of instructions tangibly embodied on a non-transitory computer readable medium wherein, when the instructions are executed on a processor, the processor causes operations to be performed to automatically prioritize predicted events in a dynamic predicted queueing profile data structure for a service provider for a finite future time period, the operations comprising:
   generate, by the processor, in response to receiving a request signal originating from a first device associated with a first service seeking entity and representing a request for service from the first service seeking entity seeking service from a first service provider at a first future time period, a first dynamic queueing event profile comprising an association of the first service seeking entity with a first predicted queueing profile for the first service provider at the first future time period, wherein the first predicted queueing profile is stored in a first datastore and corresponds to a single time block for providing a service sought by the service seeking entity, and wherein the first predicted queueing profile comprises associations with a plurality of dynamic queueing event profiles associating a corresponding service seeking entity and the first service provider with the first predicted queueing profile for the first future time period, wherein the plurality of dynamic queueing event profiles are stored in a second at least one data store, and wherein the plurality of dynamic queueing event profiles comprises the first dynamic queueing event profiles;
   retrieve, from a third at least one data store, by the processor, a predetermined historical behavior profile of the first service provider and a predetermined historical behavior profile of the first service seeking entity;
   generate, by an execution confidence engine, for each of the plurality of dynamic queueing event profiles associated with the first predicted queueing profile, a confidence level of execution that the service seeking entity will receive service from the service provider in the first future time period represented by the single time block, wherein the confidence level of execution is based at least on an execution confidence model generated by a machine learning algorithm, current geolocation coordinates of the first service seeking entity in a predetermined time window before the future time period of the first predicted queueing profile, a historical behavior profile of the first service provider, a historical behavior profile of the corresponding service seeking entity, and a historical behavior profile of at least one service seeking entity associated with the plurality of dynamic queueing event profiles other than the first dynamic queueing event profile;

apply a dynamic queueing engine to each of the plurality of dynamic queueing event profiles to determine based on the corresponding confidence level of execution for each of the plurality of dynamic queueing event profiles, a corresponding priority in the first predicted queueing profile;

associate the first dynamic queueing event profile with the corresponding priority in the first predicted queueing profile such that the first dynamic queueing event profile is automatically prioritized in the first predicted queueing profile as a function of the corresponding historical behavior profile of the first service seeking entity and the historical behavior profile of the first service provider;

in response to an update signal corresponding to at least one of the first dynamic queueing event profile and the first predicted queueing profile, repeat the steps of generate a confidence level of execution and apply the dynamic queueing engine such that the first dynamic queueing event profile is automatically dynamically reprioritized in the first predicted queueing profile;

when the confidence level of execution for the first dynamic queueing event profile in the first predicted queueing profile meets at least one predetermined criterion, then generate a signal to associate the first dynamic queueing event profile—with a guaranteed status in the first predicted queueing profile;

generate a display signal configured to induce the first device to generate a graphical display based on the confidence level of execution corresponding to at least one of the plurality of predicted queueing profiles corresponding to at least one future finite time period; and, in response to a training signal, perform training operations to retrain the execution confidence model by a machine learning algorithm, wherein the training operations are applied repeatedly until an accuracy score meets at least one predetermined accuracy criterion, wherein the accuracy score is generated as a function of an output generated based on a predetermined set of requests for service by the retrained executed confidence model and a target outcome of the predetermined set of requests.

2. The computer program product of claim 1, the operations further comprising:
retrieve, from a third at least one data store, by the processor, a predetermined historical behavior profile of the first service provider; and,
when associating the first dynamic queueing event profile with the corresponding priority in the first predicted queueing profile, the first dynamic queueing event profile is automatically prioritized in the first predicted queueing profile as a function of the corresponding historical behavior profile of the first service seeking entity and the historical behavior profile of the first service provider; wherein the confidence level of execution is based also on a historical behavior profile of the first service provider.

3. The computer program product of claim 1, the operations further comprising:
generate a predicted convergence time of the first dynamic queueing event profile corresponding to a maximum confidence level based at least on the first historical behavior profile of the first service seeking entity.

4. The computer program product of claim 3, the operations further comprising:
if the predicted convergence time is not within the first future time period, then add an association between the first dynamic queueing event profile and at least one additional predicted queueing profile for the first service provider and corresponding to the predicted convergence time.

5. The computer program product of claim 1, wherein:
the first historical behavior profile of the first service seeking entity includes a dynamic queueing event profile execution profile associated with a first at least one historical predicted queueing profile,
the first historical behavior profile of the first service provider includes at least one predicted queueing profile fulfillment profile associated with a second at least one historical predicted queueing profile and,
the confidence level of execution for the first dynamic queueing event profile in the first predicted queueing profile is at least partially determined as a function of the dynamic queueing event profile execution profile of the first historical behavior profile of the first service seeking entity and the predicted queueing profile fulfillment profile of the first historical behavior profile of the first service provider.

6. The computer program product of claim 1, wherein:
the confidence level of execution for the first dynamic queueing event profile in the first predicted queueing profile is at least partially determined as a function of a predicted queueing profile preferences profile of the first service provider, the predicted queueing profile preferences profile containing an availability of service of the service provider for at least one future predicted queueing profile.

7. The computer program product of claim 6, the operations further comprising:
apply the predicted queueing profile preferences profile of the first service provider and the confidence level of execution for each dynamic queueing event profile associated with the first predicted queueing profile to assign at least one of the dynamic queueing event profiles a guaranteed service status.

8. The computer program product of claim 1, wherein:
a second dynamic queueing event profile of the dynamic queueing event profiles associated with the predicted queueing profile is assigned a guaranteed booking status,
a third dynamic queueing event profile of the dynamic queueing event profiles associated with the predicted queueing profile is assigned to a standby list associated with the service provider, the third dynamic queueing event profile is associated with a service availability profile defining availability of a second service seeking entity for at least one future time period, and, the operations further comprise:

receive a service booking cancellation of the second dynamic queueing event profile;

if the service availability profile associated with the third dynamic queueing event profile defines availability of the second service seeking entity for a time period defined by the first predicted queueing profile, then:

associate the third dynamic queueing event profile with the first predicted queueing profile and generate at least one electronic message to notify the second service seeking entity of the association of the third dynamic queueing event profile with the first predicted queueing profile.

9. The computer program product of claim 1, wherein the request signal representing the request for service further represents a request for service for at least one additional service provider, and, the operations further comprise:

prioritize, for the at least one additional service provider, the first dynamic queueing event profile in a corresponding at least one additional predicted queueing profile; and, generate a dynamic queueing event profile confidence level of execution for each of the first predicted queueing profile and the at least one additional predicted queueing profile as a function of the priority of the first dynamic queueing event profile in each predicted queueing profile.

10. The computer program product of claim 1, the operations further comprising:

receive current geolocation coordinates of the first service seeking entity in a predetermined time window before the future time period of the first predicted queueing profile;

determine whether the geolocation coordinates are within a predetermined geofence associated with the first service provider; and, automatically regenerate the confidence level of execution corresponding to the dynamic queueing event profile in the predicted queueing profile based at least on a presence of the geolocation coordinates of the first service seeking entity within the predetermined geofence associated with the first service provider.

11. The computer program product of claim 1, the operations further comprising:

receive a networking request from each of a plurality of entities, each entity having an historical behavior profile;

associate the plurality of entities together as the first service seeking entity; and, generate the first historical behavior profile of the service seeking entity based on each historical behavior profile of the plurality of entities.

12. The computer program product of claim 1, the operations further comprising:

retrieve a plurality of predicted queueing profiles;

for each of the predicted queueing profiles, generate an anticipated flow state based on a historical behavior profile of the first service seeking entity, on the historical behavior profile of the first service provider, and on the historical behavior profile of at least one other service seeking entity associated with the currently selected predicted queueing profile;

for each of the anticipated flow states, generate an anticipated wait time associated with the first service seeking entity; and, generate, at the first device, a graphical display corresponding to the anticipated wait time of the first service provider at the plurality of predicted queueing profiles corresponding to the first finite time period.

13. The computer program product of claim 1, wherein at least two of the first data store, the second at least one data store, and the third at least one data store are the same.

14. A computer-implemented method performed by at least one processor to automatically prioritize predicted events in a dynamic predicted queueing profile data structure for a service provider for a finite future time period, the method comprising:

generate, in response to a request signal originating from a first device associated with a first service seeking entity and representing a request for service from a first service seeking entity seeking service from the first service provider at a first future time period, a first dynamic queueing event profile associating the first service seeking entity with a first predicted queueing profile for the first service provider at the first future time period, wherein the first predicted queueing profile corresponds to a single time block for providing a service sought by the service seeking entity, and wherein the first predicted queueing profile comprises associations with a plurality of dynamic queueing event profiles associating a corresponding service seeking entity and the first service provider with the first predicted queueing profile for the first future time period, wherein the plurality of dynamic queueing event profiles comprises the first dynamic queueing event profile;

generate, by an execution confidence engine, for each of the plurality of dynamic queueing event profiles associated with the first predicted queueing profile, a confidence level of execution that the service seeking entity will receive service from the service provider in the first future time period, for the first service provider at the first future time period based at least on an execution confidence model, current geolocation coordinates of the first service seeking entity in a predetermined time window before the future time period of the first predicted queueing profile, and a historical behavior profile of the corresponding service seeking entity; and, apply a dynamic queueing engine to each of the plurality of dynamic queueing event profiles to automatically determine, based on the corresponding confidence level of execution for each of the plurality of competing dynamic queueing event profiles, a priority of the first dynamic queueing event profile in the first predicted queueing profile;

generate a display signal configured to induce the first device to generate a graphical display based on the confidence level of execution corresponding to at least one of the plurality of predicted queueing profiles corresponding to at least one future finite time period; and, in response to a training signal, perform training operations to retrain the execution confidence model by a machine learning algorithm, wherein the training operations are applied repeatedly until an accuracy score of the execution confidence model meets at least one predetermined accuracy criterion, wherein the accuracy score is generated as a function of an output generated by the retrained executed confidence model based on a set of requests for service and a target outcome of the set of requests.

15. The method of claim 14, wherein the execution confidence engine generates the confidence level of execution that each service seeking entity will receive service from the service provider in the first future time period, for the first service provider at the first future time period based also on a historical behavior profile of the first service provider.

16. The method of claim 14, further comprising:
generate a predicted convergence time of the first dynamic queueing event profile corresponding to a maximum confidence level based at least on the historical behavior profile of the first service seeking entity.

17. The method of claim 16, further comprising:
if the predicted convergence time is not within the first future time period, then also associate the first dynamic queueing event profile with at least one additional predicted queueing profile corresponding to the predicted convergence time for the service provider.

18. The method of claim 14, wherein:
the historical behavior profile of the first service seeking entity includes a dynamic queueing event profile execution profile associated with a first at least one historical predicted queueing profile,
the historical behavior profile of the first service provider includes at least one predicted queueing profile fulfillment profile associated with a second at least one historical predicted queueing profile, and,
the confidence level of execution for the first dynamic queueing event profile in the first predicted queueing profile is at least partially determined as a function of the dynamic queueing event profile execution profile of the historical behavior profile of the first service seeking entity and the predicted queueing profile fulfillment profile of the historical behavior profile of the first service provider.

19. The method of claim 14, wherein:
the confidence level of execution for the first dynamic queueing event profile in the first predicted queueing profile is at least partially determined as a function of a predicted queueing profile preferences profile of the first service provider, the predicted queueing profile preferences profile containing an availability of service of the first service provider for at least one future predicted queueing profile.

20. The method of claim 19, further comprising:
apply the predicted queueing profile preferences profile of the first service provider and the confidence level of execution for each of the plurality of dynamic queueing event profiles associated with the first predicted queueing profile to assign at least one of the plurality of dynamic queueing event profiles a guaranteed service status.

21. The method of claim 14, wherein:
a second dynamic queueing event profile of the plurality of dynamic queueing event profiles associated with the first predicted queueing profile is assigned a guaranteed booking status,
a third dynamic queueing event profile of the dynamic queueing event profiles associated with the first predicted queueing profile is assigned to a standby list associated with the first service provider,
the third dynamic queueing event profile is associated with a hospitality service availability profile defining availability of a second service seeking entity for at least one future time period, and, the method further comprises:
receive a service booking cancellation of the second dynamic queueing event profile; and,
if the service availability profile associated with the third dynamic queueing event profile defines availability of the second service seeking entity for a time period defined by the first predicted queueing profile, then:
associate the third dynamic queueing event profile with the first predicted queueing profile and generate at least one electronic message to notify the second service seeking entity of the association of the third dynamic queueing event profile with the first predicted queueing profile.

22. The method of claim 14, wherein the request signal representing the request for service further represents a request for service for at least one additional service provider, and, the method further comprises:
prioritize, for the at least one additional service provider, the first dynamic queueing event profile in a corresponding at least one additional predicted queueing profile; and,
generate a dynamic queueing event profile confidence level of execution for each of the first predicted queueing profile and the at least one additional predicted queueing profile as a function of the priority of the first dynamic queueing event profile in each predicted queueing profile.

23. The method of claim 14, further comprising:
receive current geolocation coordinates of the first service seeking entity in a predetermined time window before the future time period of the first predicted queueing profile;
determine whether the geolocation coordinates are within a predetermined geofence associated with the first service provider; and,
automatically regenerate the confidence level of execution for the first dynamic queueing event profile in the first predicted queueing profile and automatically reprioritize the first dynamic queueing event profile in the first predicted queueing profile based at least on a presence of the geolocation coordinates of the first service seeking entity within the predetermined geofence associated with the first service provider.

24. The method of claim 14, further comprising:
receive a networking request from each of a plurality of entities, each entity having an historical behavior profile;
associate the plurality of entities together as the first service seeking entity; and,
generate the historical behavior profile of the first service seeking entity based on each historical behavior profile of the plurality of entities.

25. The method of claim 14, further comprising:
retrieve a plurality of predicted queueing profiles;
for each of the plurality of predicted queueing profiles, generate an anticipated flow state based on the historical behavior profile of the first service seeking entity, the historical behavior profile of the first service provider, and a historical behavior profile of at least one other service seeking entity associated with the currently selected predicted queueing profile;

for each of the anticipated flow states, generate an anticipated wait time associated with the first service seeking entity; and, generate, at the first device, a graphical display corresponding to the anticipated wait time of the first service provider at the plurality of predicted queueing profile corresponding to the first finite time period.

\* \* \* \* \*